(12) United States Patent
Hiramatsu et al.

(10) Patent No.: US 7,602,333 B2
(45) Date of Patent: Oct. 13, 2009

(54) TRANSMITTING/RECEIVING ANTENNA, ISOLATOR, HIGH-FREQUENCY OSCILLATOR, AND HIGH-FREQUENCY TRANSMITTER-RECEIVER USING THE SAME

(75) Inventors: Nobuki Hiramatsu, Kyoto (JP); Yuji Kishida, Kyoto (JP); Kazuki Hayata, Kyoto (JP); Yoshiko Oya, Kyoto (JP); Takeshi Takenoshita, Kyoto (JP)

(73) Assignee: Kyocera Corporation, Kyoto (JP)

( * ) Notice: Subject to any disclaimer, the term of this patent is extended or adjusted under 35 U.S.C. 154(b) by 415 days.

(21) Appl. No.: 11/067,576

(22) Filed: Feb. 25, 2005

(65) Prior Publication Data

US 2005/0190101 A1    Sep. 1, 2005

(30) Foreign Application Priority Data

| Feb. 26, 2004 | (JP) | ............... P2004-050701 |
| Apr. 23, 2004 | (JP) | ............... P2004-128408 |
| Apr. 26, 2004 | (JP) | ............... P2004-129885 |

(51) Int. Cl.
*G01S 7/28* (2006.01)
(52) U.S. Cl. .................. 342/175; 342/134
(58) Field of Classification Search .......... 333/137, 333/428; 455/313, 318, 319, 326, 328; 330/287, 330/56, 61, 286; 342/165, 294, 194, 173–175
See application file for complete search history.

(56) References Cited

U.S. PATENT DOCUMENTS

| 3,334,318 | A | * | 8/1967 | Kawabata et al. ............ 333/1.1 |
| 3,437,957 | A | * | 4/1969 | Ames ........................... 332/105 |
| 3,490,053 | A | * | 1/1970 | Nagai et al. ................... 333/1.1 |
| 3,816,829 | A | * | 6/1974 | O'Farrell ...................... 342/201 |
| 3,961,286 | A | * | 6/1976 | Kim .............................. 332/144 |
| 3,962,705 | A | * | 6/1976 | Jamison ....................... 342/150 |
| 4,205,281 | A | * | 5/1980 | Nagao .......................... 333/1.1 |
| 4,427,982 | A | * | 1/1984 | Caprio .......................... 342/159 |
| 4,460,879 | A | * | 7/1984 | Hirose .......................... 333/174 |
| 4,527,134 | A | * | 7/1985 | Wantuch ...................... 333/1.1 |
| 4,683,440 | A | * | 7/1987 | Yoshikawa .................... 330/51 |
| 5,160,933 | A | * | 11/1992 | Hager ......................... 342/174 |
| 5,392,051 | A |   | 2/1995 | Uematsu et al. |

(Continued)

FOREIGN PATENT DOCUMENTS

JP        06-097735        4/1994

(Continued)

*Primary Examiner*—Thomas H Tarcza
*Assistant Examiner*—Matthew M Barker
(74) *Attorney, Agent, or Firm*—Hogan & Hartson LLP

(57) ABSTRACT

A millimeter-wave transmitter-receiver uses an NRD guide as a fundamental configuration and includes a millimeter-wave signal oscillator, a pulse modulator, a circulator, an antenna and a mixer. In the millimeter-wave transmitter-receiver, a line length of a third dielectric guide is set so that $\delta=\pm\pi$ in which $\delta$ is a phase difference at a center frequency between a portion of a transmission millimeter-wave signal, which is reflected via a third dielectric guide on the leading end portion of the third dielectric guide and returned to leak to a third connecting portion of the circulator, and another portion of the millimeter-wave signal, which leaks from a first connecting portion to the third connecting portion of the circulator. It is possible to reduce the change in the mixer output and enhance the millimeter-wave transmission/reception performance.

3 Claims, 32 Drawing Sheets

U.S. PATENT DOCUMENTS

| | | | |
|---|---|---|---|
| 5,394,154 A | | 2/1995 | Uematsu et al. |
| 5,412,414 A | * | 5/1995 | Ast et al. .................... 342/174 |
| 5,600,327 A | * | 2/1997 | Shingyoji et al. ........... 342/175 |
| 5,717,400 A | | 2/1998 | Uematsu et al. |
| 5,793,327 A | * | 8/1998 | Carnes et al. ............... 342/135 |
| 5,867,120 A | | 2/1999 | Ishikawa et al. |
| 5,886,534 A | * | 3/1999 | Bakhtiari et al. ............ 324/642 |
| 5,943,003 A | * | 8/1999 | Shollenberger .............. 342/94 |
| 6,008,755 A | * | 12/1999 | Ishikawa et al. ............ 342/175 |
| 6,094,106 A | * | 7/2000 | Kishino et al. ............ 333/22 R |
| 6,130,640 A | * | 10/2000 | Uematsu et al. ............. 342/175 |
| 6,195,058 B1 | * | 2/2001 | Nakamura et al. .......... 343/753 |
| 6,414,551 B1 | * | 7/2002 | Shin ....................... 330/287 |
| 6,639,547 B2 | * | 10/2003 | Solbach ..................... 342/165 |
| 6,707,417 B2 | * | 3/2004 | Huettner et al. ............. 342/174 |
| 6,832,081 B1 | * | 12/2004 | Hiramatsu et al. .......... 455/328 |
| 6,868,258 B2 | * | 3/2005 | Hayata et al. ................. 455/81 |
| 6,882,253 B2 | * | 4/2005 | Okamura et al. ............ 333/239 |
| 7,286,080 B2 | * | 10/2007 | Sakamoto et al. ........... 342/175 |
| 2001/0049266 A1 | * | 12/2001 | Hayata et al. ................. 455/81 |
| 2002/0075075 A1 | * | 6/2002 | Sasaki ....................... 330/286 |
| 2002/0101295 A1 | * | 8/2002 | Kii et al. ..................... 333/107 |
| 2002/0158709 A1 | * | 10/2002 | Kii et al. ..................... 333/137 |
| 2004/0001020 A1 | * | 1/2004 | Huettner et al. ............. 342/174 |

FOREIGN PATENT DOCUMENTS

| | | |
|---|---|---|
| JP | 06-174824 | 6/1994 |
| JP | 06-177649 | 6/1994 |
| JP | 06-177650 | 6/1994 |
| JP | 06-188633 | 7/1994 |
| JP | 07-077576 | 3/1995 |
| JP | 07-235808 | 9/1995 |
| JP | 10-022864 | 1/1998 |
| JP | 10-224257 | 8/1998 |
| JP | 11-183613 | 7/1999 |
| JP | 2000-171556 | 6/2000 |
| JP | 2000-258525 | 9/2000 |
| JP | 2001-074829 | 3/2001 |
| JP | 2003-035768 | 2/2003 |
| JP | 2003-198421 | 7/2003 |
| JP | 2003-218609 | 7/2003 |

* cited by examiner

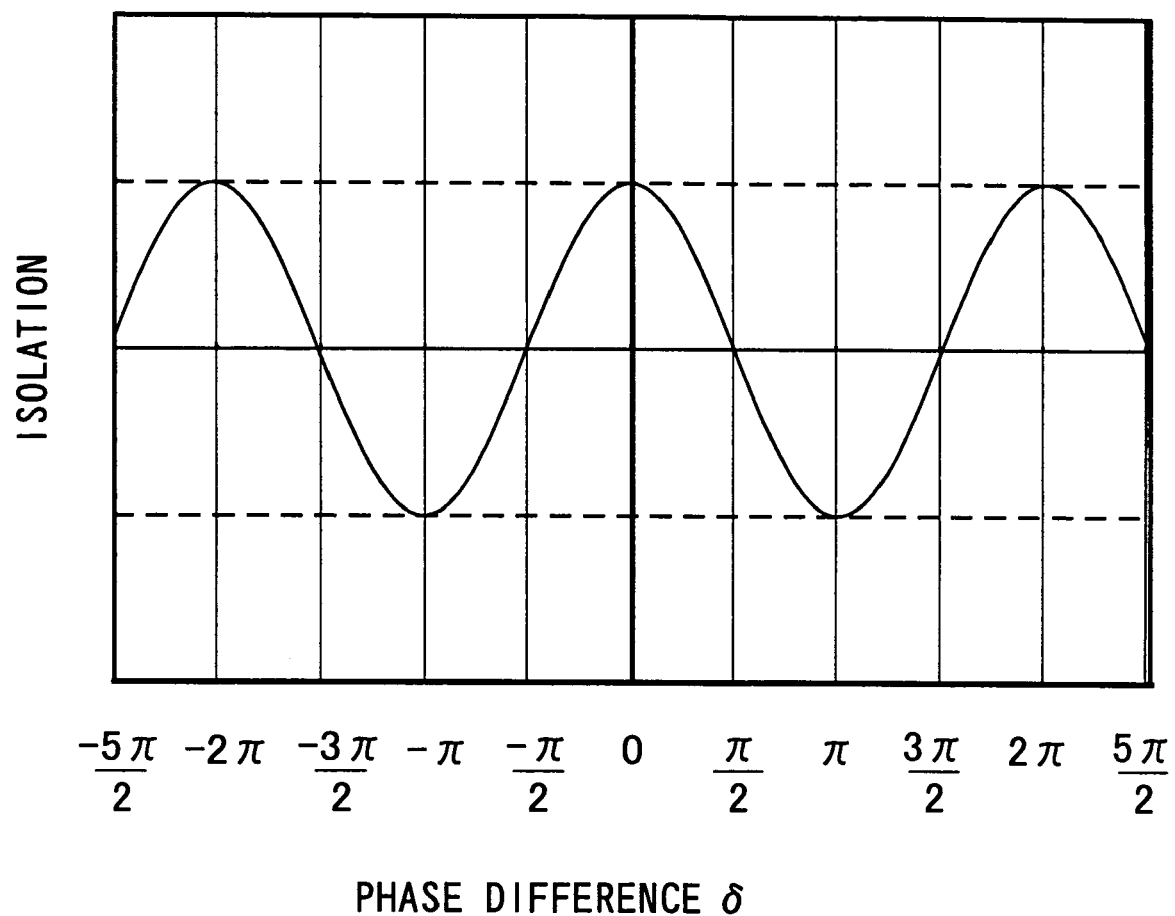

INTERMEDIATE-FREQUENCY
OUTPUT

INTERMEDIATE-FREQUENCY OUTPUT

TRANSMITTING/RECEIVING ANTENNA, ISOLATOR, HIGH-FREQUENCY OSCILLATOR, AND HIGH-FREQUENCY TRANSMITTER-RECEIVER USING THE SAME

BACKGROUND OF THE INVENTION

1. Field of the Invention

The present invention relates to a millimeter-wave transmitter-receiver using a non-radiative dielectric waveguide (i.e., NRD guide) employed in a millimeter-wave radar module, a millimeter-wave wireless telegram or the like and, more particularly, to a suppression of fluctuations of an output signal coming from a mixer due to the transient characteristics of a pulse modulator while such a switching controller of the millimeter-wave transmitter-receiver being closed (ON) as can shield the pulse-modulated transmission millimeter wave signal, which might otherwise be outputted to a reception system by an internal reflection or the like. The invention further relates to a transmitting/receiving antenna, in which an antenna (including a primary radiator) is connected to one of inputting/outputting transmission lines of a circulator, for preventing a portion of a millimeter-wave signal of a transmission system from leaking directly to the reception system.

Furthermore, the invention relates to an isolator for a high-frequency signal, which is used in a millimeter-wave integrated circuit, a millimeter-wave radar module or the like and, more particularly, to a circulator type isolator, in which a non-reflective terminator is connected to one of the inputting/outputting transmission lines of the circulator and which can improve the isolation characteristics, and to a high-frequency oscillator and high-frequency transmitter-receiver using the isolator.

Moreover, the invention relates to a high-frequency oscillator packaged in a non-radiative dielectric waveguide type millimeter-wave integrated circuit, a millimeter-wave radar module or the like for generating a millimeter-wave signal with a high-frequency diode, and a non-radiative dielectric waveguide type high-frequency transmitter-receiver using the oscillator.

Moreover, the invention relates to a high-frequency transmitter-receiver to be employed in a millimeter-wave radar module, a millimeter-wave wireless telegram or the like acting as a radar device mounted on a vehicle, a small-sized boat or the like and, more particularly, to a high-frequency transmitter-receiver for preventing a portion of the transmission high-frequency signal from being transmitted as an unnecessary signal when a modulator is OFF, and exerting adverse effects on the transmission/reception of the high-frequency signal.

Moreover, the invention relates a radar apparatus provided with the high-frequency transmitter-receiver, and a radar-apparatus mounted vehicle and radar-apparatus mounted small-sized boat provided with that radar apparatus.

2. Description of the Related Art

In the related art, for example, a pulse modulation system, as disclosed in Japanese Unexamined Patent Publication JP-A 2000-258525, has been proposed as a system which is expected as an application to a millimeter-wave radar module, a millimeter-wave wireless telegram or the like.

In the pulse modulation system, however, a portion of the pulse-modulated transmission millimeter-wave signal is outputted as an unnecessary signal to the reception system by the reflection or the like in the transmitter-receiver. This output raises a problem that the reception performance is adversely affected.

We have already proposed a solution for that problem (as referred to Japanese Unexamined Patent Publication JP-A 2003-198421). An example of the proposal is shown in a block circuit diagram of FIG. 28 and in a top plan view of FIG. 6. A fundamental configuration of the NRD guide, as used in the configuration example, is shown in a partially broken perspective view of FIG. 4. In this configuration, a dielectric guide 3 is sandwiched between parallel flat plate conductors 1 and 2 arranged in parallel at a spacing a.

The millimeter-wave transmitter-receiver shown in FIG. 6 presents an example in which a transmitting antenna and a receiving antenna are integrated. The millimeter-wave transmitter-receiver includes a pair of parallel flat plate conductors 51, a first dielectric guide 53, a millimeter-wave signal oscillator 52, a pulse modulator (not-shown), a second dielectric guide 58, a circulator 54, a third dielectric guide 55, a fourth dielectric guide 57, and a mixer 59. The pair of parallel flat plate conductors 51 is arranged in parallel at a spacing of one half or less of the wavelength of the millimeter-wave signal. The first dielectric guide 53 is disposed between the parallel flat plate conductors 51. The millimeter-wave signal oscillator 52 is disposed between the parallel flat plate conductors 51, is attached to a first dielectric guide 53, frequency-modulates a high-frequency signal outputted from a high-frequency diode and thereby the modulated signal as a millimeter-wave signal is propagaed via the first dielectric guide 53. The pulse modulator is disposed between the parallel flat plate conductors 51, is disposed midway of the first dielectric guide 53, pulsates the millimeter-wave signal and outputs the pulsated signal as a transmission millimeter-wave signal from the first dielectric guide 53. The second dielectric guide 58 is disposed between the parallel flat plate conductors 51, is disposed so that its one end side is close to the first dielectric guide 53 or joined at its one end to the first dielectric guide 53 to obtain electromagnetic coupling, and propagates a portion of the millimeter-wave signal.

The circulator 54 is disposed between the parallel flat plate conductors 51. Further, the circulator 54 has ferrite plates arranged in parallel with the parallel flat plate conductors 51, a first connecting portion 54a, a second connecting portion 54b and a third connecting portion 54c. The first to third connecting portions 54a to 54c are arranged at a predetermined spacing at the peripheral edge portion of the ferrite plates and individually act as the input/output terminals of the millimeter-wave signal. The circulator 54 outputs the millimeter-wave signal inputted from one connecting portion, from another connecting portion adjoining clockwise or counter-clockwise in the plane of the ferrite plates. In the circulator 54, the first connecting portion 54a is connected to the millimeter-wave signal output terminal of the first dielectric guide 53. The third dielectric guide 55 is disposed between the parallel flat plate conductors 51, is connected to the second connecting portion 54b of the circulator 54, has an antenna 56 at its leading end portion, and propagates the millimeter-wave signal. The fourth dielectric guide 57 is disposed between the parallel flat plate conductors 51, is connected to the third connecting portion 54c of the circulator 54, and propagates the received wave, which is received by the antenna 56 and outputted via the third dielectric guide 55 and the second connecting portion 54b from the third connecting portion 54c.

The mixer 59 is disposed between the parallel flat plate conductors 51, is configured so that either a midway of the second dielectric guide 58 and a midway of the fourth dielectric guide 57 are close to or joined to each other to obtain electromagnetic coupling, and mixes the millimeter-wave signal portion having propagated via the second dielectric guide 58 and the received wave having propagated via the fourth dielectric guide 57 thereby to generate an intermediate-frequency signal. In this example, moreover, the mixer 59 is provided at its output end with a (not-shown) switching controller for closing the output terminal when the pulse-modulated transmission millimeter-wave signal is outputted from the pulse modulator. Thus, the unnecessary signal can be prevented from being outputted to the reception system at a downstream stage of the mixer 59, substantially simultaneously as a pulsated signal for starting the pulsating operation of the pulse modulator is inputted to the pulse modulator.

Next, FIG. 28 is a block circuit diagram showing the configuration of the individual units at the time when the millimeter-wave transmitter-receiver shown in FIG. 6 is used as a mill-wave radar.

In FIG. 28, a voltage-controlled oscillator (abbreviation: VCO) 411 is provided with a Gunn diode and a varactor diode. This VCO 411 acts when a signal is inputted to its IN-2 terminal for inputting the modulated signal. A pulse modulator 412 performs pulse modulations when the pulsated signal inputted to an IN-1 terminal is inputted to the pulse modulator 412. In FIG. 6, this pulse modulator 12 is a switch disposed midway of the first dielectric guide 53 and is configured, as shown in a perspective view of FIG. 32.

The pulse modulator shown in FIG. 32 is configured into a switch, in which a choke type bias feed line 90 is formed on one principle face of a substrate 88 and in which a beam lead type PIN diode or a Schottky barrier diode 80 is soldered between connecting electrodes 81 and 81 formed midway of the bias feed line 90. This switch is employed as the pulse modulator 412 by disposing the PIN diode or the Schottky barrier diode 80 between the end faces midway of the first dielectric guide 53 in a manner to have a transverse bias applying voltage direction.

Referring to FIG. 28, the millimeter-wave transmitter-receiver comprises a circulator 413 for transmitting the millimeter-wave signal to an antenna 414 at a transmitting time and for transmitting the received wave to a mixer 415 described later at a receiving time, an antenna 414 for transmitting/receiving a millimeter-wave signal, which is exemplified by a horn antenna or the like, which is connected to the circulator 413 through a metal waveguide or a dielectric waveguide prepared by filling a metal waveguide with a dielectric. The millimeter-wave transmitter-receiver further comprises a mixer 415 for mixing the millimeter-wave signal outputted from the VCO 411 and the received signal received at the antenna 414 thereby to output an intermediate-frequency signal for detecting the range or the like to a target, a switch 416 for shielding or passing the intermediate-frequency signal outputted from the mixer 415, and a controller 419 for controlling the switching (or ON/OFF) timing of the switch 416. The switch 416 and controller 419 configure the switching controller.

The controller 419 receives the pulsated signal of the IN-1 terminal in association with the pulse modulator 412 and controls the ON/OFF timing of the switch 416 so that the transmission millimeter-wave signal pulse-modulated by the pulse modulator 412 may be shielded by the switch 416, before the pulse-modulated millimeter-wave signal is reflected by the connecting portion between the NRD guide and the dielectric waveguide or leaks from the circulator 413 and is outputted as an unnecessary signal through the mixer 415 to an amplifier 418.

Referring to FIG. 28, the millimeter-wave transmitter-receiver further comprises a capacitor 417 for AC-coupling the switch 416 and the amplifier 418.

With the configuration thus far described, the pulse-modulated transmission millimeter-wave signal can be so shielded as may not be mixed into the mixer 415 to leak into the reception system at a down stream stage. Thus, it is possible to enhance the detection precision of the millimeter-wave radar system.

In one known transmitting/receiving antenna to be assembled for use into such millimeter-wave transmitter-receiver, on the other hand, a radiator is connected to one inputting/outputting transmission line of the circulator. This example of the transmitting/receiving antenna is disclosed in not only the aforementioned Japanese Unexamined Patent Publication JP-A 2000-258525 but also Japanese Unexamined Patent Publication JP-A 7-77576.

The transmitting/receiving antenna of the related art, as disclosed in Japanese Unexamined Patent Publication JP-A 2000-258525 or Japanese Unexamined Patent Publication JP-A 7-77576, is configured, as shown in a top plan view of FIG. 29, for example, such that the antenna 428 is connected to the other end of the third transmission line 426, which is connected at its one end with one connecting portion of such a circulator that the first, second and third transmission lines 424, 425 and 426 for transmitting the millimeter-wave signal are radially connected at the peripheral edge portion of the magnetic element 427 thereby to output the millimeter-wave signal inputted from one connecting portion, from another adjacent connecting portion.

In the transmitting/receiving antenna of the related art, the millimeter-wave signal outputted from the transmission system is inputted to the first transmission line 424 and outputted from the first transmission line 424 to the third transmission line 426 so that the mill-wave signal inputted to the third transmission line 426 is transmitted from the antenna 428 connected to the third transmission line 426. At the same time, the mill-wave signal received by the antenna 428 is inputted to the third transmission line 426 and is outputted from the third transmission line 426 to the second transmission line 425 so that the mill-wave signal is outputted from the second transmission line 425 to the reception system. Thus, the transmitting/receiving antenna shares the single antenna 428 and can transmit/receive the mill-wave signal.

In the configuration proposed by Japanese Unexamined Patent Publication JP-A 2003-198421, however, we have made keen investigations for enhancing the performance of the millimeter-wave transmitter-receiver more and have found the following problems desired to be improved.

The problem desired to be improved is to consider such a fluctuation of the output level of the transmission mill-wave signal from the pulse modulator 412 as accompanies the transient response characteristics of the pulse modulator 412.

Generally, the pulse modulator 412 using the high-frequency diode has the characteristics intrinsic to those of the high-frequency diode such as a zero-bias capacitor. Even if an ideal pulse signal is inputted for the driving purpose, the modulating bias current is accompanied in most cases by the transient fluctuation such as the ringing noise. As a result, the mill-wave signal output from the pulse modulator 412 is distorted from its original waveform thereby to raise a problem that the signal output is accompanied by the level fluctuation distorted from the design concept.

The millimeter-wave transmitter-receiver, as proposed in Japanese Unexamined Patent Publication JP-A 2003-198421, is provided with the switch 416 for preventing the transmission mill-wave signal outputted from the pulse modulator 412 from migrating directly into the mixer 415 by the reflection or the like and from being outputted to the reception system. It is, however, necessary to shield the unnecessary signal which is generated in the reception system, i.e., in the mixer 415 by the aforementioned level fluctuation. Before the aforementioned level fluctuation is converged and stabilized to a steady state, therefore, the switch 416 cannot be turned ON thereby to raise a problem that the transmission/reception cannot be performed for a constant time period just after the pulse signal was sent out.

The problem desired to be improved is to suppress the level fluctuation of the output of the mixer 415 due to the transient fluctuation of the output level of the mill-wave signal from the pulse modulator 412.

For one countermeasure for solving this problem, an effective method is to combine the pulse modulators 412 in multiple stages thereby to improve the ON/OFF ratio characteristics of the pulse modulators 412 so that the especially serious problem of the level fluctuation at the OFF state time of the pulse modulators 412 may be suppressed. For this effective method, the configuration is complicated to raise problems that the increase in the number of steps of assembling the millimeter-wave transmitter-receiver and the enlargement of the sizes of the millimeter-wave transmitter-receiver itself and the millimeter-wave radar apparatus using the millimeter-wave transmitter-receiver are invited.

Moreover, the transmitting/receiving antenna of the related art, as disclosed in Japanese Unexamined Patent Publication JP-A 2000-258525 or Japanese Unexamined Patent Publication JP-A 6-188633, has a problem that the portion of the mill-wave signal inputted from the transmission system leaks from the first dielectric guide 424 to the second dielectric guide 425 and is mixed with the millimeter-wave signal to be received, thereby to deteriorate the reception characteristics of the reception system.

Further, as the isolator for the high-frequency signal assembled for use in the millimeter-wave integrated circuit or the millimeter-wave radar module, there has been known in the related art a circulator type isolator, in which a non-reflective terminator is connected to one of the inputting/outputting transmission lines of the circulator. An example of this circulator type isolator of the related art is disclosed in Japanese Unexamined Patent Publication JP-A 7-235808, for example.

The isolator disclosed in Japanese Unexamined Patent Publication JP-A 7-235808 is configured, as shown in the schematic top plan view of FIG. 30, for example, such that the non-reflective terminator 438 is connected to the other end of the third transmission line 436, which is connected at its one end with one connecting portion of such a circulator that the first, second and third transmission lines 434, 435 and 436 for transmitting the high-frequency signal are radially connected at the peripheral edge portion of the magnetic element 437 thereby to output the millimeter-wave signal inputted from one connecting portion, from another adjacent connecting portion, and such that the line length of the third transmission line 436 is set to $(2n+1)/4 \cdot \lambda g$ (n: an integer, and $\lambda g$: the wavelength of the high-frequency signal in the third transmission line 436).

According to this isolator of the related art, when the high-frequency signal inputted from the first transmission line 434 is outputted from the second transmission line 435 whereas that portion of the high-frequency signal, which is reflected on the output terminal end of the second transmission line 435, is inputted to the third transmission line 436 and is terminated at the non-reflective terminator 438 so that the high-frequency signal portion reflected on the output terminal side of the second transmission line 435 may not leak to the input terminal of the first transmission line 434. At the time the high-frequency signal, which is not fully terminated at the non-reflective terminator 438 but reflected to leak from the third transmission line 436 to the first transmission line 434, and the high-frequency signal portion, which is reflected on the output terminal of the second transmission line 435 to leak from the second transmission line 435 to the first transmission line 434, are made to interfere so that the high-frequency signal reflected on the output terminal of the second transmission line 435 to leak to the input terminal of the first transmission line 434 can be more attenuated. Therefore, it is possible to make the isolation characteristics satisfactory.

In the related art, on the other hand, the metal waveguide is often used for transmitting the high-frequency signal of a micro-wave or millimeter-wave. By the demand of recent years for reducing the size of the high-frequency module, however, there has been developed the high-frequency module which uses the dielectric guide as the waveguide of the high-frequency signal. Of these, the non-radiative dielectric waveguide (as will also called the "NRD guide") having little transmission loss of the high-frequency signal is being noted.

The fundamental configuration of the NRD guide is shown in a partially broken perspective view in FIG. 411. As shown in FIG. 411, the NRD guide is configured by arranging the dielectric guide 3 having a rectangular sectional shape such as a rectangle between the parallel flat plate conductors 1 and 2 arranged in parallel at a predetermined spacing a. In case this spacing a is defined by a $\leq \lambda/2$ with respect to the wavelength $\lambda$ of the high-frequency signal, the high-frequency signal can be efficiently propagated in the dielectric guide 3 by eliminating the intrusion of the noise from the outside into the dielectric guide 3 and by eliminating the radiation of the high-frequency signal to the outside. The wavelength $\lambda$ of the high-frequency signal is the value in the air (or the free space) in the operating frequency.

An example of the high-frequency oscillator of the related art to be incorporated into the NRD guide is shown in perspective views in FIG. 31 and FIG. 32. FIG. 31 is a perspective view showing the example of the high-frequency oscillator of the related art, and FIG. 32 is a perspective view of a wiring substrate, which is provided with a variable capacity diode (i.e., a varactor diode) for the high-frequency oscillator. In FIG. 31 and FIG. 32, the parallel flat plate conductors are not shown. This high-frequency oscillator oscillates the frequency-modulated high-frequency signal by using the Gunn diode and the varactor diode in combination, and a high-frequency transmitter-receiver, a millimeter-wave radar module or the like using such high-frequency oscillator has been developed. FIG. 33 is a top plan view showing an example of the millimeter-wave radar module, which is configured by incorporating the high-frequency oscillator of the related art as a millimeter-wave signal oscillator 502.

The high-frequency oscillator shown in FIG. 31 is configured to include a voltage-controlled oscillator V and a circulator E. At first, the voltage-controlled oscillator V or the component of the high-frequency oscillator shown in FIG. 31 has the configuration to be described in the following. In FIG. 31 and FIG. 32: reference numeral 82 denotes a metal member of a generally box-shaped metal block or the like for mounting a Gunn diode 83; the reference numeral 83 denotes the Gunn diode or a kind of a high-frequency diode for oscillating millimeter-waves; reference numeral 84 denotes a wiring substrate disposed on one side face of the metal member 82 and having a choke type bias feed line 84*a* formed to function as a low-pass filter for feeding a bias voltage to the Gunn diode 83 and for preventing the leakage of the high-frequency signal; reference numeral 85 denotes a band-shaped conductor such as a metal foil ribbon for connecting the choke type bias feed line 84*a* and the upper conductor of the Gunn diode 83; reference numeral 86 denotes a metal strip resonator having a resonating metal strip line 86a disposed on the dielectric substrate; and reference numeral 87 denotes a dielectric guide for guiding the high-frequency signal resonated by the metal strip resonator, to the outside of the millimeter-wave signal oscillator.

Midway of the dielectric guide 87, moreover, there is disposed the wiring substrate 88, in which the wiring substrate 88 having the varactor diode 80 or a frequency modulating diode, i.e., a kind of variable capacity diode packaged therein. The bias voltage applying direction of the varactor diode 80 is made perpendicular to the propagation direction of the high-frequency signal in the dielectric guide 87 and parallel (i.e., in the static direction) to the principal face of the parallel flat plate conductors. Moreover, the bias voltage applying direction of the varactor diode 80 is aligned with the static direction of the high-frequency signal in an $LSM_{01}$ mode to propagate in the dielectric guide 87. By coupling the high-frequency signal and the varactor diode 80 electromagnetically to control the bias voltage thereby to vary the electrostatic capacity of the varactor diode 80, therefore, the frequency of the high-frequency signal can be controlled. Moreover, reference numeral 89 denotes a dielectric plate having a high specific dielectric constant for matching the impedance between the varactor diode 80 and the dielectric guide 87.

As shown in FIG. 32, the second choke type bias feed line 90 is formed on one principal face of the wiring substrate 88, and the varactor diode 80 is arranged midway of the second choke type bias feed line 90. The connecting electrode 81 is formed at the connecting portion of the second choke type bias feed line 90 with the varactor diode 80.

The high-frequency signal oscillated from the Gunn diode 83 is derived through the metal strip resonator 86 to the dielectric guide 87. Next, a portion of the high-frequency signal is reflected on the varactor diode 80 and returned to the Gunn diode 83. This reflected signal changes according to the variation in the static capacity of the varactor diode 80 so that its oscillatory frequency varies.

Next, the circulator E, i.e., the component of the high-frequency modulator shown in FIG. 31 includes a first connecting portion 92a, a second connecting portion 92b and a third connecting portion 92c arranged at a predetermined spacing at the peripheral edge portions of two ferrite plates 91a and 91b arranged in parallel with the parallel flat plate conductor, for individually acting as input/output terminals of the mill-wave signal. In the circulator E, one end of the dielectric guide 87, one end of a dielectric guide 93 and one end of a dielectric guide 94 are connected to the first connecting portion 92a, second connecting portion 92b and the connecting portion 92c, respectively, such that the mill-wave signal inputted from the other end of the dielectric guide 87 is outputted from an output terminal 93a or the other end of the dielectric guide 93 adjoining counterclockwise in the planes of the ferrite plates 91a and 91b. In the circulator E, a portion of the output is reflected back and inputted from the output terminal 93a, and it is inputted to one end of the dielectric guide 94 adjoining counterclockwise in the planes of the ferrite plates 91a and 91b and outputted from the other end.

The high-frequency modulator shown in FIG. 31 is configured such that the voltage-controlled oscillator V and the circulator E are connected via the dielectric guide 87, and such that a non-reflective terminator 95 is connected to the other end of the dielectric guide 94. The mill-wave signal generated by the voltage-controlled oscillator V is transmitted from the first connecting portion 92a of the circulator E to the second connecting portion 92b and is extracted as the millimeter-wave oscillation output from the output terminal 93a. The circulator E and the non-reflective terminator 95 act as the isolator to isolate the voltage-controlled oscillator V and the output terminal 93a so that the millimeter-wave oscillation output of the voltage-controlled oscillator V may not return to the voltage-controlled oscillator V. Thus, the voltage-controlled oscillator V oscillates stably. This technique on the high-frequency oscillator is disclosed in Japanese Unexamined Patent Publication JP-A 6-188633, JP-A 6-177650, JP-A 6-177649 and JP-A 6-97735, for example.

On the other hand, the millimeter-wave radar module shown in FIG. 33 is of the FMCW (Frequency Modulation Continuous Waves) type having the following operation principle. An input signal having a voltage amplitude changing in a triangular wave, a sinusoidal wave or the like with time is inputted to a modulated signal inputting terminal of the millwave signal oscillator 502 made of the high-frequency oscillator, as shown in FIG. 31, the output signal of which is frequency-modulated to deviate the output frequency of the mill-wave signal oscillator 502 into the triangular wave, the sinusoidal wave or the like. In case an output signal (or a transmission wave) is radiated from a transmitting/receiving antenna 506, the reflected wave (or the received wave) returns from a target, if any in front of the transmitting/receiving antenna 506, with a time difference for reciprocations of the propagation velocity of the electric waves. At this time, the intermediate-frequency signal corresponding the frequency difference between the transmitted wave and the received wave is outputted to the intermediate-frequency output terminal on the output side of a mixer 510.

By analyzing the frequency component such as the output frequency of the output of that intermediate-frequency output terminal, the range to the target can be derived from a relational Formula: $F_{if}=4R \cdot fm \cdot \Delta f/c$ ($F_{if}$: IF (Intermediate Frequency) output frequency; R: a range; fm: a modulated frequency; $\Delta f$: a frequency deviation width; and c: the velocity of light).

The technique for the millimeter-wave radar module using that high-frequency oscillator is disclosed in Japanese Unexamined Patent Publication JP-A 6-174824, JP-A 10-22864 and JP-A 10-224257, for example.

On the other hand, the examples of the radar apparatus of the related art and the radar-apparatus mounted vehicle having the radar apparatus mounted thereon are disclosed in Japanese Unexamined Patent Publication JP-A 2003-35768, for example.

In the isolator of the related art disclosed in Japanese Unexamined Patent Publication JP-A 7-235808, however, the advancement in the phase of the high-frequency signal changes in fact at the time when the high-frequency signal is reflected mainly on the non-reflective terminator 438. With the aforementioned setting of the line length of the third transmission line 436 to improve the isolation characteristics under the premise of no phase change, the two high-frequency signals to leak to the first transmission line 14 deviate from the opposite phases so that they are synthesized. This synthesization raises a problem that it is impossible to sufficiently attenuate the high-frequency signal which might otherwise be reflected on the output terminal of the second transmission line 435 to leak to the input terminal of the first transmission line 434.

On the other hand, the high-frequency oscillator of the related art shown in FIG. 31 has a narrow frequency band width for a high isolation, as the isolation characteristics of one stage of the circulator or the component of the high-frequency modulator are shown in the graph of FIG. 16. This raises a problem that the oscillatory frequency band is limited (e.g., 1 GHZ or less in the example of FIG. 16) is restricted fro the stable oscillation of the high-frequency oscillator within the range where the isolation can be at a predetermined or higher value of 30 dB or more.

In case the high-frequency oscillator of the related art is incorporated for use into the millimeter-wave radar module or the like, this millimeter-wave radar module is mounted in such an engine room or the like of an automobile as has serious temperature variations. The oscillatory frequency of the high-frequency oscillator depends on the temperature. This dependency raises a problem that the high-frequency oscillator outputs millimeter-wave oscillations with such a frequency thereby to deteriorate the radar detecting performance that the isolation of the circulator cannot be made at the environmental temperature.

The mill-wave oscillation output may be further pulse-modulated in the millimeter-wave radar module of the related art to perform the millimeter-wave transmission/reception of less noises. In this case, the pulsating mill-wave signal returns from the pulse modulator to the high-frequency oscillator of the related art so that a more serious factor for the oscillation instability is added to the voltage-controlled oscillator. This addition raises a problem that the isolation of the circulator becomes short.

Against these problems, on the other hand, there is conceived solution means for configuring a similar high-frequency oscillator by using the circulator having the two-stage configuration, as has been proposed by us in Japanese Unexamined Patent Publication JP-A 2003-218609. In this technique, however, a more improvement has been desired for widening the frequency band width, in which an isolation at a predetermined or higher value is retained.

Further, in the related art, for example, a pulse modulation system, as disclosed in Japanese Unexamined Patent Publication JP-A 2000-258525, has been proposed as the system which is expected as an application to a millimeter-wave radar module, a millimeter-wave wireless telegram or the like.

The high-frequency transmitter-receiver of this pulse modulation type of the related art is configured, as shown in a schematic block circuit diagram of FIG. 34, for example, to include a high-frequency oscillator 61, a branching device 62, a pulse modulator 63, a circulator 64, a transmitting/receiving antenna 65, and a mixer 66. The high-frequency oscillator 61 is generated a high-frequency signal. The branching device 62 is connected to the output terminal of the high-frequency oscillator 61, and branches the high-frequency signal and outputs the branched signals to one output terminal 62b and the other output terminal 62c. The pulse modulator 63 is connected to the one output terminal 62b of the branching device 62 for pulse-modulating a portion of the high-frequency signal to output the modulated signal as a transmission high-frequency signal. The circulator 64 has first, second and third terminals 64a, 64b and 64c. In the circulator 64, the first terminal 64a is connected to the output terminal 63a of the pulse modulator 63, and the high-frequency signal inputted from the first terminal 64a output to the second terminal 64b and the high-frequency signal inputted from the second terminal 64b output to the third terminal 64c. The transmitting/receiving antenna 65 is connected to the second terminal 64b of the circulator 64. The mixer 66 is connected between the other terminal 62c of the branching device 62 and the third terminal 64c of the circulator 64. The mixer 66 output an intermediate-frequency signal with mixing the high-frequency signal as a local signal LO outputted to the other output terminal 62c of the branching device 62 and a high-frequency signal RF received by the transmitting/receiving antenna 65.

Other examples of the high-frequency transmitter-receiver of the related art adopting that pulse modulation type are disclosed in Japanese Unexamined Patent Publication JP-A 11-183613, JP-A 2000-171556 and JP-A 2001-74829.

Examples of the radar apparatus of the related art and the radar-apparatus mounted vehicle having the radar apparatus mounted thereon are disclosed in Japanese Unexamined Patent Publication JP-A 2003-35768, for example.

In any of the configurations disclosed in Japanese Unexamined Patent Publications JP-A 2000-258525, JP-A 11-183613, JP-A 2000-171556 and JP-A 2001-74829, however, a portion of the local signal L0 is reflected on the mixer 66 and then leaks from the third terminal 64c of the circulator 64 to the first terminal 64a, as shown in FIG. 34. Moreover, this high-frequency signal having leaked is totally reflected on the pulse modulator 63 in the OFF state so that it is transmitted as the unnecessary high-frequency signal from the transmitting/receiving antenna 65. As a result, the ON/OFF ratio or the ratio of the intensities of the individual transmission high-frequency signals, which are transmitted from the transmitting/receiving antenna 65 when the pulse modulator 63 are ON and OFF, drops to raise a problem that the transmission/reception performance drops. Specifically, this unnecessary high-frequency signal migrates, if transmitted, into the high-frequency signal RF to be intrinsically received, thereby to raise a problem that the portion of the high-frequency signal RF to be received cannot be correctly received.

In the radar apparatus using that high-frequency transmitter-receiver, moreover, the high-frequency signal of a weak intensity reflected on a distant objective to be detected is buried in the high-frequency signal or the noise transmitted when the pulse modulator 63 is OFF. As a result, the range to be detected may be narrowed, or an erroneous detection may occur thereby to cause a problem that the detection of the objective is delayed.

Moreover, the vehicle or the small-sized boat having such radar apparatus mounted thereon is caused to take a proper behavior such as an avoidance or a braking by detecting the objective with the radar apparatus on the basis of the detected information. However, the detection of the objective is delayed to raise a problem that the delayed detection may cause an abrupt behavior in the vehicle or the small-sized boat.

SUMMARY OF THE INVENTION

The invention has been conceived to solve the foregoing problems desired to improve, and has an object to provide a millimeter-wave transmitter-receiver which has a switch capable of preventing the pulse-modulated transmission mill-wave signal from being outputted to the reception system by the internal reflection or the like and which can perform the transmission/reception just after the pulse signal was transmitted.

Another object of the invention is to provide a transmitting/receiving antenna, which can prevent a portion of the mill-wave signal of the transmission system from leaking directly into the reception system, and a millimeter-wave transmitter-receiver using the transmitting/receiving antenna to have a high millimeter-wave transmitting/receiving performance.

Further another object of the invention is provided such an circulator type isolator having improved isolation characteristics that the non-reflective terminator is connected to one of the inputting/outputting transmission lines of the circulator.

Still another object of the invention is to provide a high-frequency oscillator which can take a wide frequency band width for retaining an isolation at a predetermined or higher value to widen the frequency band width for the stable oscillation and which can stably operate even when the frequency characteristics of the high-frequency oscillator are influenced by the operating environmental temperature, and a high-frequency transmitter-receiver using the oscillator.

Further still another object of the invention is to provide a high-frequency transmitter-receiver of a high performance which is enabled to enhance the transmission/reception performance with a simple configuration by preventing a portion of the transmission high-frequency signal from being transmitted as the unnecessary signal when the pulse modulator is OFF, thereby to enhance the ON/OFF ratio of the transmission output.

Yet further another object of the invention is to provide a radar apparatus provided with a high-frequency transmitter-receiver of a high performance, and a radar-apparatus mounted vehicle and a radar-apparatus mounted small-sized boat provided with the radar apparatus.

The invention provides a transmitting/receiving antenna comprising:
  a circulator having first, second and third transmission lines for transmitting the millimeter-wave signal which are radially connected to a peripheral edge portion of a magnetic element by first, second and third connecting portions, respectively, the circulator outputting a millimeter-wave signal inputted from one of the connecting portions, from either one of the connecting portions adjacent to the one connecting portion; and
  an antenna connected to one end of the third transmission line the other end of which is connected to the third connecting portion,
  wherein a line length of the third transmission line is set so that $\delta = \pm \pi$ (unit: rad) in which $\delta$ is a phase difference at a center frequency between a signal Wa, which is a millimeter-wave signal portion reflected via the third transmission line on the antenna and returned to leak to the second connecting portion, and a signal Wb, which is another millimeter-wave signal portion having leaked from the first connecting portion through the circulator to the second connecting portion.

The invention provides a transmitting/receiving antenna comprising:
  a pair of parallel flat plate conductors arranged in parallel at a spacing of one half or less of a wavelength of a millimeter-wave signal;
  a circulator disposed between the parallel flat plate conductors on whose inner faces having two ferrite plates arranged to confront each other, the circulator having first, second and third dielectric guides for inputting/outputting the millimeter-wave signal which are radially connected to the peripheral edge portions of the two ferrite plates by first, second and third connecting portions, respectively, the circular outputting the millimeter-wave signal inputted from one of the connecting portions, from either one of the connecting portions adjacent to the one connecting portion; and
  an antenna or a waveguide tube or primary radiator connected to the antenna, disposed on the parallel flat plate conductors, and connected to a through hole which is formed at a portion of one of the parallel flat plate conductors, the portion confronting a portion of the third dielectric guide one end of which is connected to the third connecting portion, in which portion electric field of a standing wave in an LSM mode is high,
  wherein a length from the one end to the portion confronting the through hole of the third dielectric guide is set so that $\delta = \pm \pi$ in which $\delta$ is a phase difference at a center frequency between a signal Wa, which is a millimeter-wave signal portion reflected via the third dielectric guide on the through hole and returned to leak to the second connecting portion, and a signal Wb, which is another millimeter-wave signal portion having leaked from the first connecting portion through the circulator to the second connecting portion.

The invention provides a millimeter-wave transmitter-receiver comprising:
  a millimeter-wave oscillator for generating a millimeter-wave signal;
  a branching device connected to the millimeter-wave oscillator, for branching a millimeter-wave signal and outputting transmittion millimeter-wave signals to one output terminal thereof and a local signal to another output terminal thereof;
  the aforementioned transmitting/receiving antenna in which an end portion of the first transmission line is connected to the one output terminal of the branching device; and
  a mixer connected between the other output terminal of the branching device and the end portion of the second transmission line of the transmitting/receiving antenna, for mixing the local signal outputted to the other output terminal and the millimeter-wave signal received by the transmitting/receiving antenna, and outputting an intermediate-frequency signal.

The invention provides a millimeter-wave transmitter-receiver comprising:
  the aforementioned transmitting/receiving antenna;
  a mill-wave signal oscillator disposed between the parallel flat plate conductors, and attached to the first dielectric guide for frequency-modulating the high-frequency signal outputted from the high-frequency diode and for propagating the modulated signal as the mill-wave signal via the first dielectric guide;
  a pulse modulator disposed between the parallel flat plate conductors, and disposed midway of the first dielectric guide for pulsating the mill-wave signal, for outputting the pulsated signal as the transmission mill-wave signal via the first dielectric guide;
  a fourth dielectric guide disposed between the parallel flat plate conductors, and disposed so that its one end is close to the first dielectric guide or joined at its one end to the first dielectric guide to obtain electromagnetic coupling, for propagating a portion of the mill-wave signal; and
  a mixer disposed between the parallel flat plate conductors, and configured so that a midway of the fourth dielectric guide and a midway of the third dielectric guide are close to or joined to each other to obtain electromagnetic coupling, for mixing the mill-wave signal portion and the received wave received by the transmitting/receiving antenna and generating the intermediate-frequency signal.

Further, in the invention, a power ratio of the one mill-wave signal portion Wa and the other mill-wave signal portion Wb is set to 0.27 or more, and the phase difference $\delta$ is set to $\delta = \pm \pi \pm 0.42\pi$.

Further, in the invention, the millimeter-wave transmitter-receiver further comprises a pulse modulator which is interposed between the one output terminal of the branching device and a first transmission line of the circulator, and pulse-modulates the transmission millimeter-wave signal branched to the one output terminal, and outputs the transmission millimeter-wave signal, and the output terminal of the mixer is provided with a switching controller for opening the output terminal when the pulse-modulated transmission mill-wave signal is outputted from the pulse modulator.

Further, in the invention, the output terminal of the mixer is provided with a switching controller for opening the output terminal when the pulse-modulated transmission mill-wave signal is outputted from the pulse modulator.

According to the invention, a transmitting/receiving antenna comprises a circulator having first, second and third transmission lines for transmitting the millimeter-wave signal which are radially connected to a peripheral edge portion of a magnetic element by first, second and third connecting portions, respectively, the circulator outputting a millimeter-wave signal inputted from one of the connecting portions, from either one of the connecting portions adjacent to the one connecting portion; and an antenna connected to one end of the third transmission line the other end of which is connected to the third connecting portion, wherein a line length of the third transmission line is set so that $\delta=\pm\pi$ in which $\delta$ is a phase difference at a center frequency between a signal Wa, which is a millimeter-wave signal portion reflected via the third transmission line on the antenna and returned to leak to the second connecting portion, and a signal Wb, which is another millimeter-wave signal portion having leaked from the first connecting portion through the circulator to the second connecting portion. Accordingly, the phase difference $\delta$ between the signals Wa and Wb is $\pm\pi$, and as a result, the two mill-wave signals Wa and Wb having leaked to the second dielectric guide can be reliably reversed just into opposite phases to cancel each other effectively. As a result, the mill-wave signal to leak from the first dielectric guide on the transmission system side to the second dielectric guide on the reception system side can be suppressed to provide the transmitting/receiving antenna having the reception system of satisfactory reception characteristics.

Further, according to the invention, a transmitting/receiving antenna comprises a pair of parallel flat plate conductors arranged in parallel at a spacing of one half or less of a wavelength of a millimeter-wave signal; a circulator disposed between the parallel flat plate conductors on whose inner faces having two ferrite plates arranged to confront each other, the circulator having first, second and third dielectric guides for inputting/outputting the millimeter-wave signal which are radially connected to the peripheral edge portions of the two ferrite plates by first, second and third connecting portions, respectively, the circular outputting the millimeter-wave signal inputted from one of the connecting portions, from another of the connecting portions adjacent to the one connecting portion; and an antenna or a waveguide tube or primary radiator connected to the antenna, disposed on the parallel flat plate conductors, and connected to a through hole which is formed at a portion of one of the parallel flat plate conductors, the portion confronting a portion of the third dielectric guide one end of which is connected to the third connecting portion, in which portion electric field of a standing wave in an LSM mode is high, wherein a length from the one end to the portion confronting the through hole of the third dielectric guide is set so that $\delta=\pm\pi$ in which $\delta$ is a phase difference at a center frequency between a signal Wa, which is a millimeter-wave signal portion reflected via the third dielectric guide on the through hole and returned to leak to the second connecting portion, and a signal Wb, which is another millimeter-wave signal portion having leaked from the first connecting portion through the circulator to the second connecting portion. Therefore the phase difference $\delta$ between the signals Wa and Wb is $\pm\pi$, so that the two mill-wave signals Wa and Wb having leaked to the second dielectric guide can be reliably reversed just into opposite phases to cancel each other effectively. As a result, the mill-wave signal to leak from the first dielectric guide on the transmission system side to the second dielectric guide on the reception system side can be suppressed to provide the transmitting/receiving antenna having the reception system of satisfactory reception characteristics.

According to the invention, the line length of the third transmission line is set so that $\delta=\pm\pi$ in which $\delta$ is a phase difference at a center frequency between a signal Wa, which is a millimeter-wave signal portion reflected via the third transmission line on the antenna and returned to leak to the second connecting portion, and a signal Wb, which is another millimeter-wave signal portion having leaked from the first connecting portion through the circulator to the second connecting portion. Therefore, in the second connecting portion, the mill-wave signal portion Wa and the other mill-wave signal portion Wb interfere to weaken each other so that the intensity (or power) of the mill-wave signal, which is synthesized by the interference between the mill-wave signal portion Wa and another mill-wave signal portion Wb, is suppressed to become lower than the intensity (or power) of the other mill-wave signal portion Wb before the interference. Therefore, it is possible to reduce the change in the mixer output at the time when the mill-wave signal leaks from the third connecting portion of the circulator and migrates directly into the mixer due to the shortage of the isolation of the circulator. As a result, only the desired one of the mixer outputs can be easily detected to improve the millimeter-wave transmitting/receiving performance.

According to the invention, a panotherortion of the millimeter-wave signal of the transmission system can be prevented from leaking to the reception system thereby to reduce the interference with the millimeter-wave signal to be received, thereby to make the reception characteristics of the reception system of the millimeter-wave transmitter-receiver. As a result, the power of the millimeter-wave signal of the transmission system can be raised to elongate the transmission range of the millimeter-wave signal to be transmitted by the transmitting/receiving antenna and to improve the S/N (Signal/Noise) ratio. Thus, the millimeter-wave transmitting/receiving performance can be improved as a whole.

Further, according to the invention, in a case where the ratio of the powers of the one mill-wave signal portion Wa and another mill-wave signal portion Wb is set to 0.27 or more, and the phase difference $\delta$ is set to $\delta=\pm\pi\pm0.42\pi$, the mill-wave signal portion Wa and the other mill-wave signal portion Wb interfere to weaken each other. The intensity of the mill-wave signal, which is synthesized by the interference between the mill-wave signal portion Wa and the other mill-wave signal portion Wb, can be suppressed to one half or less than the sum of the individual output intensities before the mill-wave signal portion Wa and the other mill-wave signal portion Wb interfere each other. This suppression can be realized with the phase difference $\delta$ within a practically set range. Therefore, it is possible to reduce the change easily and reliably in the mixer output at the time when the transmission mill-wave signal leaks from the second or third connecting portion of the circulator and migrates directly into the mixer due to either the reflection from the pulse modulator in the millimeter-wave transmitter-receiver or the shortage of the isolation of the circulator. As a result, only the desired one of the mixer outputs can be easily detected to improve the millimeter-wave transmitting/receiving performance better.

Further, according to the invention, in a case where the output terminal of the mixer is provided with the switching controller for opening the output terminal when the pulse-modulated transmission mill-wave signal is outputted from the pulse modulator, even in a case where the switching controller is closed (ON) immediately after the transmission mill-wave signal was outputted from the pulse modulator, the fluctuation of the mixer output due to the transient fluctuation of the millimeter-wave output of the pulse modulator is sufficiently converged. Without any obstruction by the unnecessary signal, therefore, the millimeter-wave transmission/reception can be started immediately after the pulse signal was sent out.

According to the invention, in the configuration of the transmitting/receiving antenna and the millimeter-wave transmitter-receiver of the invention using the antenna, the millimeter-wave transmitter-receiver having the switching controller capable of preventing the output of the pulse-modulated transmission mill-wave signal from being outputted to the reception system by the internal reflection or the like can shorten the shielding time by the switching controller, substantially to a time period for which the pulse-modulated transmission mill-wave signal is being sent out. Therefore, the millimeter-wave transmitter-receiver can be given such a high performance as to widen the time range for the millimeter-wave transmission/reception. As a result, the detection performance in a short range can be improved when the transmitter-receiver is applied to a millimeter-wave radar. Moreover, it is possible to prevent the portion of the mill-wave signal of the transmission system from leaking directly to the reception system and accordingly to improve the millimeter-wave transmitting/receiving performance.

The invention provides an isolator, comprising:
a circulator having first, second and third transmission lines for transmitting a high-frequency signal which are connected radially with a peripheral edge portion of a magnetic element by first, second and third connecting portions, respectively, the circulator outputting a high-frequency signal inputted from one of the connecting portions, from either one of the connecting portions adjacent to the one connecting portion; and
a non-reflective terminator having one end connected to the third connecting portion and connected to the other end of the third transmission line, wherein a line length of the third transmission line is set so that $\delta = \pm \pi$ in which $\delta$ is a phase difference at a center frequency between signals Wa, which is a millimeter-wave signal portion reflected via the third transmission line on the non-reflective terminator and returned to leak to the first transmission line, and Wb, which is another millimeter-wave signal portion having leaked from the second transmission line through the circulator to the first transmission line.

The invention provides an isolator, comprising:
first and second circulators each having first, second and third transmission lines for transmitting the millimeter-wave signal which are radially connected to a peripheral edge portion of a magnetic element by first, second and third connecting portions, respectively, the circulators each outputting a millimeter-wave signal inputted from one of the connecting portions, from either one of the connecting portions adjacent to the one connecting portion, the circulators being so connected that the second transmission line of the first circulator acts as the first transmission line of the second circulator; and non-reflective terminators each having an end connected to the third connecting portion, the non-reflective terminators each being connected to the other end of the third transmission line,
wherein frequency dependency of the isolation characteristics between a high-frequency signal transmitted from the first transmission line to the second transmission line and a high-frequency signal transmitted from the second transmission line to the first transmission line of the first circulator is different from frequency dependency of isolation characteristics between a high-frequency signal to transmit from the first transmission line to the second transmission line and a high-frequency to transmit from the second transmission line to the first transmission line of the second circulator.

Further, in the invention, a line length of the third transmission line of each of the first and second circulators is set so that $\delta = \pm \pi$ in which $\delta$ is a phase difference at a center frequency between signals Wa, which is a high-frequency signal portion reflected via the third transmission line on the non-reflective terminator and returned to leak to the first transmission line, and Wb, which is another high-frequency signal portion having leaked from the second transmission line through the circulator to the first transmission line.

The invention provides a high-frequency oscillator comprising:
a pair of parallel flat plate conductors arranged in parallel at a spacing of one half of less of a wavelength of a high-frequency signal;
first and second circulators disposed between the parallel flat plate conductors, having two ferrite plates disposed to confront each other in an inner face of the parallel flat plate conductors, an inputting dielectric guide, disposed radially with respect to the two ferrite plates, for inputting high frequency signal, a terminating dielectric guide having a non-reflective terminator provided at a leading end thereof and an outputting dielectric guide for outputting a high-frequency signal inputted to the inputting dielectric guide, the first and second circulators being so connected to each other that the outputting dielectric guide of the first circulator acts as the inputting dielectric guide of the second circulator; and
a voltage-controlled oscillator connected to an input terminal to which the high-frequency signal of the inputting dielectric guide of the first circulator is inputted,
wherein frequency dependency of isolation characteristics between the high-frequency signal to be transmitted from the inputting dielectric guide to the outputting dielectric guide and the high-frequency signal to be transmitted from the outputting dielectric guide to the inputting dielectric guide of the first circulator is different from frequency dependency of isolation characteristics between the high-frequency signal to be transmitted from the inputting dielectric guide to the outputting dielectric guide and the high-frequency signal to be transmitted from the outputting dielectric guide to the inputting dielectric guide of the second circulator.

Moreover, in the invention, the frequency dependency is adjusted by making different at least one of spacing and size of the two ferrite plates between the first circulator and the second circulator.

The invention provides a high-frequency oscillator comprising:
the isolator mentioned above; and
a voltage-controlled oscillator connected to the input terminal of the isolator, for generating a high-frequency signal.

The invention provides a high-frequency transmitting/receiving apparatus comprising:

a pair of parallel flat plate conductors arranged in parallel at a spacing of one half or less of a wavelength of a millimeter-wave signal;

a first dielectric guide disposed between the parallel flat plate conductors;

a mill-wave signal oscillator attached to the first dielectric guide and disposed between the parallel flat plate conductors, for outputting a mill-wave signal outputted from the high-frequency oscillator to the first dielectric guide;

a pulse modulator disposed between the parallel flat plate conductors so as to be midway of the first dielectric guide, for pulsating the mill-wave signal and outputting the pulsated signal as a transmission mill-wave signal via the first dielectric guide;

a second dielectric guide disposed between the parallel flat plate conductors, and disposed so that its one end is close to the first dielectric guide or joined at its one end to the first dielectric guide to obtain electomagnetic coupling, for propagating a portion of the mill-wave signal;

a circulator disposed between the parallel flat plate conductors, including ferrite plates disposed in parallel to the parallel plat plate conductors, and a first connecting portion, a second connecting portion and a third connecting portion arranged at a predetermined spacing on the peripheral edge portion of the ferrite plates, each acting as input/output terminals of the millimeter-wave signal, for outputting a millimeter-wave signal inputted from one of the connecting portions, from either one of the connecting portions adjacent to the one connecting portion clockwise or counter-clockwise in the planes of the ferrite plates, the first connecting portion being connected to the millimeter-wave signal output terminal of the first dielectric guide;

a third dielectric guide disposed between the parallel flat plate conductors and connected to the second connecting portion of the circulator, for propagating the millimeter-wave signal, the third dielectric guide having a transmitting/receiving antenna at its leading end portion;

a fourth dielectric guide disposed between the parallel flat plate conductors and connected to the third connecting portion of the circulator, for propagating a received wave which is received by the transmitting/receiving antenna, is propagated via the third dielectric guide and is outputted from the third connecting portion;

a mixer disposed between the parallel flat plate conductors and configured so that either a midway of the second dielectric guide and a midway of the fourth dielectric guide are close to or joined to each other to obtain electromagnetic coupling, for mixing a portion of the transmitting millimeter-wave signal and the receiving-wave and generating the intermediate-frequency signal; and a non-reflective terminator disposed between the parallel flat plate conductors and connected to an end portion on opposite side of the mixer of the second dielectric guide, wherein the high-frequency oscillator of the millimeter-wave oscillator is the high-frequency oscillator mentioned above.

The invention provides a high-frequency transmitting/receiving apparatus comprising:

a pair of parallel flat plate conductors arranged in parallel at a spacing of one half or less of a wavelength of a millimeter-wave signal;

a first dielectric guide disposed between the parallel flat plate conductors;

a mill-wave signal oscillator attached to the first dielectric guide and disposed between the parallel flat plate conductors, for outputting a mill-wave signal outputted from the high-frequency oscillator to the first dielectric guide;

a pulse modulator disposed between the parallel flat plate conductors so as to be midway of the first dielectric guide, for pulsating the millimeter-wave signal and outputting the pulsated signal as a transmission mill-wave signal via the first dielectric guide;

a second dielectric guide disposed between the parallel flat plate conductors, and disposed so that its one end is close to the first dielectric guide or joined at its one end to the first dielectric guide to obtain electromagnetic coupling, for propagating a portion of the mill-wave signal;

a circulator disposed between the parallel flat plate conductors, including ferrite plates disposed in parallel to the parallel plat plate conductors, and a first connecting portion, a second connecting portion and a third connecting portion arranged at a predetermined spacing on the peripheral edge portion of the ferrite plates, each acting as input/output terminals of the millimeter-wave signal, for outputting a millimeter-wave signal inputted from one of the connecting portions, from either one of the connecting portions adjacent to the one connecting portion clockwise or counter-clockwise in the planes of the ferrite plates, the first connecting portion being connected to the millimeter-wave signal output terminal of the first dielectric guide;

a third dielectric guide disposed between the parallel flat plate conductors and connected to the second connecting portion of the circulator, for propagating the millimeter-wave signal, the third dielectric guide having a transmitting antenna at its leading end portion;

a fourth dielectric guide disposed between the parallel flat plate conductors and having a receiving antenna at its leading end portion;

a fifth dielectric guide disposed between the parallel flat plate conductors and connected to the third connecting portion of the circulator, for propagating a received wave which is received and mixed by the transmitting antenna and attenuating the millimeter-wave signal at a non-reflective terminator disposed at its leading end portion;

a mixer disposed between the parallel flat plate conductors, arranged at another end portion of the fourth dielectric guide and configured so that either a midway of the second dielectric guide and a midway of the fourth dielectric guide are close to or joined to each other to obtain electromagnetic coupling, for mixing a portion of the transmitting millimeter-wave signal and the receiving-wave and generating the intermediate-frequency signal; and a non-reflective terminator disposed between the parallel flat plate conductors and connected to an end portion on opposite side of the mixer of the second dielectric guide, wherein the high-frequency oscillator of the millimeter-wave oscillator is the high-frequency oscillator mentioned above.

The invention provides a high-frequency transmitting/receiving apparatus comprising:

the high-frequency oscillator mentioned above;

a branching device connected to the output terminal of the high-frequency oscillator, for branching a high-frequency signal and outputting the branched high-frequency signal to one output terminal and the other output terminal;

a modulator connected to the one output terminal, for modulating the high-frequency signal branched to the one output terminal, and outputting the transmission high-frequency signal;

a circulator having a first terminal, a second terminal and a third terminal around a magnetic element, for outputting a high-frequency signal inputted from one of the terminals in the recited order, from a next terminal adjacent to the one terminal and inputting an output from the modulator to the first terminal;

a transmitting/receiving antenna connected to the second terminal of the circulator; and a mixer connected between the other output terminal of the branching device and the third terminal of the circulator, for mixing the high-frequency signal branched to the other output terminal and the high-frequency signal received by the transmitting/receiving antenna and outputting an intermediate-frequency signal.

The invention provides a high-frequency transmitting/receiving apparatus comprising:

the high-frequency oscillator mentioned above;

a branching device connected to the output terminal of the high-frequency oscillator, for branching a high-frequency signal and outputting the branched signals to one output terminal and the other output terminal;

a modulator connected to the one output terminal for modulating the high-frequency signal branched to the one output terminal, and outputting the transmission high-frequency signal;

an isolator having one end connected to the output terminal of the modulator, for transmitting the transmission high-frequency signal from one end side to the other end side;

a transmitting antenna connected to the isolator;

a receiving antenna connected to the other output terminal of the branching device; and a mixer connected between the other output terminal of the branching device and the receiving antenna, for mixing the high-frequency signal branched to the other output terminal and the high-frequency signal received by the receiving antenna and outputting an intermediate-frequency signal.

According to the invention, an isolator comprises a circulator having the first, second and third transmission lines for transmitting the high-frequency signal which are connected radially with the peripheral edge portion of the magnetic element by the first, second and third connecting portions, respectively, the circulator outputting a high-frequency signal inputted from one of the connecting portions, from either one of the connecting portions adjacent to the one connecting portion and a non-reflective terminator having one end connected to the third connecting poriton and connected to the other end of the third transmission line. A line length of the third transmission line is set so that $\delta=\pm\pi$ in which $\delta$ is a phase difference at a center frequency between signals Wa, which is a millimeter-wave signal portion reflected via the third transmission line on the non-reflective terminator and returned to leak to the first transmission line, and Wb, which is another millimeter-wave signal portion having leaked from the second transmission line through the circulator to the first transmission line. Therefore, the phase difference $\delta$ between the signals Wa and Wb is expressed by $\delta=\pm\pi$. Even when the advancement of the phase of the high-frequency signal changed at the time when the high-frequency signal is reflected on the non-reflective terminator, the two high-frequency signal portions to leak to the first transmission line can be reliably reversed to just opposite phases to cancel each other effectively, so that the isolation characteristics can be made satisfactory.

According to the invention, an isolator of the invention comprises first and second circulators each having first, second and third transmission lines for transmitting the millimeter-wave signal which are radially connected to a peripheral edge portion of a magnetic element by first, second and third connecting portions, respectively, the circulators each outputting a millimeter-wave signal inputted from one of the connecting portions, from either one of the connecting portions adjacent to the one connecting portion, the circulators being so connected that the second transmission line of the first circulator acts as the first transmission line of the second circulator; and non-reflective terminators each having an end connected to the third connecting portion, the non-reflective terminators each being connected to the other end of the third transmission line. Frequency dependency of the isolation characteristics between a high-frequency signal transmitted from the first transmission line to the second transmission line and a high-frequency signal transmitted from the second transmission line to the first transmission line of the first circulator is different from frequency dependency of isolation characteristics between a high-frequency signal to transmit from the first transmission line to the second transmission line and a high-frequency to transmit from the second transmission line to the first transmission line of the second circulator. Therefore, the isolation can be taken without being distorted only to a specific frequency. As a result, the frequencies, at which the first and second circulators take the maximum isolation, can be set to different values thereby to make the frequency band width, for which an isolation at a predetermined or higher value is retained, wider than that of the case, in which the first and second circulators take the maximum isolation.

Further, according to the invention, a line length of the third transmission line of each of the first and second circulators is set so that $\delta=\pm\pi$ in which $\delta$ is a phase difference at a center frequency between signals Wa, which is a high-frequency signal portion reflected via the third transmission line on the non-reflective terminator and returned to leak to the first transmission line, and Wb, which is another high-frequency signal portion having leaked from the second transmission line through the circulator to the first transmission line. Then, the phase difference $\delta$ between the signals Wa and Wb is $\delta=\pm\pi$. Even when the advancements of the phases of the high-frequency signals at the time when the high-frequency signals are reflected on the non-reflective terminator, the aforementioned two high-frequency signal portions to leak to the first transmission line are reliably reversed in phase so that the signal portions can effectively cancel each other. Thereby, the isolation characteristics can be made satisfactory.

According to the invention, the frequency dependency of the isolation characteristics between the high-frequency signal to be transmitted from the inputting dielectric guide to the outputting dielectric guide and the high-frequency signal to be transmitted from the outputting dielectric guide to the inputting dielectric guide of the first circulator is different from the frequency dependency of the isolation characteristics between the high-frequency signal to be transmitted from the inputting dielectric guide to the outputting dielectric guide and the high-frequency signal to be transmitted from the outputting dielectric guide to the inputting dielectric guide of the second circulator. Accordingly, the isolation can be taken without any distortion to only the specific frequency. The frequencies, at which the first and second circulators take the maximum isolation, are set to different values so that the frequency band width for retaining the isolation at the predetermined or higher value can be made wider than that of the case, in which the frequencies for the first and second circulators to take the maximum isolation are set to equal values. As a result, the millimeter-wave signal returned to the high-frequency oscillator can be sufficiently suppressed over a wide frequency range so that a stable oscillation can be attained. In case the operating frequency range is restricted, on the other hand, the isolation can be taken within the operating frequency range without being distorted to only a specific frequency, as compared with the case, in which the frequencies for the first and second circulators to take the maximum isolation are set equal. Thus, the predetermined value of the isolation to be retained can be set high so that stable oscillations can be attained even in case a factor for unstable oscillations as caused by the pulsating millimeter-wave signal returned to the high-frequency oscillator is added.

Further, according to the invention, in a case where the frequency dependency is adjusted by making different at least one of the spacing and the size of the two ferrite plates between the first circulator and the second circulator, the transmission characteristics from the inputting dielectric guide to the outputting dielectric guide of each circulator are not deteriorated, unlike the case of adjusting the size or transmission characteristics of the inputting dielectric guide or the outputting dielectric guide, so that the isolation can be adjusted while keeping the transmission characteristics satisfactory. The frequencies, at which the first and second circulators take the maximum isolation, are set to different values so that the frequency band width for retaining the isolation at the predetermined or higher value can be made wider than that of the case, in which the frequencies for the first and second circulators to take the maximum isolation are set to equal values. The millimeter-wave signal to be returned to the high-frequency oscillator is sufficiently suppressed over a wide frequency range. Moreover, the transmission characteristics from the inputting dielectric guide to the outputting dielectric guide are satisfactory so that a stable oscillation can be attained. In case the operating frequency range is to be restricted, the isolation can be finely adjusted within that operating frequency range without being distorted to only the specific frequency, while eliminating the factors for the characteristic fluctuation due to the positional displacement at the assembling time. Thus, the predetermined value of the isolation to be retained can be set high so that stable oscillations can be attained even in case a factor for unstable oscillations as caused by the pulsating millimeter-wave signal returned to the high-frequency oscillator is added.

Even after the assembly, moreover, the ferrite plates can be easily replaced by others while the causes for the characteristic fluctuation at the assembly being suppressed by a similar method. Even after the assembly, therefore, the isolation characteristics can be easily changed or adjusted by replacing the ferrite plates.

According to the invention, the high-frequency oscillator comprises the isolator mentioned above, and the voltage-controlled oscillator connected to the input terminal of the isolator for generating the high-frequency signal, so that the isolator has satisfactory isolation characteristics. Therefore, the isolator can sufficiently attenuate the unstable high-frequency signal returned to the voltage-controlled oscillator. It is, therefore, possible to generate the high-frequency signal in a satisfactory oscillation output.

Further, according to the invention, the high-frequency oscillator of the millimeter-wave oscillator is the high-frequency oscillator of the invention mentioned above. Therefore, even when the oscillation frequency of the high-frequency oscillator is changed by the operating environmental temperature, the mill-wave signal returned to the high-frequency oscillator can be sufficiently suppressed to keep the satisfactory oscillation state. Even in case the operating environmental temperature changes, therefore, the high-frequency oscillator can be stably operated. Even in case the millimeter-wave oscillation output is to be further pulse-modulated, moreover, the high-frequency oscillator can be stably operated to provide a high performance thereby to enhance the radar detection precision and the discrimination precision when the transmitter-receiver is applied to the millimeter-wave radar or the like.

According to the invention, the high-frequency transmitter-receiver comprises the high-frequency oscillator mentioned above; a branching device connected to the output terminal of the high-frequency oscillator for branching a high-frequency signal and outputting the branched high-frequency signals to one output terminal and the other output terminal; a modulator connected to the one output terminal for modulating the high-frequency signal branched to the one output terminal, and outputting the transmission high-frequency signal; a circulator having a first terminal, a second terminal and a third terminal around a magnetic element, for outputting the high-frequency signal inputted from one of the terminals in the recited order, from a next terminal adjacent to the one terminal and inputting the output from the modulator to the first terminal; a transmitting/receiving antenna connected to the second terminal of the circulator; and a mixer connected between the other output terminal of the branching device and the third terminal of the circulator for mixing the high-frequency signal branched to the other output terminal and the high-frequency signal received by the transmitting/receiving antenna thereby and outputting an intermediate-frequency signal. Therefore, even with the high-frequency signal reflected on the individual components and returned to the high-frequency oscillator with various phases or intensities because of different transmission distances, therefore, the high-frequency oscillator can output the high-frequency signal stable in the satisfactory oscillation output. Thus, the high-frequency oscillator has a high performance capable of transmitting the high-frequency signal which can be easily discriminated on the reception side.

According to the invention, the high-frequency transmitter-receiver comprises the high-frequency oscillator mentioned above; a branching device connected to the output terminal of the high-frequency oscillator, for branching a high-frequency signal and outputting the branched signals to one output terminal and the other output terminal; a modulator connected to the one output terminal for modulating the high-frequency signal branched to the one output terminal, and outputting the transmission high-frequency signal; an isolator having one end connected to the output terminal of the modulator, for transmitting the transmission high-frequency signal from one end side to the other end side; a transmitting antenna connected to the isolator; a receiving antenna connected to the other output terminal of the branching device; and a mixer connected between the other output terminal of the branching device and the receiving antenna, for mixing the high-frequency signal branched to the other output terminal and the high-frequency signal received by the receiving antenna and outputting the intermediate-frequency signal. Therefore, also in the high-frequency transmitter/receiver having antennas separately for transmission/reception, even with the high-frequency signal reflected on the individual components and returned to the high-frequency oscillator with various phases or intensities because of different transmission distances, therefore, the high-frequency oscillator can output the high-frequency signal stable in the satisfactory oscillation output. Thus, the high-frequency oscillator has a high performance capable of transmitting the high-frequency signal which can be easily discriminated on the reception side.

Further, the inventors have found out such problems because the isolation between the two input terminals of the mixer is usually smaller than the isolation of the modulator in the OFF state. Even in case the modulator and the mixer are thus characterized, we have found out that those problems can be simply solved in case either the line length between the branching device and the modulator or between the branching device on the mixer side and the modulator or the branching ratio of the branching device is properly set. Here will be explained the reason why the isolation between the two input terminals of the mixer takes the aforementioned tendency. The isolation between the two input terminals of the mixer depends on the operating condition such as the bias current to be fed to the mixer so that the isolation characteristics between the two input terminals of the mixer do not always become the best under the operating condition of the mixer for the best reception characteristics of the mixer.

The invention provides a high-frequency transmitter-receiver comprising:
 a high-frequency oscillator for generating a high-frequency signal;
 a branching device connected to the high-frequency oscillator, for branching a high-frequency signal and outputting the branched high-frequency signals to one output terminal and the other output terminal;
 a modulator connected to the one output terminal, for modulating the high-frequency signal branched to the one output terminal and outputting the transmission high-frequency signal;
 a circulator having a first terminal, a second terminal and a third terminal around a magnetic element, for outputting a high-frequency signal inputted from one of the terminals in the recited order, from a next terminal adjacent to the one terminal and inputting an output from the modulator to the first terminal;
 a transmitting/receiving antenna connected to the second terminal of the circulator; and
 a mixer connected between the other output terminal of the branching device and the third terminal of the circulator, for mixing the high-frequency signal branched to the other output terminal and the high-frequency signal received by the transmitting/receiving antenna and outputting an intermediate-frequency signal,
 wherein a line length between the branching device and the modulator or a line length between the branching device on the side of the mixer and the modulator is set so that $\delta=\pm\pi$ in which $\delta$ is a phase difference at a center frequency between a signal $Wa_2$, which is a high-frequency signal which passes through the modulator in the OFF state, and a signal $Wb_2$, which is a high-frequency signal which passes the mixer and the circulator from the other output terminal of the branching device to the output terminal of the modulator and is reflected on the output terminal of the modulator.

The invention provides a high-frequency transmitter-receiver comprising:
 a high-frequency oscillator for generating a high-frequency signal;
 a branching device connected to the high-frequency oscillator, for branching a high-frequency signal and outputting the branched high-frequency signals to one output terminal and the other output terminal;
 a modulator connected to the one output terminal, for modulating the high-frequency signal branched to the one output terminal and outputting the transmission high-frequency signal;
 a circulator having a first terminal, a second terminal and a third terminal around a magnetic element, for outputting a high-frequency signal inputted from one of the terminals in the recited order, from a next terminal adjacent to the one terminal and inputting an output from the modulator to the first terminal;
 a transmitting/receiving antenna connected to the second terminal of the circulator; and
 a mixer connected between the other output terminal of the branching device and the third terminal of the circulator, for mixing the high-frequency signal branched to the other output terminal and the high-frequency signal received by the transmitting/receiving antenna and outputting an intermediate-frequency signal,
 wherein a branching ratio R of the branching device is expressed by $R=Pb_1/Pa_1$ (R: an real number of 0 or more) and is set to $R<1$, in which $Wa_1$ is a high-frequency signal to be outputted to one output terminal of the branching device, $Pa_1$ is an intensity thereof, $Wb_1$ is a high-frequency signal to be outputted to the other output terminal of the branching device and $Pb_1$ is an intensity thereof.

In the invention, the branching ratio R is set to $R=A_1/(B_1 \cdot B_2 \cdot B_3)$, in which $A_1$, $B_1$, $B_2$ and $B_3$ are a transmission coefficient of the high-frequency signal to transmit through the modulator in the OFF state, a transmission coefficient of the high-frequency signal to transmit between the two input terminals of the mixer, a transmission coefficient of the high-frequency signal to transmit between the third terminal and the first terminal of the circulator, and a reflection coefficient of the high-frequency signal to be reflected on the output terminal of the modulator, respectively.

Further, in the invention, either a line length between the one output terminal of the branching device and the modulator or a line length between the other output terminal of the branching device and the modulator through the mixer and the circulator is set so that $\delta=\pm\pi$ in which $\delta$ is a phase difference at a center frequency between a signal $Wa_2$, which is a high-frequency signal which passes through the modulator in the OFF state and a signal $Wb_2$, which is a high-frequency signal which passes through the mixer and the circulator from the other output terminal of the branching device to the output terminal of the modulator and is reflected on the output terminal of the modulator.

The invention provides a high-frequency transmitter-receiver comprising:
 first and second circulators each having a first terminal, a second terminal and a third terminal around a magnetic element, for outputting a high-frequency signal inputted from one of the terminals, from either one of the terminals adjacent to the one terminal in the recited order;
 a high-frequency oscillator connected to the first terminal of the first circulator, for generating a high-frequency signal;
 a modulator connected between the second terminal of the first circulator and the first terminal of the second circulator, for transmitting the high-frequency signal to the side of the second circulator or for reflecting the high-frequency signal to the first circulator in response to a pulse signal;

a transmitting/receiving antenna connected to the second terminal of the second circulator; and a mixer connected between the third terminal of the first circulator and the third terminal of the second circulator, for mixing the high-frequency signal reflected on the modulator and inputted from the third terminal of the first circulator and the high-frequency signal received by the transmitting/receiving antenna and inputted from the third terminal of the second circulator, and outputting an intermediate-frequency signal, wherein $\delta = \pm \pi$ in which $\delta$ is a phase difference at a center frequency between a signal Wa, which is a high-frequency signal which passes through the modulator in the OFF state, and a signal Wb, which is a high-frequency signal which passes the mixer and the second circulator from the third terminal of the first circulator to the output terminal of the modulator and is reflected on the output terminal of the modulator.

Further, in the invention, an attenuator or a variable attenuator is interposed between the first circulator and the mixer.

The invention provides a radar apparatus comprising:

a high-frequency transmitter-receiver mentioned above; and a range information detector for processing an intermediate-frequency signal outputted from the high-frequency transmitter-receiver and detecting range information to an objective.

The invention provides a radar-apparatus mounted vehicle comprising the radar apparatus mentioned above, wherein the radar apparatus is used for detecting the objective.

The invention provides a radar-apparatus mounted small-sized boat comprising the radar apparatus mentioned above, wherein the radar apparatus is used for detecting the objective.

According to the invention, the high-frequency transmitter-receiver comprises a high-frequency oscillator for generating a high-frequency signal; a branching device connected to the high-frequency oscillator, for branching the high-frequency signal and outputting the branched high-frequency signals to one output terminal and the other output terminal; a modulator connected to the one output terminal, for modulating the high-frequency signal branched to the one output terminal and outputting the transmission high-frequency signal; a circulator having a first terminal, a second terminal and a third terminal around a magnetic element, for outputting a high-frequency signal inputted from one of the terminals in the recited order, from a next terminal adjacent to the one terminal and inputting an output from the modulator to the first terminal; a transmitting/receiving antenna connected to the second terminal of the circulator; and a mixer connected between the other output terminal of the branching device and the third terminal of the circulator for mixing the high-frequency signal branched to the other output terminal and the high-frequency signal received by the transmitting/receiving antenna and outputting an intermediate-frequency signal. A line length between the branching device and the modulator or a line length between the branching device on the side of the mixer and the modulator is set so that $\delta = \pm \pi$ in which $\delta$ is a phase difference at a center frequency between a signal $Wa_2$, which is a high-frequency signal which passes through the modulator in the OFF state and a signal $Wb_2$, which is a high-frequency signal which passes the mixer and the circulator from the other output terminal of the branching device to the output terminal of the modulator and is reflected on the output terminal of the modulator. The signals $Wa_2$ and $Wb_2$ are synthesized in opposite phases between the output terminal of the pulse modulator and the circulator so that they cancel each other and effectively attenuate. Therefore, when the pulse modulator is OFF, the transmission of the portion of the transmission high-frequency signal as the unnecessary signal is suppressed, thereby to provide a high-frequency transmitter-receiver of a high performance capable of enhancing the transmission/reception performance.

According to the invention, the high-frequency transmitter-receiver comprises a high-frequency oscillator for generating the high-frequency signal; a branching device connected to the high-frequency oscillator for branching a high-frequency signal and outputting the branched high-frequency signals to one output terminal and the other output terminal; a modulator connected to the one output terminal for modulating the high-frequency signal branched to the one output terminal and outputting the transmission high-frequency signal; a circulator having a first terminal, a second terminal and a third terminal around a magnetic element, for outputting a high-frequency signal inputted from one of the terminals in the recited order, from a next terminal adjacent to the one terminal and inputting an output from the modulator to the first terminal; a transmitting/receiving antenna connected to the second terminal of the circulator; and a mixer connected between the other output terminal of the branching device and the third terminal of the circulator, for mixing the high-frequency signal branched to the other output terminal and the high-frequency signal received by the transmitting/receiving antenna and outputting the intermediate-frequency signal. The branching ratio R of the branching device is expressed by $R = Pb_1/Pa_1$ (R: an real number of 0 or more) and is set to R<1, in which $Wa_1$ is a high-frequency signal to be outputted to one output terminal of the branching device, $Pa_1$ is an intensity thereof, $Wb_1$ is a high-frequency signal to be outputted to the other output terminal of the branching device and $Pb_1$ is an intensity thereof. Therefore, even when the isolation between the two input terminals of the mixer is worse than the isolation of the modulator in the OFF state, the branching device outputs the high-frequency signal of a low intensity to the side of the other output terminal rather than the side of one output terminal, thereby to lower the intensity of the high-frequency signal to pass through the mixer and the circulator to the output terminal of the modulator. Therefore, it is possible to reduce the intensity of the high-frequency signal which is reflected from the side of the mixer through the circulator on the output terminal of the modulator. Moreover, this intensity of the high-frequency signal can be made as equal to that of the high-frequency signal to pass through the modulator in the OFF state, so that those high-frequency signals can interfere and attenuate each other. By these operations, under the simple configuration, when the pulse modulator is OFF, the transmission of the portion of the transmission high-frequency signal as the unnecessary signal is suppressed, thereby to provide a high-frequency transmitter-receiver of a high performance capable of enhancing the transmission/reception performance.

According to the invention, the branching ratio R is set to $R = A_1/(B_1 \cdot B_2 \cdot B_3)$, which $A_1, B_1, B_2$ and $B_3$ are a transmission coefficient of the high-frequency signal to transmit through the modulator in the OFF state, a transmission coefficient of the high-frequency signal to transmit between the two input terminals of the mixer, a transmission coefficient of the high-frequency signal to transmit between the third terminal and the first terminal of the circulator, and a reflection coefficient of the high-frequency signal to be reflected on the output terminal of the modulator, respectively. In this case, the intensity of the high-frequency signal coming from the side of the mixer and reflected through the circulator on the output terminal of the modulator can be made as equal to that of the high-frequency signal to pass through the modulator in the OFF state, so that those high-frequency signals can interfere and attenuate each other. When the pulse modulator is OFF, therefore, the transmission of the portion of the transmission high-frequency signal as the unnecessary signal is further suppressed, thereby to provide a high-frequency transmitter-receiver of a high performance capable of enhancing the transmission/reception performance.

Moreover, according to the invention, when either a line length between the one output terminal of the branching device and the modulator or a line length between the other output terminal of the branching device and the modulator through the mixer and the circulator is set so that $\delta=\pm\pi$ in which $\delta$ is a phase difference at a center frequency between a signal $Wa_2$, which is a high-frequency signal which passes through the modulator in the OFF state and a signal $Wb_2$, which is a high-frequency signal which passes through the mixer and the circulator from the other output terminal of the branching device to the output terminal of the modulator and is reflected on the output terminal of the modulator. Those signals $Wa_2$ and $Wb_2$ are synthesized in opposite phases between the output terminal of the modulator and the circulator so that they cancel and attenuate each other most effectively. When the pulse modulator is OFF, therefore, the transmission of the portion of the transmission high-frequency signal as the unnecessary signal is further effectively suppressed, thereby to provide a high-frequency transmitter-receiver of a high performance capable of enhancing the transmission/reception performance.

According to the invention, the high-frequency transmitter-receiver comprises first and second circulators each having a first terminal, a second terminal and a third terminal around a magnetic element, for outputting a high-frequency signal inputted from one of the terminals adjacent to the one terminal in the recited order; a high-frequency oscillator connected to the first terminal of the first circulator, for generating a high-frequency signal; a modulator connected between the second terminal of the first circulator and the first terminal of the second circulator, for transmitting the high-frequency signal to the side of the second circulator or for reflecting that high-frequency signal to the first circulator in response to a pulse signal; the transmitting/receiving antenna connected to the second terminal of the second circulator; and the mixer connected between the third terminal of the first circulator and the third terminal of the second circulator, for mixing the high-frequency signal reflected on the modulator and inputted from the third terminal of the first circulator and the high-frequency signal received by the transmitting/receiving antenna and inputted from the third terminal of the second circulator, and outputting an intermediate-frequency signal. In the high-frequency transmitter-receiver, $\delta=\pm\pi$ in which $\delta$ is a phase difference at a center frequency between a signal Wa, which is a high-frequency signal which passes through the modulator in the OFF state and a signal Wb, which is a high-frequency signal which passes the mixer and the second circulator from the third terminal of the first circulator to the output terminal of the modulator and is reflected on the output terminal of the modulator. Those signals Wa and Wb are synthesized in opposite phases between the output terminal of the modulator and the second circulator so that they cancel and attenuate each other effectively. When the pulse modulator is OFF, therefore, the transmission of the portion of the transmission high-frequency signal as the unnecessary signal is suppressed, thereby to provide a high-frequency transmitter-receiver of a high performance capable of enhancing the transmission/reception performance. While the modulator is outputting the transmission high-frequency signal, the first circulator and the modulator are associated to act not to input the local signal to the mixer. A portion of the transmission high-frequency signal may leak from the first terminal of the second circulator to the third terminal due to the shortage or the like of the isolation of the second circulator. Even with this leakage, the mixer hardly outputs the intermediate-frequency signal corresponding to the high-frequency signal having leaked so that the reception performance can be enhanced. Thus, the high-frequency transmitter-receiver is improved not only in the transmission system but also in the reception system.

According to the invention, when an attenuator or a variable attenuator is interposed between the first circulator and the mixer, even when the isolation between the two input terminals of the mixer is worse than the isolation of the modulator in the OFF state, the attenuator or the variable attenuator lowers the intensity of the high-frequency signal to pass through the mixer and the second circulator to the output terminal of the modulator. Therefore, it is possible to reduce the intensity of the high-frequency signal which is reflected from the side of the mixer through the second circulator on the output terminal of the modulator. Moreover, this intensity of the high-frequency signal can be made as equal to that of the high-frequency signal to pass through the modulator in the OFF state, so that those high-frequency signals can interfere each other more effectively in opposite phases thereby to attenuate each other. By these operations, when the pulse modulator is OFF, therefore, the transmission of the portion of the transmission high-frequency signal as the unnecessary signal is suppressed, thereby to provide a high-frequency transmitter-receiver of a high performance capable of enhancing the transmission/reception performance.

As described above, according to the invention, with the individual configurations of the high-frequency transmitter-receiver mentioned above it is possible to prevent a portion of the transmission high-frequency signal from being transmitted as the unnecessary signal when the pulse modulator is OFF, and to enhance the transmission/reception performance with the simple configuration thereby to enhance the ON/OFF ratio of the transmission output.

According to the invention, the radar apparatus comprises the third high-frequency transmitter-receivers, and a range information detector for processing an intermediate-frequency signal to be outputted from the high-frequency transmitter-receiver and detecting the range information to the objective. Therefore, the high-frequency transmitter-receiver transmits the satisfactory high-frequency signal having a high ON/OFF ratio of the transmission output. Thus, the radar apparatus can detect the objective rapidly and reliably even in case the range to the objective is short or long.

According to the invention, the radar-apparatus mounted vehicle includes the radar apparatus mentioned above, in which the radar apparatus is used for detecting the objective. Therefore, the radar apparatus can detect the objective such as another vehicle or the obstacle on the road rapidly and reliably so that the apparatus can allow a proper control of the vehicle and can give a proper warning to the driver without causing an abrupt behavior in the vehicle for avoiding another vehicle or the obstacle.

According to the invention, the radar-apparatus mounted small-sized boat includes the radar apparatus of the invention, in which the radar apparatus is used for detecting the objective. Therefore, the radar apparatus can detect the objective such as another vehicle or the obstacle on the road rapidly and reliably so that the apparatus can allow a proper control of the vehicle and can give a proper warning to the driver without causing an abrupt behavior in the vehicle for avoiding another vehicle or the obstacle.

BRIEF DESCRIPTION OF THE DRAWINGS

Other and further objects, features, and advantages of the invention will be more explicit from the following detailed description taken with reference to the drawing wherein:

FIGS. 1A and 1B are schematic views showing a transmitting/receiving antenna of a first embodiment of the invention, of which FIG. 1A is a top plan view and FIG. 1B a sectional view A-A';

FIGS. 2A and 2B are schematic views showing a transmitting/receiving antenna of a second embodiment of the invention, of which FIG. 2A is a top plan view and FIG. 2B a sectional view B-B';

FIG. 3 is a schematic diagram showing a dependency of isolation characteristics of the transmitting/receiving antenna, as shown in FIGS. 1A and 1B or FIGS. 2A and 2B, upon a phase difference δ;

DETAILED DESCRIPTION OF THE PREFERRED EMBODIMENTS

Figure 1A:
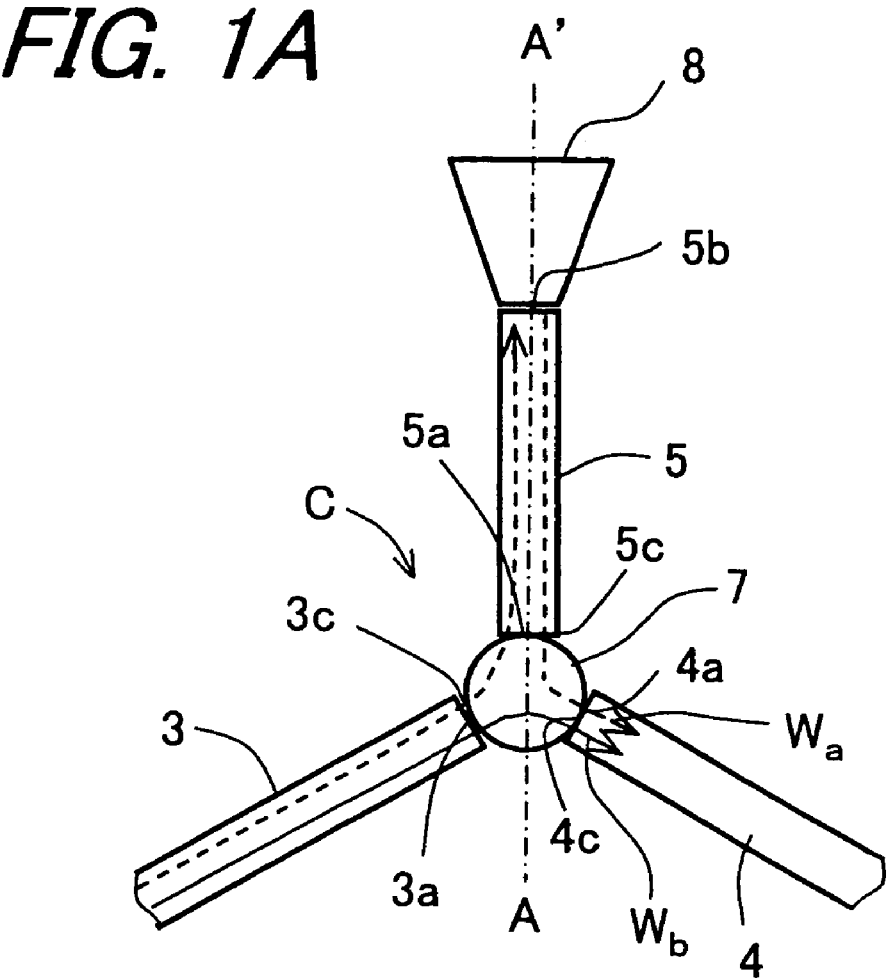

Now referring to the drawings, preferred embodiment of the invention are described below.

A transmitting/receiving antenna of the invention and a millimeter-wave transmitter-receiver of the invention using the antenna will be described in detail in connection with the case, in which the antenna and the transmitter-receiver are used in a millimeter-wave radar.

Figure 1B:
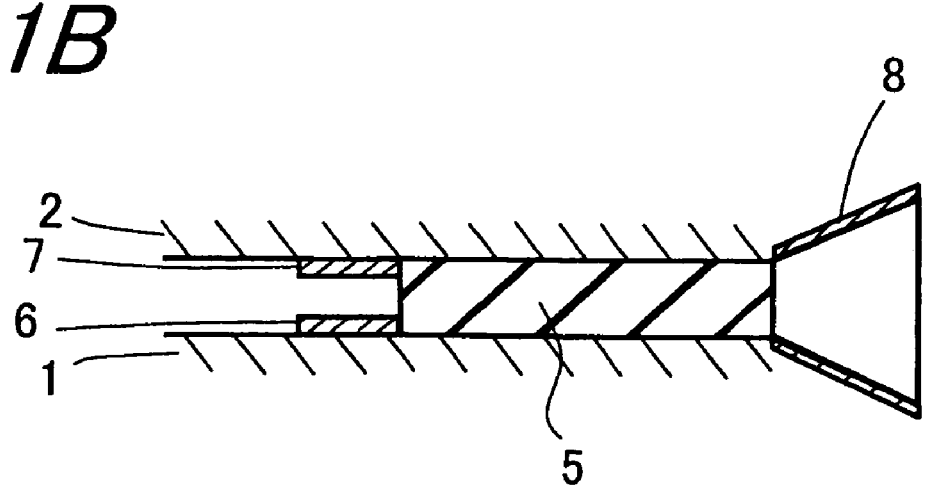
Figure 2A:
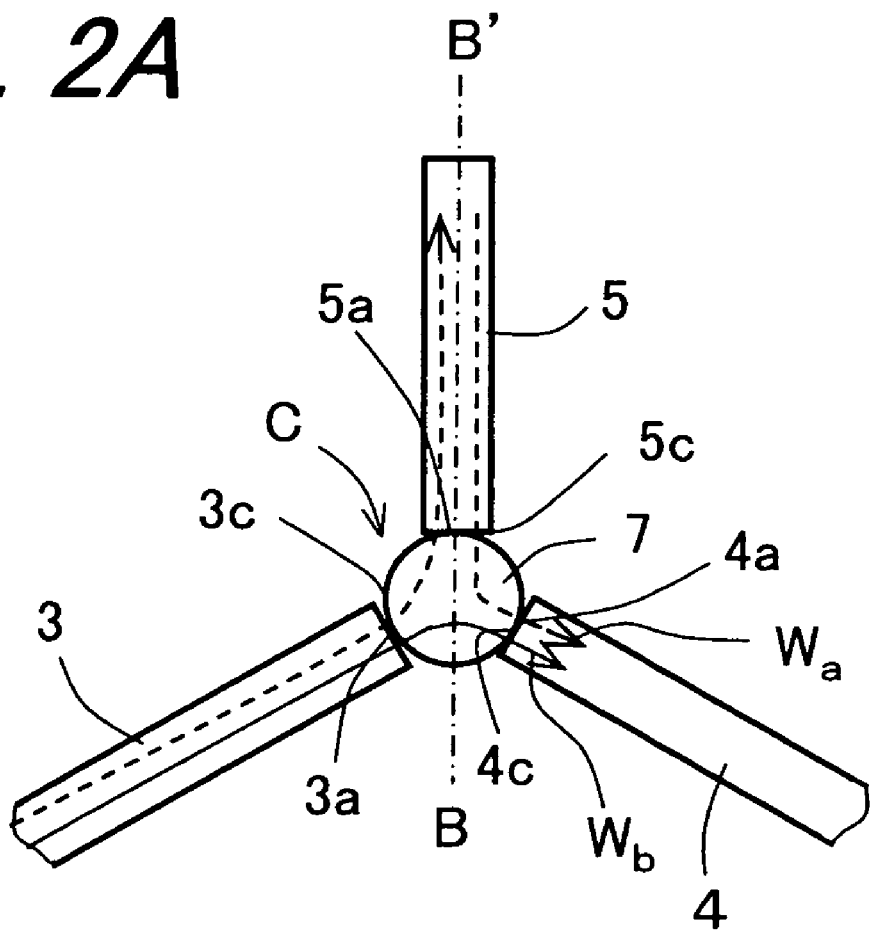
Figure 2B:
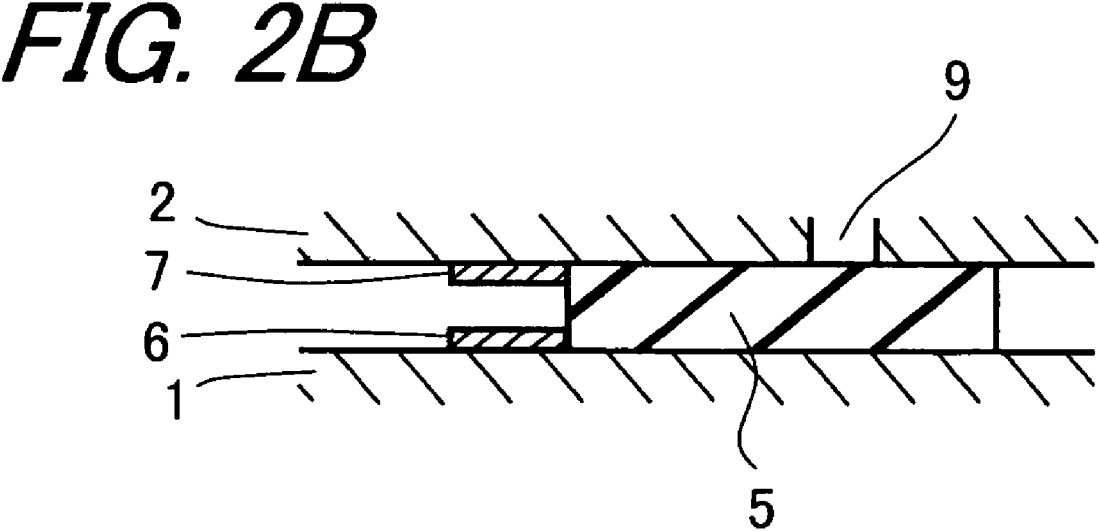
Figure 4:
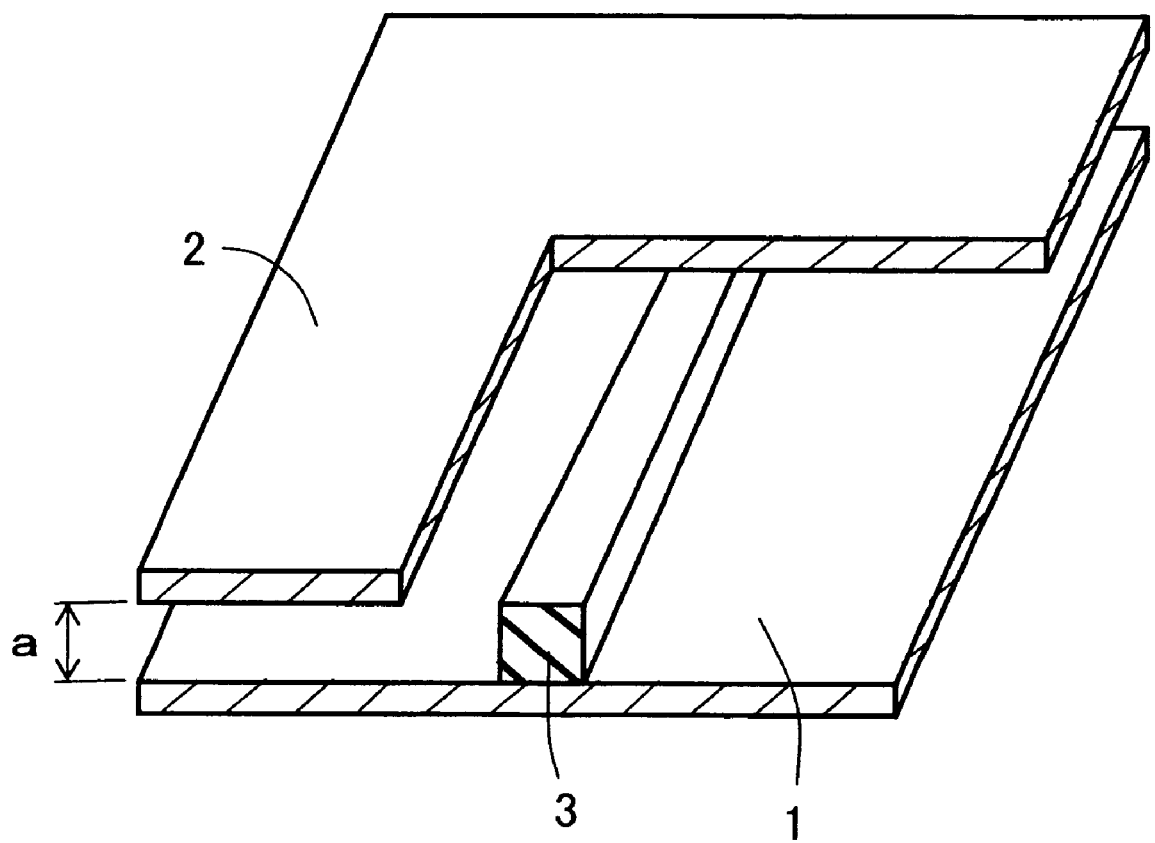
FIG. 4 is a partially broken perspective view showing a fundamental configuration of a non-radiative dielectric waveguide.
Figure 5:
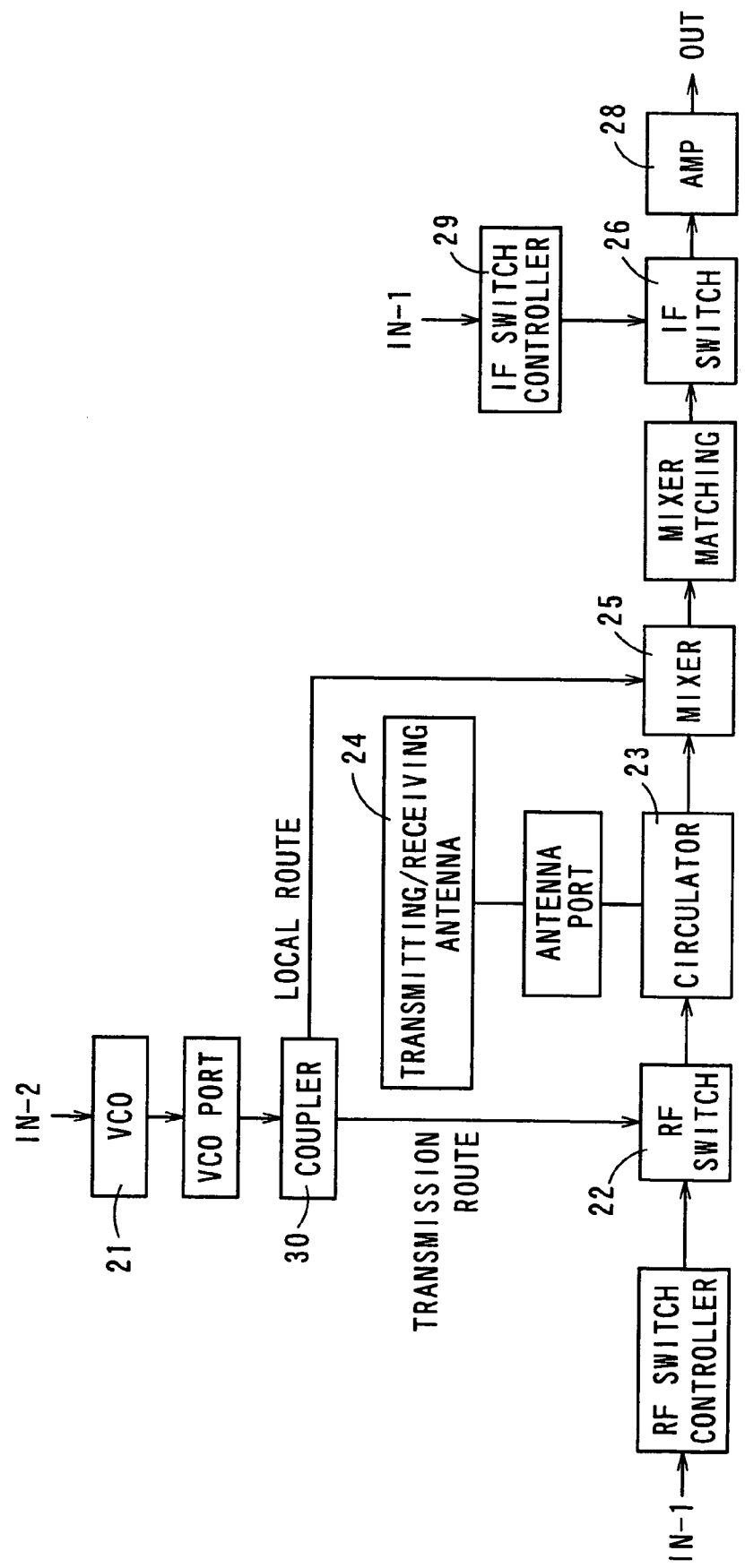
FIG. 5 is a block circuit diagram showing a configuration of a millimeter-wave signal transmitter and an intermediate-frequency signal transmitter of one mode of embodiment of the case, in which the millimeter-wave transmitter-receiver of a third embodiment of the invention is applied to a millimeter-wave radar.
Figure 6:
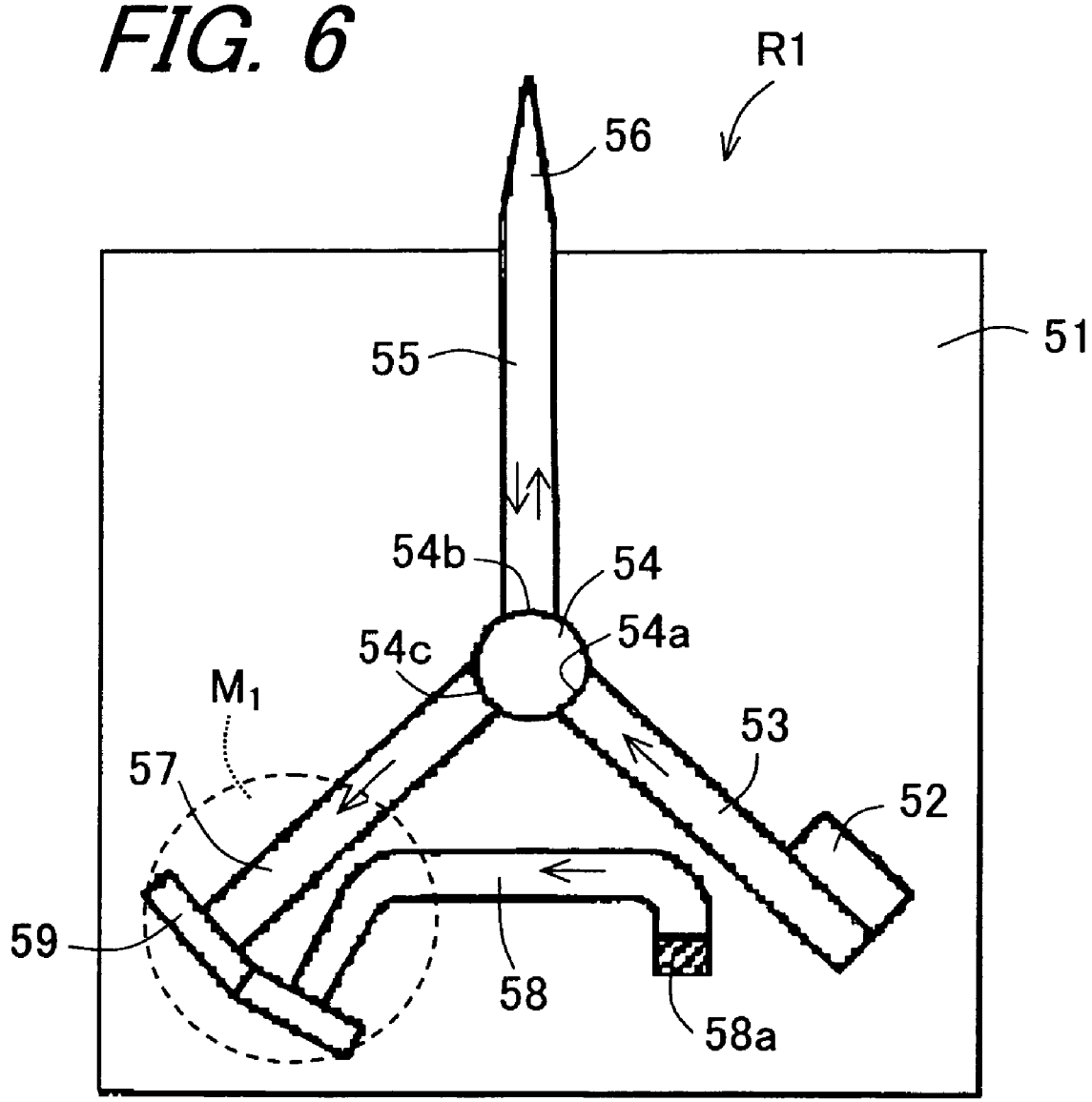
FIG. 6 is a top plan view of a millimeter-wave transmitter-receiver having a transmitting/receiving antenna.
Figure 7:
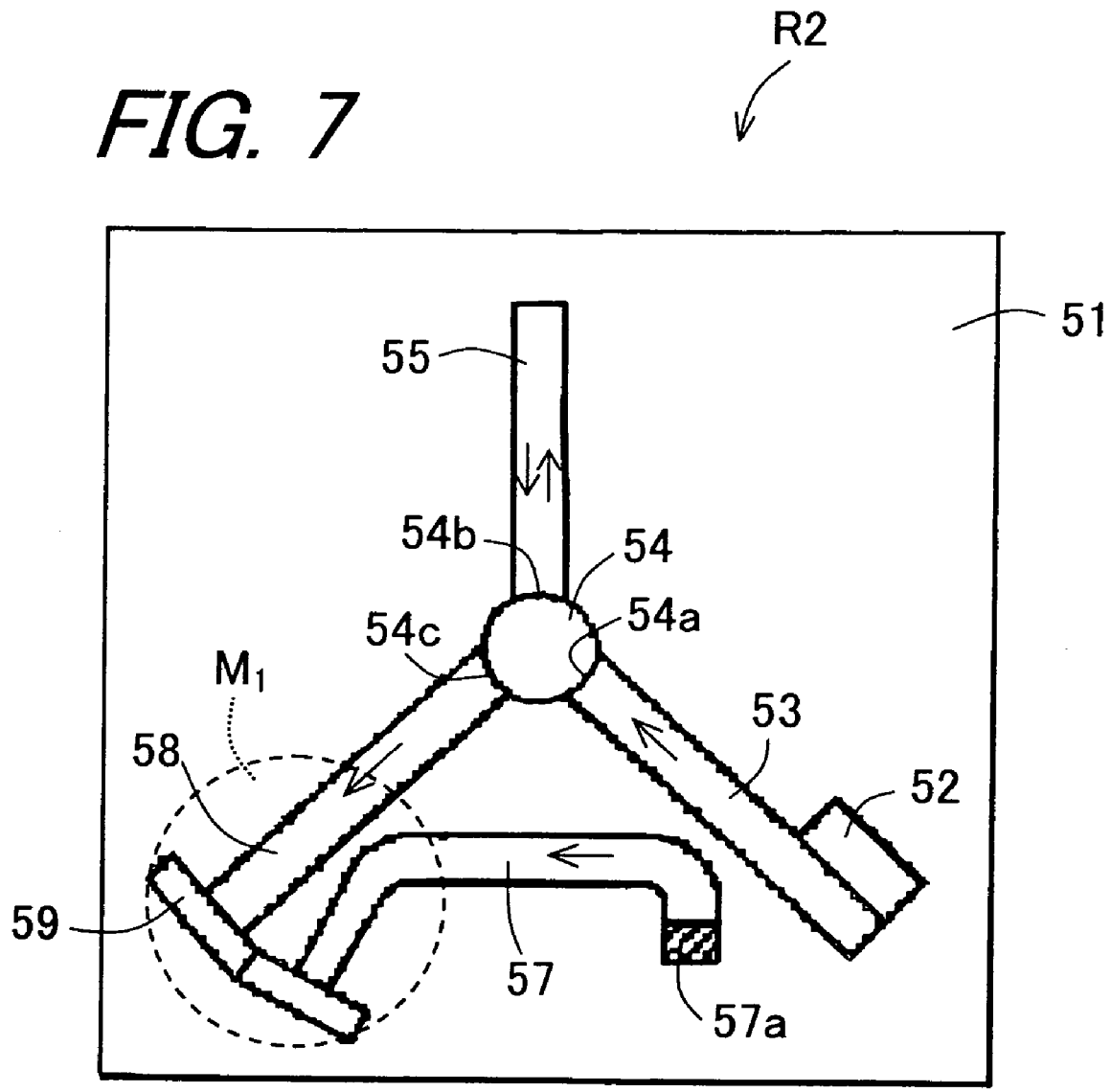
FIG. 7 is a schematic top plan view showing a millimeter-wave transmitter-receiver of a fourth embodiment of the invention.
Figure 8:
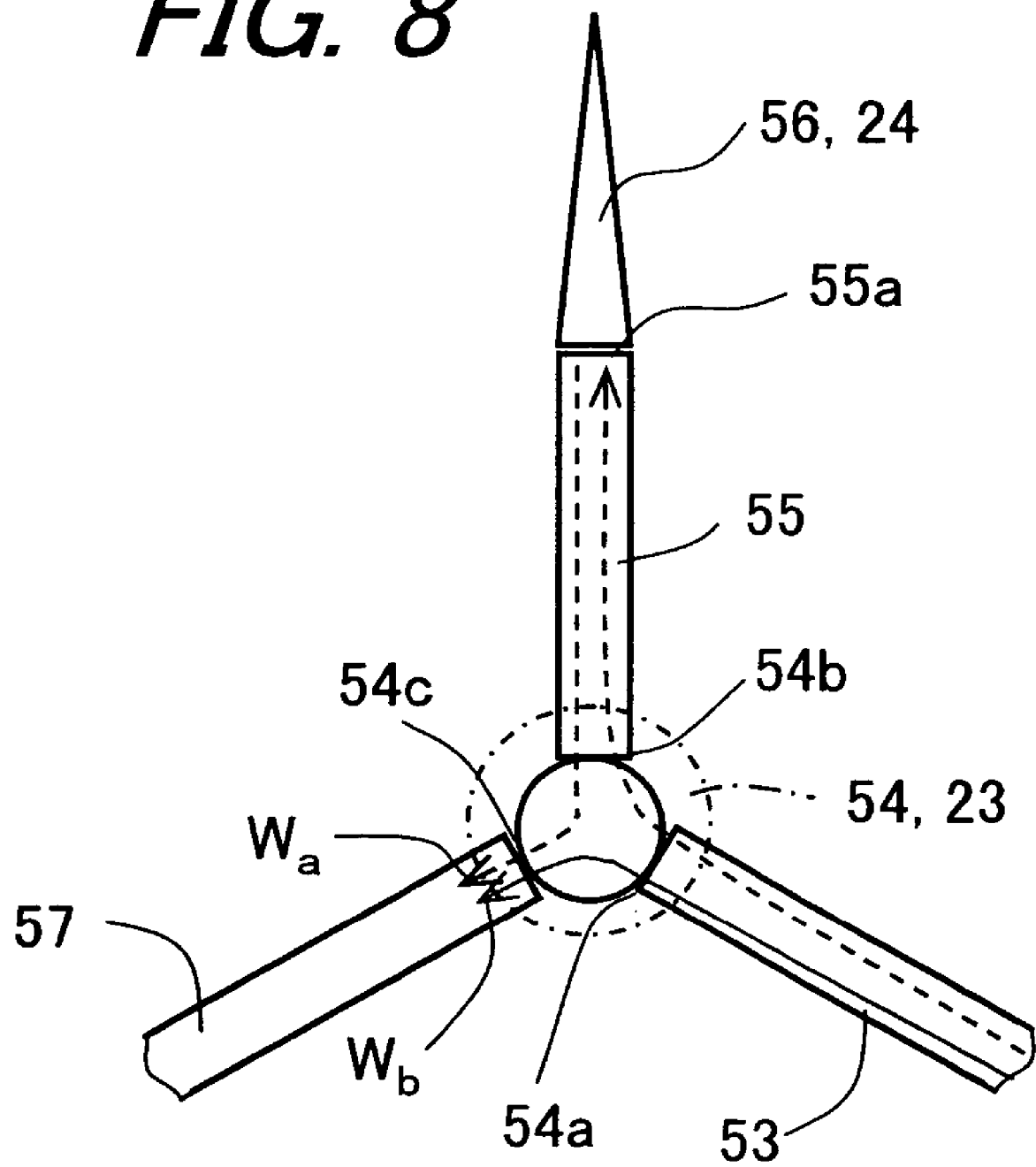
FIG. 8 is a partially enlarged top plan view of a vicinity of a third dielectric guide in FIG. 6 in the millimeter-wave transmitter-receiver of the invention.
Figure 9:
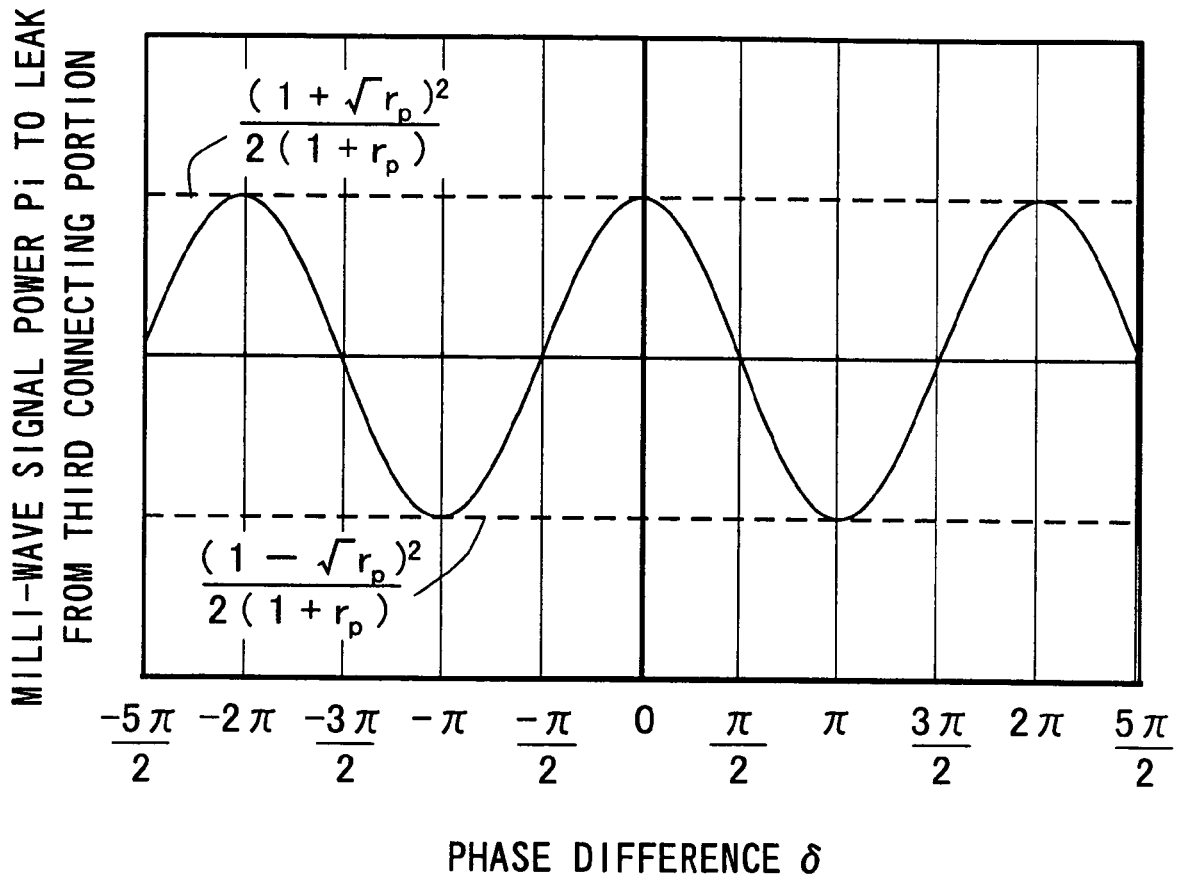
FIG. 9 is a graph showing a variation of the output intensity of a millimeter-wave signal by a phase difference δ at the time when a millimeter-wave signal Wa reflected via a third dielectric guide on an antenna or leading end portion of the third dielectric guide and returned to leak to a third connecting portion, and another millimeter-wave signal portion Wb having leaked from a first connecting portion through a circulator to the third connecting portion, interfere each other and are synthesized.

Of FIGS. 1A and 1B presenting schematic views showing a transmitting/receiving antenna of a first embodiment of the invention, FIG. 1A is a top plan view, and FIG. 1B is a sectional view A-A'. Of FIGS. 2A and 2B presenting schematic views showing a transmitting/receiving antenna of a second embodiment of the invention, FIG. 2A is a top plan view, and FIG. 2B is a sectional view B-B'. FIG. 3 is a diagram showing a dependency of the isolation characteristics of the transmitting/receiving antenna, as shown in FIGS. 1A and 1B or FIGS. 2A and 2B, upon a phase difference δ. FIG. 4 is a partially broken schematic perspective view showing a fundamental construction of a non-radiative dielectric waveguide. FIG. 5 is a block circuit diagram showing a configuration of a millimeter-wave signal transmitter and an intermediate-frequency signal transmitter of one mode of embodiment of the case, in which the millimeter-wave transmitter-receiver of a third embodiment of the invention is applied to a millimeter-wave radar. FIG. 6 is a top plan view of a millimeter-wave transmitter-receiver having a transmitting/receiving antenna. FIG. 7 is a top plan view schematically showing a millimeter-wave transmitter-receiver of a fourth embodiment of the invention. FIG. 8 is a partially enlarged top plan view of the vicinity of a third dielectric guide in FIG. 6. FIG. 9 is a graph showing a variation of the output intensity of a millimeter-wave signal by the phase difference δ at the time when a millimeter-wave signal portion Wa reflected via the third dielectric guide on the antenna or the leading end portion of the third dielectric guide and returned to leak to the third connecting portion, and another millimeter-wave signal portion Wb having leaked from the first connecting portion through a circulator to the third connecting portion, interfere each other and are synthesized.

In FIGS. 1A, 1B, 2A, 2B, 3 and 4, reference numerals 1 and 2 denote parallel flat plate conductors, and reference numerals 3, 4 and 5 denote dielectric guides, i.e., first, second and third dielectric guides acting as transmission lines. Reference numerals 6 and 7 denote ferrite plates as magnetic elements; reference numeral 8 denotes an antenna; and reference numeral 9 denotes a through hole formed in the parallel flat plate conductor 2. Reference numerals 3a, 4a and 5a denote the respective one-ends of the first, second and third dielectric guides 3, 4 and 5, and reference numeral 5b denotes the other end of the third dielectric guide 5. Reference numerals 3c, 4c and 5c denote the first, second and third connecting portions, respectively. The reference letters Wa and Wb denote the millimeter-wave signal, which is reflected on the antenna 8 or the through hole 9 and returned to leak from the third dielectric guide 5 to the second dielectric guide 4, and the millimeter-wave signal which leaks from the first dielectric guide 3 to the second dielectric guide 4, respectively. The parallel flat plate conductors 1 and 2 are not shown in FIG. 1A and FIG. 2A. In FIGS. 2A and 2B, there is shown neither the antenna to be attached to the through hole 9 nor a waveguide or a primary radiator, to which the antenna is connected.

In FIG. 5, reference numeral 21 denotes a millimeter-wave signal oscillator; reference numeral 22 denotes a pulse modulator (RF switch); reference numeral 23 denotes a circulator; reference numeral 24 denotes an antenna; reference numeral 25 denotes a mixer; reference numeral 26 denotes a switch (IF switch); reference numeral 28 denotes an amplifier; reference numeral 29 denotes a timing generator; and reference numeral 30 denotes a coupler (directive coupler).

In FIG. 6 and FIG. 7, reference numeral 51 denotes a parallel flat plate conductor (i.e., a lower one of a pair of the parallel flat plate conductors); reference numeral 52 denotes a millimeter-wave signal oscillator; reference numeral 53 denotes a first dielectric guide; reference numeral 54 denotes a circulator; reference numeral 55 denotes a third dielectric guide; reference numeral 56 denotes an antenna; reference numeral 57 denotes a fourth dielectric guide; reference numeral 58 denotes a second dielectric guide; and reference numeral 59 denotes a mixer. Reference numerals 57a and 58a denote non-reflective terminators. The upper parallel flat plate conductor is not shown in FIG. 6 and FIG. 7.

The parallel flat plate conductors 1 and 2, the first dielectric guide 3, the second dielectric guide 4, the third dielectric guide 5 and the antenna 8 in FIGS. 1A and 1B correspond to the parallel flat plate conductor 51, the first dielectric guide 53, the fourth dielectric guide 57, the third dielectric guide 55 and the antenna 56 in FIG. 6, respectively. Moreover, the parallel flat plate conductors 1 and 2, the first dielectric guide 3, the second dielectric guide 4 and the third dielectric guide 5 in FIGS. 2A and 2B correspond to the parallel flat plate conductor 51, the first dielectric guide 53, the second dielectric guide 58 and the third dielectric guide 55 in FIG. 7, respectively.

The transmitting/receiving antenna of the first embodiment of the invention, as shown in FIGS. 1A and 1B, comprises the parallel flat plate conductors 1 and 2, a circulator C, and the antenna 8. The parallel flat plate conductors 1 and 2 are arranged at a spacing of one half or less of the wavelength of a millimeter-wave signal. The circulator C is disposed between the parallel flat plate conductors 1 adn2, and the two ferrite plates 6 and 7 are arranged to confront each other on the inner faces of the parallel flat plates 1 and 2. The first, second and third dielectric guides 3, 4 and 5 for inputting/outputting the millimeter-wave signal are radially connected to the peripheral edge portions of the two ferrite plates 6 and 7 by the first, second and third connecting portions 3c, 4c and 5c, respectively.

The circulator C outputs the millimeter-wave signal inputted to one connecting portion from another adjacent connecting portion. The antenna 8 is disposed between the parallel flat plate conductors 1 and 2, and connected to the other end 5b of the third dielectric guide 5 which is connected at its one end 5a to the third connecting portion 5c. In the transmitting/receiving antenna of the embodiment, the line length of the third dielectric guide 5 is set so that $\delta = \pm \pi$, in which δ is a phase difference at the center frequency between a signal Wa, which is a millimeter-wave signal reflected via the third dielectric guide 5 on the antenna 8 and returned to leak to the second connecting portion 4c, and a signal Wb, which is another millimeter-wave signal having leaked from the first connecting portion 3c through the circulator C to the second connecting portion 4c.

The transmitting/receiving antenna of the first embodiment of the invention, as shown in FIGS. 1A and 1B, like the transmitting/receiving antenna of the related art, the millimeter-wave signal outputted from the transmission system is transmitted from the antenna 8 after passed through the circulator C from the first dielectric guide 3 via the third dielectric guide 5. The millimeter-wave signal received by the antenna 8 is outputted from the third dielectric guide 5 via the second dielectric guide 4 to the reception system.

In the transmitting/receiving antenna of the first embodiment of the invention, however, the line length of the third dielectric guide 5 is set to $\delta = \pm \pi$ when the phase difference at the center frequency between the signals Wa and Wb is δ. Therefore, the millimeter-wave signal Wa to leak from the first dielectric guide 3 to the second dielectric guide 4 and the millimeter-wave signal Wb reflected on the antenna 8 and returned to leak from the third dielectric guide 5 to the second dielectric guide 4 are reliably reversed in phase so that the millimeter-wave signals Wa and Wb can be effectively weakened to interfere and cancel each other. As a result, the millimeter-wave signal to leak from the first dielectric guide 3 on the transmission system side to the second dielectric guide 4 on the reception system side can be suppressed to make the reception characteristic of the reception system satisfactory.

This will be described in detail with reference to the diagram shown in FIG. 3. First of all, the ratio of the intensity (unit: watt (W)) of the millimeter-wave signals (Wa+Wb) to leak from the first dielectric guide 3 to the second dielectric guide 4, to the intensity (having a watt (W)) of the millimeter-wave signal to be inputted to the first dielectric guide 3 is defined by an isolation, and the dependency of this isolation to the phase difference δ is defined as isolation characteristics. These isolation characteristics indicate that the millimeter-wave signals (Wa+Wb) to leak from the first dielectric guide 3 on the transmission system side to the second dielectric guide 4 on the reception system side is the lower for the smaller isolation.

FIG. 3 is a diagram schematically showing those isolation characteristics. The abscissa and the ordinate indicate the phase difference δ (unit: radian) and the isolation (having no unit), respectively, and the solid characteristic curve indicates the dependency of the isolation characteristics on the phase difference δ.

The isolation characteristics of the transmitting/receiving antenna shown in FIGS. 1A and 1B are borne such that the isolation varies according to A·cos δ (in which A is a proportional coefficient and a real number), as shown in the diagram in FIG. 3, and such that the isolation becomes the smallest when the phase difference 6 between the millimeter-wave signal Wa reflected by the antenna 8 and returned to leak from the third dielectric guide 5 to the second dielectric guide 4 and the millimeter-wave signal Wb to leak from the first dielectric guide 3 to the second dielectric guide 4 is ±π, ±3π, - - - , and (2N−1)·π (in which N is an integer).

In a case where the third dielectric guide 5 has such a line length as satisfies δ=±π, the value of (Wa+Wb) of the millimeter-wave signal to leak from the first dielectric guide 3 to the second dielectric guide 4 can be made the lowest in that configuration.

For these conditions, there is generally known a method for setting the line length of the third dielectric guide 5 to (2n−1)/4·λg (in which N represents an integer; and kg represents a wavelength of the millimeter-wave signal in the third dielectric guide 5). As a matter of fact, however, the reflection point of the millimeter-wave signal on the antenna 8 is seemingly different from the other end 5b of the third dielectric guide 5. In this case, therefore, the line length of the third dielectric guide 5 is set to the value of {(2n−1)/4·λg+L} which is corrected by a line length L from the value of {(2n−1)/4·λg}, the millimeter-wave signals (Wa+Wb) to leak from the first dielectric guide 3 to the second dielectric guide 4 can be made the lowest in that configuration. The reason why the apparent reflection point of the millimeter-wave signal on the antenna 8 is different from the position of the other end 5b of the third dielectric guide 5 is that the millimeter-wave signal advances or retards in phase when the millimeter-wave signal is reflected on the antenna 8.

In the transmitting/receiving antenna of the invention and the millimeter-wave transmitter-receiver of the invention, the value of {(2n−1)/4·λg+L} is not determined after the line length L was determined. In a more convenient method, the phase difference δ is measured, and the line length of the third dielectric guide 5 is so set that the phase difference δ may be δ=±π. Specifically, the line length of the third dielectric guide 5 may be set in the following manner.

The line length of the third dielectric guide 5 is set at first to {(2N−1)/4·λg}, and the test terminals of a network analyzer are individually connected to the input terminal (or the other end) of the first dielectric guide 3 and the output terminal (or the other end) of the second dielectric guide 4 thereby to measure the characteristics of transmission from the first dielectric guide 3 to the second dielectric guide 4. Next, the line length of the third dielectric guide 5 is set to a length varied from an initially set length, and the characteristics of transmission from the first dielectric guide 3 to the second dielectric guide 4 are measured by the same method for several ones of different lengths. Then, the measured values of the transmission characteristics are plotted on the diagram, as shown in FIG. 3, by taking the transmission characteristics on the ordinate, and by taking the line length of the third dielectric guide 5 on the abscissa. An approximate curve of A·cos θ is drawn on that plot so that the line length of {(2n−1)/4·λg+L} of the third dielectric guide 5 for the phase difference δ of δ=±π may be read from the minimum of that curve. Thus, the millimeter-wave signal Wb to leak from the first dielectric guide 3 to the second dielectric guide 4 and the millimeter-wave signal Wa reflected on the antenna 8 and returned to leak from the third dielectric guide 5 to the second dielectric guide 4 can be reliably made to have just the reversed phases. As a result, the millimeter-wave signal to leak from the first dielectric guide 3 on the transmission system side to the second dielectric guide 4 on the reception system side can be suppressed more than in the related art.

The transmitting/receiving antenna of a second embodiment of the invention, as shown in FIGS. 2A and 2B comprises the parallel flat plate conductors 1 and 2, the circulator C, and an antenna or a waveguide or a primary radiator connected to the antenna. The parallel flat plate conductors 1 and 2 are arranged at a spacing of one half or less of the wavelength of a millimeter-wave signal. The circulator C is disposed between the parallel flat plate conductors 1 and 2, and the two ferrite plates 6 and 7 are arranged to confront each other on the inner faces of the parallel flat plate conductors 1 and 2. The first, second and third dielectric guides 3, 4 and 5 for inputting/outputting the millimeter-wave signal are radially connected to the peripheral edge portions of the two ferrite plates 6 and 7 by the first, second and third connecting portions 3c, 4c, and 5c, respectively. The circulator C outputs the millimeter-wave signal inputted to one connecting portion from another adjacent connecting portion.

In the parallel flat plate conductor 2 on one side, a through hole 9 is formed at such a portion of the third dielectric guide 5 connected at its one end with the third connecting portion 5c as confronts the portion where the electric field of a standing wave in an LSM mode is high. The through hole 9 is connected to the antenna, or the waveguide tube or a primary radiator connected to the antenna. In the transmitting/receiving antenna of the embodiment, the length from the one end 5a of the third dielectric guide 5 to the portion confronting the through hole 9 is set so that δ=±π in which δ is a phase difference at the center frequency between a signal Wa, which is a millimeter-wave signal which was reflected via the third dielectric guide 5 on the through hole 9 and returned to leak to the second connecting portion 4c, and a signal Wb, which is another millimeter-wave signal portion which leaks from the first connecting portion 3c through the circulator C to the second connecting portion 4c.

Specifically, the line length from the one end 5a of the third dielectric guide 5 to the through hole 9 may be set by the same method as the aforementioned one for setting the line length of the third dielectric guide 5. In this example shown in FIGS. 2A and 2B, however, the through hole 9 has to be formed at a portion of one parallel flat plate conductor 2, the portion confronting a portion of the third dielectric guide 5, in which portion electric field of a standing wave in an LSM mode is high.

Thus, the millimeter-wave signal Wb to leak from the first dielectric guide 3 to the second dielectric guide 4 and the millimeter-wave signal Wa reflected on the through hole 9 and returned to leak from the third dielectric guide 5 to the second dielectric guide 4 are reliably reversed in phase so that the millimeter-wave signals Wb and Wa can cancel each other. Moreover, in a case where, the antenna or the like (including a primary radiator, or an antenna or the primary radiator connected to a waveguide tube) is attached in the normal direction to the parallel flat plate conductors 1 and 2, the millimeter-wave signal can be efficiently transmitted to the antenna or the like from the third dielectric guide 5 through the through hole 9.

In the transmitting/receiving antenna of the second embodiment of the invention, as shown in FIGS. 2A and 2B, the length from the one end 5a of the third dielectric guide 5 to the portion confronting the through hole 9 is set like before to $\delta = \pm \pi$ when the phase difference at the center frequency between Wa and Wb is designated by $\delta$. Therefore, the millimeter-wave signal Wb to leak from the first dielectric guide 3 to the second dielectric guide 4 and the millimeter-wave signal Wa reflected on the through hole 9 and returned to leak from the third dielectric guide 5 to the second dielectric guide 4 are reliably reversed in phase so that the millimeter-wave signals Wb and Wa can be effectively weakened to interfere and cancel each other. As a result, the millimeter-wave signal to leak from the first dielectric guide 3 on the transmission system side to the second dielectric guide 4 on the reception system side can be suppressed to make the reception characteristic of the reception system satisfactory.

The components of the transmitting/receiving antenna of the invention will be described in detail. In the transmitting/receiving antenna of the invention, the first, second and third transmission lines may be exemplified by the non-radiative dielectric waveguide (as may also be called the "NRD guide"), in which the dielectric guides 3, 4 and 5 are arranged between the parallel flat plate conductors 1 and 2 as in the foregoing examples.

In a fundamental configuration of that non-radiative dielectric waveguide, as shown in a partially broken perspective view of FIG. 4, the dielectric guide 3 having a rectangular section is arranged between the parallel flat plate conductors 1 and 2 arranged in parallel with a predetermined spacing a, as defined by a $\leq \lambda/2$ for the wavelength $\lambda$ of the millimeter-wave signal. As a result, the millimeter-wave signal can be propagated without any substantial loss in the dielectric guide 3 by eliminating the intrusion of the noise from the outside into the dielectric guide 3 and the radiation of the millimeter-wave signal to the outside. The wavelength $\lambda$ is the wavelength of the millimeter-wave signal in the air (or the free space) for the frequency in use.

On the other hand, the material for the first, second and third dielectric guides 3, 4 and 5 may be preferably resin such as ethylene tetrafluoride or polystyrene, or ceramics such as cordierite ($2MgO \cdot 2Al_2O_3 \cdot 5SiO_2$) ceramics, alumina ($Al_2O_3$) ceramics or glass ceramics, and these substances have a low loss in the millimeter-wave band.

Moreover, the sectional shape of the first, second and third dielectric guides 3, 4 and 5 is basically a rectangular one but may also be a rectangle having rounded corners and a variety of sectional shapes used for transmitting the millimeter-wave signal.

Further, the material for the parallel flat plate conductors 1 and 2 are preferably exemplified in terms of a high electric conductivity and in an excellent workability by a conductor plate of Cu, Al, Fe, Ag, Au, Pt, SUS (i.e., stainless steel) or brass (i.e., a Cu—Zn alloy). Alternatively, a conductor layer of those materials may also be formed on the surface of an insulating plate made of a ceramics or a resin.

Further, the first, second and third transmission lines may also be exemplified by strip guides, micro-strip guides, coplanar guides, coplanar guides with the ground, slot guides, waveguides or dielectric waveguides.

Further, the material for the ferrite plates 6 and 7 is preferably ferrite of zinc·nickel·iron oxide ($Zn_aNi_bFe_cO_x$), for example, for the millimeter-wave signal.

Further, the ferrite plates 6 and 7 are normally formed into a disc shape but may also be formed into a regular polygon shape in a top plan view. In this case, when the number of dielectric guides to be connected is n (n is an integer of 3 or more), their top plan shape may be a regular m-polygon shape (m is an integer lager than n of 3 or more).

Further, the antenna 8 may be exemplified by a horn antenna, a slot antenna, a dielectric wave guide antenna, a patch antenna or an array antenna.

Further, the shape of the through hole 9 to be formed in the parallel flat plate conductor 1 or the parallel flat plate conductor 2 may be normally rectangular but may also be circular, oval, elliptic or polygonal.

Next, the millimeter-wave radar, to which the millimeter-wave transmitter-receiver of the third embodiment of the invention using the transmitting/receiving antenna of the first embodiment of the invention is applied, will be described in detail.

The configuration of the millimeter-wave signal transmitter in the millimeter-wave radar, to which the millimeter-wave transmitter-receiver of the third embodiment of the invention is applied, is identical to that shown in a top plan view in FIG. 6. Moreover, the fundamental configuration of the NRD guide as the dielectric guide used in that configuration is similar to that shown in the partially broken perspective view in FIG. 4.

Of the case, in which the millimeter-wave transmitter-receiver of the third embodiment of the invention is applied to the millimeter-wave radar, the configuration of the millimeter-wave signal transmitter and the intermediate-frequency signal transmitter is shown in a block circuit diagram of FIG. 5, and the partially enlarged top plan view of the vicinity of the third dielectric guide of FIG. 6 is shown in FIG. 8. Here will be described the first millimeter-wave transmitter-receiver of the third embodiment of the invention. In the following description, the reference numerals in FIG. 5 are shown in parenthesized forms when the components corresponding to those shown in FIG. 6 are in FIG. 5.

As shown in FIG. 6 and FIG. 5, a millimeter-wave radar R1 using a millimeter-wave transmitter-receiver of the third embodiment of the invention comprises a pair of parallel flat plate conductors 51, a first dielectric guide 53, a millimeter-wave signal oscillator (VCO) 52 (21), a pulse modulator (RF switch) (22), a second dielectric guide 58, a circulator 54 (23), a third dielectric guide 55, a fourth dielectric guide 57, and a mixer 59 (25). The pair of the parallel flat plate conductors 51 is arranged in parallel at the spacing of one half or less of the wavelength of the millimeter-wave signal. The first dielectric guide 53 is disposed between the parallel flat plate conductors 51. The millimeter-wave signal oscillator (VCO) 52 (21) is disposed between the parallel flat plate conductors 51, and attached to the first dielectric guide 53 and frequency-modulates the high-frequency signal outputted from a high-frequency diode and propagates the modulated signal as the millimeter-wave signal via the first dielectric guide 53. The pulse modulator (22) is disposed between the parallel flat plate conductors 51, and disposed midway of the first dielectric guide 53 and pulsates the millimeter-wave signal and outputs the pulsated millimeter-wave signal as the millimeter-wave signal to be transmitted, from the first dielectric guide 53. The second dielectric guide 58 is disposed between the parallel flat plate conductors 51, and disposed so that its one end side is close to the first dielectric guide 53 to obtain elecrtomagnetic coupling, and propagates a portion of the millimeter-wave signal to the mixer 59 (25).

The circulator 54 (23) is disposed between the parallel flat plate conductors 51, and includes a first connecting portion 54a, a second connecting portion 54b and a third connecting portion 54c arranged radially at the peripheral edge portions of the two ferrite plates arranged on the inner faces of the parallel flat plate conductors 51 to confront each other and individually acting as the input/output terminals of the millimeter-wave signal. The circulator 54 (23) outputs the millimeter-wave signal inputted from one connecting portion from one of the remaining adjacent connecting portions, the first connecting portion 54a being connected to the millimeter-wave signal output terminal of the first dielectric guide 53. The third dielectric guide 55 is disposed between the parallel flat plate conductors 51, and connected to the second connecting portion 54b of the circulator 54 (23) and propagates the millimeter-wave signal, and the third dielectric guide 55 has the antenna 56 (24) at its leading end portion. The fourth dielectric guide 57 is disposed between the parallel flat plate conductors 51, and connected to the third connecting portion 54c of the circulator 54 (23) and propagates the received wave, which is received by the antenna 56 (24) to propagate through the third dielectric guide 55 and outputted from the third connecting portion 54c, to the mixer 59 (25).

The mixer 59 (25) is disposed between the parallel flat plate conductors 51, and is confugured so that the midway of the second dielectric guide 58 and the midway of the fourth dielectric guide 57 are close to or joined to each other to obtain electromagnetic coupling, and mixes a portion of the transmission millimeter-wave signal having propagated via the second dielectric guide 58 and the received wave having propagated via the fourth dielectric guide 57, and generates an intermediate-frequency signal. The line length of the third dielectric guide 55 is set so that $\delta = \pm \pi$ in which $\delta$ is a phase difference at the center frequency between signals Wa and Wb. Here, Wa is a portion of the transmission millimeter-wave signal outputted from the pulse modulator (22), which has propagated through the first dielectric guide 53, which has been outputted from the first connecting portion 54a of the circulator 54 (23) via the second connecting portion 54b to the third dielectric guide 55, and which has been reflected on a connecting portion 55a to be connected to the transmitting/receiving antenna 56 (24) or the leading end portion of the third dielectric guide 55 and returned again to the circulator 54 (23) to leak from the third connecting portion 54c to the fourth dielectric guide 57. Wb is another millimeter-wave signal portion which has leaked from the first connecting portion 54a through the circulator 54 (23) directly to the third connecting portion 54c.

In other words, in the millimeter-wave radar R1, the circulator 54 (23) is disposed between the parallel flat plate conductors 51, and arranged at a predetermined spacing on the peripheral edge portion of the ferrite plates arranged in parallel with the parallel flat plate conductors 51. The circular 54 (23) includes the first connecting portion 54a, the second connecting portion 54b and the third connecting portion 54c respectively acting as the input/output terminals of the millimeter-wave signal. The circulator 54 (23) is disposed between the parallel flat plate conductor 51, and outputs the millimeter-wave signal inputted from one of the connecting portions, from another connecting portion adjacent clockwise or counter-clockwise in the plane of the ferrite plates. The first connecting portion 54a is connected to the millimeter-wave signal output terminal of the first dielectric guide 53.

The fourth dielectric guide 57 is connected to the third connecting portion 54c of the circulator 54 (23) for propagating the received wave, which is received by the antenna 56 (24) to propagate through the third dielectric guide 55 and outputted through the second connecting portion 54b from the third connecting portion 54c, to the mixer 59 (25). The mixer 59 (25) is provided at its output terminal with the switch (i.e., the IF switch) (26) adapted, when turned OFF, to block the intermediate-frequency signal and turned ON, when the transmission millimeter-wave signal outputted from the pulse modulator (22) becomes stable, to pass the intermediate-frequency signal.

In more detail, the millimeter-wave transmitter-receiver comprises a millimeter-wave signal oscillator (21) which is a millimeter-wave oscillator, a coupler (30) which is a branching device, the transmitting/receiving antenna of the first embodiment of the invention, and a mixer (25). The millimeter-wave signal oscillator (21) generates a millimeter-wave signal. The coupler (30) branches the millimeter-wave signal and outputs the millimeter-wave signal to one output terminal connected to the millimeter-wave signal oscillator (21) as a transmission millimeter-wave signal, and outputs to the other output terminal as a local signal. In the transmitting/receiving antenna, an end portion of the first transmission line is connected to the one output terminal of the coupler (30). The mixer (25) mixes the local signal outputted to the other output terminal and the millimeter-wave signal received by the transmitting/receiving antenna, thereby to output the intermediate-frequency signal, which is connected between the other output terminal of the coupler (30) and the end portion of the transmission line of the transmitting/receiving antenna.

In this example, the switch (26) for turning ON/OFF the intermediate-frequency signal generated at the output terminal of the mixer 59 (25) is connected to the timing generator (i.e., the IF switch controller) (29) for controlling the ON/OFF time of the switch 26, and is provided at its post-stage with the amplifier (AMP) (28) for amplifying the intermediate-frequency signal outputted through the switch 26.

The switch (26) is turned ON when the pulsated transmission millimeter-wave signal becomes stable after outputted from the pulse modulator (22) and stopped to fall down. For these controls of the ON/OFF of the switch (26) in response to the stabilization of the transmission millimeter-wave signal, the state of the transmission millimeter-wave signal may be monitored to control the ON/OFF of the switch (26), or the modulation signal of the pulse modulator (22) may be utilized to turn the switch (26) ON when the modulation current becomes stable.

The millimeter-wave signal oscillator 52 (21) is a VCO (i.e., Voltage-Controlled Oscillator) including a Gunn diode and a varactor diode, for example, and operates as an oscillator of the millimeter-wave signal when the oscillator is fed with the modulation signal at its IN-2 terminal. The output signal of the VCO of the millimeter-wave signal oscillator 52(21) and the pulsated signal inputted to the IN-1 terminal are inputted to the pulse modulator (22) and are pulse-modulated by the pulse modulator (22) so that the pulsated transmission millimeter-wave signal is outputted.

Figure 32:
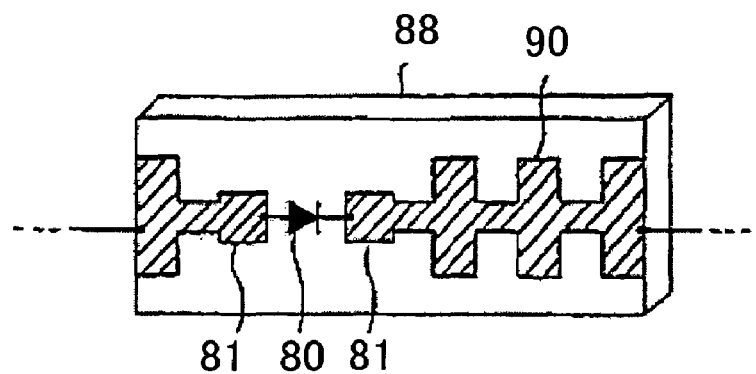
FIG. 32 is a perspective view showing an example of a wiring substrate provided with a varactor diode for the high-frequency oscillator.
Figure 33:
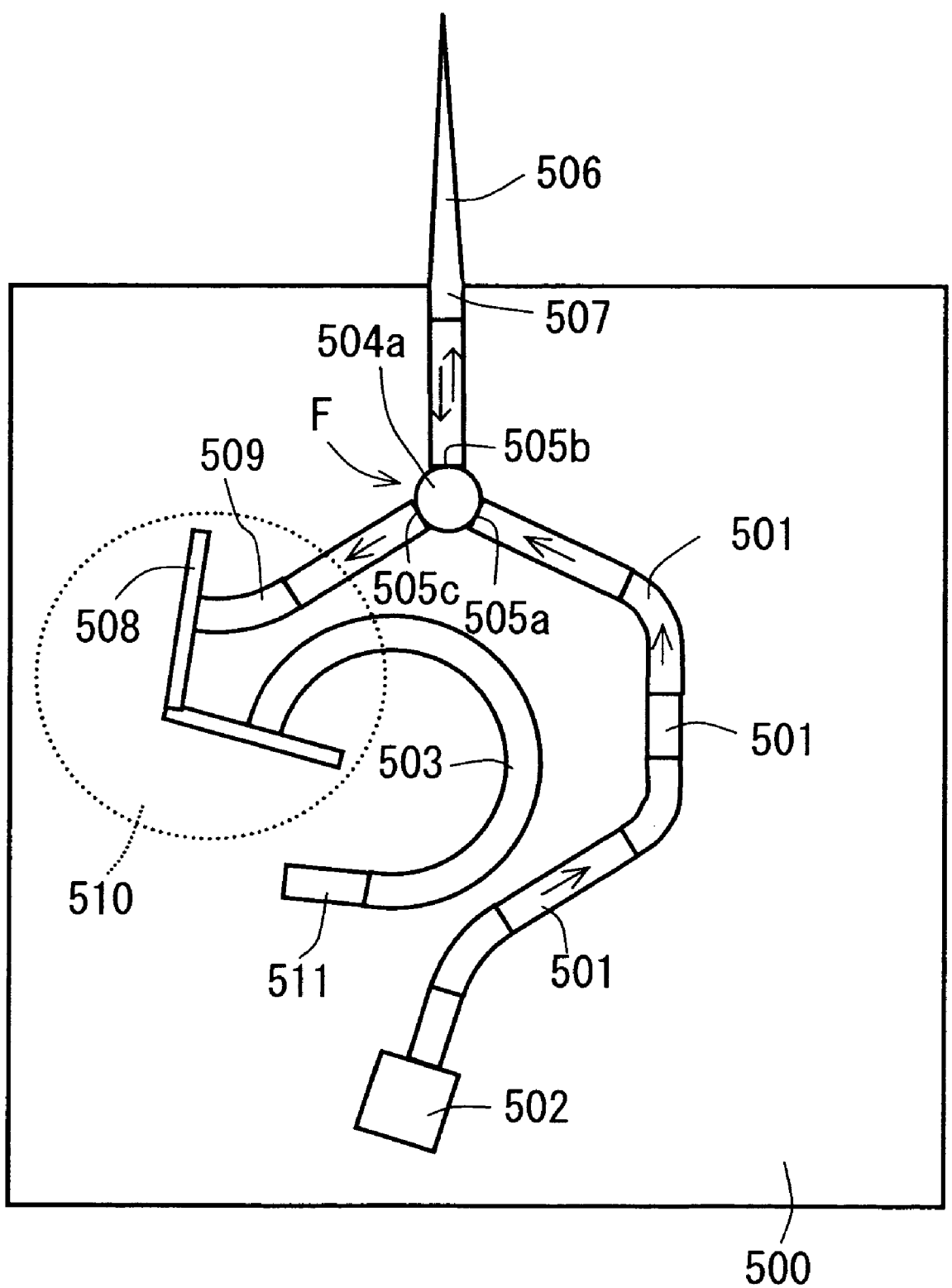
FIG. 33 is a top plan view showing a millimeter-wave radar modulate configured by incorporating a conventional high-frequency oscillator.
Figure 34:
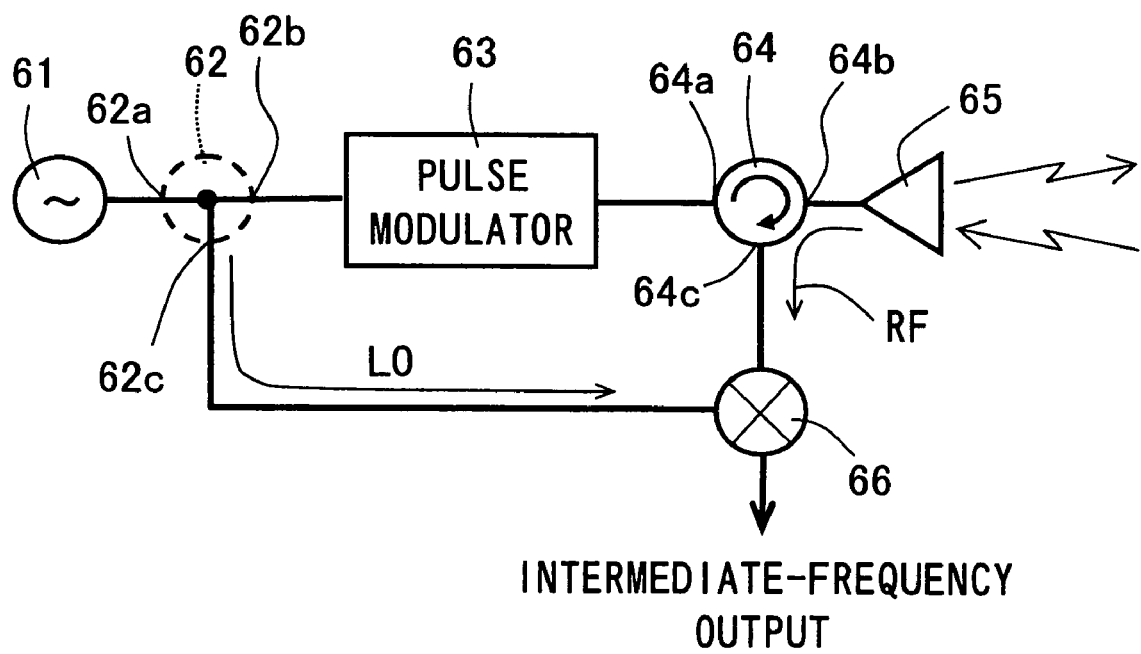
FIG. 34 is a schematic block circuit diagram showing an example of a conventional high-frequency transmitter-receiver.

In FIG. 6, this pulse modulator (22) is disposed midway of the first dielectric guide 53 and is exemplified by an RF switch configured like that shown in FIG. 32. The pulse modulator (22) is a switch which is so configured by forming a choke type bias feed guide 90 on one principal face of a substrate 88 and by interposing a solder-packaged beam-lead type or flip chip type PIN diode or a Schottky barrier diode 80 between connecting electrodes 81 and 81 formed midway of the bias feed guide 90, that the Schottky diode 80 is disposed between the end faces midway of the first dielectric guide 53 so that the applied direction of its bias voltage may cross the guide direction.

The circulator 54 (23) propagates the millimeter-wave signal to the antenna 56 (24) at the transmission time and the received wave to the mixer 59 (25) at the reception time. The antenna 56 (24) is a transmitting/receiving antenna for the millimeter-wave signal, which is exemplified by a horn antenna connected to the circulator 54 (23) through a metal waveguide or a dielectric waveguide filled with a dielectric in a metal waveguide. Furthermore, the mixer 59 (25) mixes the millimeter-wave signal outputted from the VCO of the millimeter-wave signal oscillator 52 (21) and the received wave received by the antenna 56 (24), thereby to output the intermediate-frequency signal for detecting the distance or the like to a target.

The switch 26 is a switch (i.e., the IF switch) disposed at the output terminal of the mixer 59 (25) for shielding, when turned OFF, the intermediate-frequency signal outputted from the mixer 59 (25) and for passing the same when turned ON. Furthermore, the timing generator 29 is a timing generator for generating a timing signal to control the ON/OFF timing of the switch (26).

The amplifier 28 is an amplifier connected to the post-stage of the switch (26) for amplifying the intermediate-frequency signal outputted from the millimeter-wave transmitter-receiver and is provided with a control terminal. In the amplifier (28), the control signal is inputted from the outside via the control terminal to control the gain and the operation of the amplifier (28) timely. The amplifier (28) has its control period determined according to the digital state of the pulse signal inputted to the pulse modulator (22), for example, to amplify the intermediate-frequency signal inputted, while being controlled at a desired timing for a desired period.

The timing generator (29) is fed with the pulsated signal of the IN-1 terminal and the pulse signal of the control terminal in association with the control signals of the pulse modulator (22) and the amplifier (28), and controls the timing so that the transmission millimeter-wave signal pulse-modulated by the pulse modulator (22) may be shielded by the switch (26) before the millimeter-wave signal is reflected on the connecting portion between the NRD guide and the dielectric waveguide or leaks as an unnecessary signal from the circulator 54 (23) through the mixer 59 (25) to the amplifier (28).

In the millimeter-wave transmitter-receiver of the third embodiment of the invention, the line length of the third dielectric guide 55 is set so that $\delta = \pm\pi$ in which $\delta$ is a phase difference at the center frequency between signals Wa and Wb. Here, Wa is a portion of the transmission millimeter-wave signal outputted from the pulse modulator (22), which has propagated through the first dielectric guide 53, which has been outputted from the first connecting portion 54a of the circulator 54 (23) via the second connecting portion 54b to the third dielectric guide 55, and which has been reflected on a connecting portion 55a to be connected to the transmitting/receiving antenna 56 (24) or the leading end portion of the third dielectric guide 55 and returned again to the circulator 54 (23) to leak from the third connecting portion 54c to the fourth dielectric guide 57. Wb is another millimeter-wave signal portion which has leaked from the first connecting portion 54a through the circulator 54 (23) directly to the third connecting portion 54c.

In the millimeter-wave transmitter-receiver of the third embodiment of the invention, moreover, it is preferable that the difference in the characteristic impedance between the third dielectric guide 55 and the antenna 56 (24) is adjusted, and the power ratio Rp between one millimeter-wave signal portion Wa and another millimeter-wave signal portion Wb is set 0.27 or more, and the phase difference $\delta$ is set to $\delta = \pm\pi \pm 0.42\pi$ as will be described hereinafter.

The detailed description is made on the configuration from the pulse modulator (22) to the mixer 59 (25) in the millimeter-wave radar R1 using the millimeter-wave transmitter-receiver of the third embodiment of the invention, as well as the operations of the configuration.

The millimeter-wave signal is generated by the millimeter-wave signal oscillator (VCO) 52 (21) and is frequency-modulated. After this, the millimeter-wave signal is branched by the coupler (30) so that a branched portion is pulse-modulated by the pulse modulator (22) and is outputted as the transmission millimeter-wave signal. This transmission millimeter-wave signal propagates via the first dielectric guide 53 and goes from the first connecting portion 54a into the circulator 54 (23). A portion of the millimeter-wave signal either leaks from the third connecting portion 54c via that route (from the first connecting portion 54a to the third connecting portion 54c) of the circulator 54 (23), which is intrinsically isolated, or is outputted from the second connecting portion 54b to propagate via the third dielectric guide 55. That portion of the millimeter-wave signal is reflected on the incident end of the antenna 56 (24) or on the antenna 56 (24), and propagates again via the third dielectric guide 55 so that it goes into the circulator 54 (23) and leaks from the third connecting portion 54c. That portion of the millimeter-wave signal propagates via the fourth dielectric guide 57 to become a millimeter-wave signal input $P_{RF}$ to go into the mixer 59 (25).

On the other hand, the other millimeter-wave signal portion, which has been branched by the coupler (30), becomes a millimeter-wave signal input $P_{LO}$ passes via the second dielectric guide 58 or the local route to go into the mixer 59 (25). The output $P_{MIX}$ of the mixer 59 (25) and its fluctuation $\Delta P_{MIX}$ are expressed by the following Formulas, respectively, in which those millimeter-wave signal inputs are designated by $P_{RF}$ and $P_{LO}$, respectively, and the output of the intermediate-frequency signal from the mixer 59 (25) and its fluctuation are designated by $P_{MIX}$ and $\Delta P_{MIX}$, respectively.

$$P_{MIX} = (P_{RF} \cdot P_{LO} \cdot \sin \delta \cdot Gc)^{1/2} \quad (1);$$

and $$\Delta P_{MIX} = (1/2) \cdot (P_{RF} \cdot P_{LO} \cdot \cos \delta \cdot Gc)^{1/2} \quad (2).$$

Here, $\delta$ represents a phase difference at the center frequency between $P_{RF}$ and $P_{LO}$, and Gc represent a conversion gain in the mixer 59 (25).

Further, the $P_{MIX}$ varies with the variation of the $P_{RF}$ or $P_{LO}$ itself, as indicated by $\Delta P_{RF}$ or $\Delta P_{LO}$, respectively, and the following relation holds between the $\Delta P_{RF}$ and the millimeter-wave input $P_{in}$ to the pulse modulator (22).

$$\Delta P_{RF} = P_{in} \cdot \eta \cdot \Delta V_{SW} \cdot \alpha \cdot \beta \quad (3).$$

Here, $\Delta V_{SW}$ represents a fluctuation of the drive voltage of the pulse modulator (22) and express a fluctuation component due to a transient response, and $\alpha$ represents the ON/OFF ratio of the pulse modulator (22), and $\beta$ represents the isolation (which also contains the reflection component from the antenna 56 (24)) between the first connecting portion 54a and the third connecting portion 54c of the circulator 54 (23). Moreover, $\eta$ represents the ratio of the output fluctuation $\Delta P$ of the pulse modulator 22 to the $\Delta V_{SW}$, as expressed by the following Formula.

$$\eta = \Delta P / \Delta V_{SW} \tag{4}$$

In order to reduce the $\Delta P_{MIX}$ sufficiently in the millimeter-wave radar R1, any of the terms of Formulas (2), (3) and (4) may be reduced. Of the transmission millimeter-wave signals, the interference between that one portion of the millimeter-wave signal Wa, which is reflected via the third dielectric guide 55 on the connecting portion 55a to the antenna 56 (24) or at the leading end portion of the third dielectric guide 55 and returned to leak to the third connecting portion 54c, and the millimeter-wave signal Wb, which leaks from the first connecting portion 54a through the circulator 54 (23) directly to the third connecting portion 54c, may be utilized to reduce the term $P_{RF}$. Then, the millimeter-wave radar R1 can be designed easily and conveniently with neither influencing the $P_{in}$, $\eta$ or Gc relating to the millimeter-wave transmitting/receiving performance nor changing the $\Delta V_{SW}$, $\alpha$ or $\beta$, as might otherwise be followed by difficulties on principle.

In order to reduce the $P_{RF}$ by making use of the interference between one millimeter-wave signal portion Wa and another millimeter-wave signal portion Wb, the signal intensity (or power) of the millimeter-wave signal Wa and the signal intensity (or power) of another millimeter-wave signal portion Wb may be equalized and reversed for their interference to have the phase difference $\delta = \pm \pi$. This is identical to that the phases are changed to $(2N-1) \cdot \pi$ when the line length of the third dielectric guide 55 is adjusted to propagate the millimeter-wave signal reciprocally in the third dielectric guide 55. Specifically, the line length of the third dielectric guide 55 can be controlled by changing the length, the width, the specific dielectric constant or the like of the third dielectric guide 55. By matching the impedance of the antenna 56 (24) which is the leading end portion of the third dielectric guide 55 with the millimeter-wave signal in the connecting portion 55a, that is, by adjusting the difference in the characteristic impedance between the third dielectric guide 55 and the antenna 56 (24) to vary the reflection coefficient at the connecting portion 55a, moreover, the signal intensity (or power) of one millimeter-wave signal portion Wa can be adjusted to be substantially equal to the signal intensity (or power) of another millimeter-wave signal portion Wb. The reflection coefficient at that connecting portion 55a can be adjusted by adjusting either the size of the connecting portion 55a or the dielectric constant of the dielectric for causing the difference in the characteristic impedance, or the size and the dielectric constant of an inclusion such as the waveguide, if any between the third dielectric guide 55 and the antenna 56 (24).

Moreover, the $P_{RF}$ is minimized, when the line length of the third dielectric guide 55 is set to $\delta = \pm \pi$, and maximized when the same length is set to $\delta = 0$ or $2\pi$. Therefore, the output fluctuation $\Delta P_{MIX}$ of the mixer 59 (25) is maximized for $\delta = (2N) \cdot \pi$ thereby to make the millimeter-wave reception performance the worst but is minimized for $\delta = (2N-1) \cdot \pi$ thereby to make the millimeter-wave reception performance the best.

This will be described with reference to FIG. 8 and FIG. 9. FIG. 8 is a partially enlarged top plan view showing the vicinity of the third dielectric guide 55 of FIG. 6. FIG. 9 is a graph showing changes in output intensity of the millimeter-wave signal by the phase difference $\delta$ when a millimeter-wave signal portion Wa, which is reflected via the third dielectric guide 55 on the connecting portion 55a with the antenna 56 (24) which is the leading end portion of the third dielectric guide 55 and returned to leak to the third connecting portion 54c, and another millimeter-wave signal portion Wb, which leaks from the first connecting portion 54a through the circulator 54 (23) to the third connecting portion 54c, interfere each other and are synthesized.

In FIG. 8, Wa represents one millimeter-wave signal portion which is reflected on the connecting portion 55a with the antenna 56 (24) of the third dielectric guide 55 and is returned to leak to the third connecting portion 54c, and Wb represents another millimeter-wave signal portion, which leaks from the first connecting portion 54a through the circulator 54 (23) directly to the third connecting portion 54c. Most of the power of the transmission millimeter-wave signal, which has entered the first connecting portion 54a via the first dielectric guide 53, is transmitted to the second connecting portion 54b and irradiated from the antenna 56 (24) via the third dielectric guide 55, because the first connecting portion 54a and the third connecting portion 54c are isolated from each other. At this time, due to a little mismatch of the impedance at the connecting portion 55a with the antenna 56 (24) which is the leading end portion of the third dielectric guide 55, a little millimeter-wave signal is reflected on the connecting portion 55a and is returned again via the third dielectric guide 55 so that it leaks as the Wa to the third connecting portion 54c through the circulator 54 (23). On the other hand, the power of the transmission millimeter-wave signal, which has entered the first connecting portion 54a via the first dielectric guide 53, leaks even a little as another millimeter-wave signal portion Wb to the third connecting portion 54c from the first connecting portion 54a, although the first connecting portion 54a and the third connecting portion 54c are isolated from each other.

When one millimeter-wave signal portion Wa has a field intensity $E_a$, another millimeter-wave signal portion Wb has a field intensity $E_b$, and the millimeter-wave signal, which is synthesized by the interference between another millimeter-wave signal portion Wb which is the millimeter-wave signal to leak from the third connecting portion 54c and one millimeter-wave signal portion Wa, has an output intensity (or power) $P_i$, this output intensity $P_i$ is expressed by the following Formula. Here, the $E_a$ and the $E_b$ represent the field intensities individually, just after the millimeter-wave signals entered the fourth dielectric guide 57 from the third connecting portion 54c.

$$P_i = (1/2) \cdot (|E_a| - |E_b|)^2 + 2|E_a||E_b| \cos^2(\delta/2) \tag{5}$$

Moreover, when a power ratio $r_p$ is newly defined as follows, $$r_p = (|E_a|/|E_b|)^2 \tag{6}$$

$P_i$ can also be expressed by the following Formula, $$P_i = \frac{P_0}{2} \left\{ \frac{(1-\sqrt{r_p})^2}{1+r_p} + \frac{4\sqrt{r_p}}{1+r_p} \cos^2 \frac{\delta}{2} \right\} \tag{7}$$

in which, $$P_O = |E_a|^2 + |E_b|^2 \tag{8}$$

Herein, when the following relationship is satisfied:

$$P_i < |E_b|^2 \tag{9}$$

the millimeter-wave signal $P_i$ to leak from the third connecting portion 54c can be more attenuated than the signal intensity $|E_b|^2$ of a portion of the original millimeter-wave signal Wa if the following relation holds, even in a case where the millimeter-wave signal $P_i$ is synthesized with another millimeter-wave signal portion Wb.

Therefore, the power division ratio $r_p$ and the δ may be set to satisfy that condition in Formula (7).

At this time, the following Formula is obtained from Formula (6).

$$|E_b|^2 = r_p \cdot |E_a|^2$$

In a case where this Formula is substituted into Formula (8), the following Formula is obtained.

$$|E_b|^2 = P_O/(1+r_p)$$

In a case where this Formula is substituted into Formula (9) and in a case where the power division ratio $r_p$ is expressed as the power ratio between one millimeter-wave signal portion Wa and another millimeter-wave signal portion Wb by Rp, then the following Formula is obtained.

[Formula 2] (10)

$$\left\{\left(1-\sqrt{R_p}\right)^2 + 4\sqrt{R_p}\cos^2\frac{\delta}{2}\right\} < 1$$

In a case where the condition of this Formula (10) is satisfied, one millimeter-wave signal portion Wa and another millimeter-wave signal portion Wb interfere to weaken each other, so that the intensity of the millimeter-wave signal, which is synthesized by the interference between one millimeter-wave signal portion Wa and another millimeter-wave signal portion Wb, is suppressed so as to be smaller than the intensity of another millimeter-wave signal tion Wb before the interference.

Next, the optimum condition for the Formula (10) will be described in connection with the Formula (7) and with reference to FIG. 9.

The $P_i$ expressed by the Formula (7) exhibits the characteristics, in which the maximum and the minimum are repeated for the period π in accordance with the variation of the δ, as shown in FIG. 9. In FIG. 9, the abscissa indicates the phase difference δ (having a unit of radian), and the ordinate indicates the millimeter-wave signal $P_i$ to leak from the third connecting portion 54c, so that the characteristic curve plots the variation of the $P_i$ due to the δ. Moreover, broken lines indicate the maximum and the minimum of the characteristic curve. It is understood from FIG. 9 that the millimeter-wave signal $P_i$ to leak from the third connecting portion 54c takes the minimum, when the δ is ±π, and the maximum when the δ is 0 or 2π. It is also understood that the minimum of the signal intensity $P_i$ of the millimeter-wave signal to leak from the third connecting portion 54c theoretically approaches 0 when the power division ratio $r_p$ is $r_p=1$, that is, when $|E_a|=|E_b|$.

Therefore, the signal intensity (or power) of one millimeter-wave signal portion Wa and the signal intensity (or power) of another millimeter-wave signal portion Wb are equalized and made to interfere with each other in the reversed phases, i.e., with the phase difference of ±π. Then, the $P_i$ expressed by the Formula (5) or the Formula (7) can be suppressed substantially to 0 so that the $P_{RP}$ corresponding to the $P_i$ is suppressed in the Formula (2). Therefore, the mixer output fluctuation $\Delta P_{MIX}$ can be satisfactorily suppressed to the least.

When the mixer output fluctuation $\Delta P_{MIX}$ is satisfactorily suppressed to the minimum, moreover, the level fluctuation, as has been described in connection with the problem to be solved by the invention, is promptly converged and stabilized to the steady state. Thus, by the switch (26) provided for preventing the transmission millimeter-wave signal outputted from the pulse modulator (22) from being mixed directly into the mixer 59 (25) and outputted to the reception system, therefore, even the unnecessary signal having been generated by the mixer 59 (25) need not be shielded unlike the related art, so that the switch (26) can be turned ON immediately after the pulse signal was sent, thereby to start the millimeter-wave transmission/reception.

The theoretical optimum conditions have been thus described. As a matter of fact, however, the line length of the third dielectric guide 55 may be so set by substantially equalizing the signal intensity (or power) of one millimeter-wave signal portion Wa and the signal intensity (or power) of another millimeter-wave signal portion Wb that the two signal portions Wa and Wb may be substantially reversed in phase.

Here will be described the range of the line length of the third dielectric guide 55 for more advantages in the practical use.

First of all, it is assumed that the field intensity of one millimeter-wave signal portion Wa is lower than that of another millimeter-wave signal portion Wb. This assumption can be considered because one millimeter-wave signal portion Wa should be intrinsically transmitted from the antenna 56 (24).

In a case where the ratio between the maximum and the minimum of the output intensity $P_i$ of the millimeter-wave signal to leak from the third connecting portion 54c is defined as an attenuation factor $E_r$, and where this attenuation factor $E_r$ exceeds ½ (e.g., 3 dB) the output intensity (or power) $P_i$ of the millimeter-wave signal to leak and to be outputted from the third connecting portion 54c can never fail to be lower than the intensity (or power) which was owned before another millimeter-wave signal portion Wb interferes with one millimeter-wave signal portion Wa, when at least the line length of the third dielectric guide 55 is set such that the phase difference δ is expressed by δ=±π. When the attenuation factor $E_r$ is approximate to ½ (e.g., 3 dB), the range, which can set the line length of the third dielectric guide 55 so that the output intensity (or power) $P_i$ of the millimeter-wave signal to leak and to be outputted from the third connecting portion 54c may be lower than the intensity (or power) owned before another millimeter-wave signal portion Wb interferes with one millimeter-wave signal Wa, is extremely narrowed to make only the condition of δ=±π effective. Therefore, the attenuation factor $E_r$ may be made larger than $E_r=½$ (e.g., 3 dB).

The attenuation factor $E_r$ can be expressed as follows.

[Formula 3] (11)

$$E_r = 10 \log\left(\frac{1+\sqrt{r_p}}{1-\sqrt{r_p}}\right)$$

Therefore, the power division ratio $r_p$ is calculated from Formula (11), and may be calculated to $r_p \geq 0.03$ by deforming the Formula (11) into a formula for determining the ratio $r_p$ and by substituting $E_r > ½$ into the deformed formula. From this, the ratio Rp (i.e., the power division ratio $r_p$) in the signal intensity (or power) between one millimeter-wave signal Wa and another millimeter-wave signal Wb satisfies that condition in most cases unless especially controlled. Thus, the output intensity $P_i$ of the millimeter-wave signal to leak and to be outputted from the third connecting portion 54c can be suppressed by setting the line length of the third dielectric guide 55 so that the phase difference δ may be δ=±π.

At this time, however, the manufacture may be strict because of the necessity for the line length of the third dielectric guide 55 to set the phase difference δ to δ=±π.

Next, it is empirically known to be relatively easy that the attenuation factor $E_r$ at the time when the millimeter-wave signals are thus made to interfere each other is deduced by synthesizing two electromagnetic waves by the interference so that the synthesized electromagnetic waves may attenuate and by setting a sufficient value for the attenuation ratio to acquire the attenuation of the synthesized electromagnetic waves, to $E_r$=10 dB (i.e., the attenuation ratio for attenuating the power of the synthesized electromagnetic waves to one tenth of the total power of the two electromagnetic waves before synthesized). From this, the power division ratio $r_p$ is set to calculate $r_p$≈0.27 likewise from Formula (7). At this time, the phase difference δ of Formula (6) may be determined to satisfy $P_i$<(½)$P_O$. It is also deduced that the ratio Rp (or the power division ratio $r_p$) in the signal intensity (or power) between one millimeter-wave signal portion Wa and another millimeter-wave signal portion Wb is set 0.27 or more, and that the phase difference δ may be set to δ=±π±0.42π.

In this case, the precision of the phase difference δ to be set by the line length of the third dielectric guide 55 is ±0.42π so that the manufacture can be facilitated to realize the practically satisfactory characteristics easily. When the phase difference δ is set to δ=±π, on the other hand, the output intensity (or power) $P_i$ of the millimeter-wave signal to leak and to be outputted from the third connecting portion 54c, that is, the millimeter-wave signal input $P_{RF}$, which leaks from the third connecting portion 54c and propagates via the fourth dielectric guide 57 to enter the mixer 59 (25) is also reduced to the least thereby to suppress the mixer output fluctuation $\Delta P_{MIX}$. Therefore, it is needless to say that the level fluctuation, as has been described in connection with the problem to be solved by the invention, is promptly converged and stabilized to the steady state thereby to make the millimeter-wave transmitting/receiving characteristics satisfactory.

In order to make actual adjustments to the conditions thus far described, the output intensity of the millimeter-wave signal from the fourth dielectric guide 57 at the time when the line length of the third dielectric guide 55 is varied is measured with a power meter. When the maximum and the minimum of the characteristic curve shown in FIG. 9 are read from the actually measured data, the attenuation factor $E_r$ is determined to find the power division ratio $r_p$ (corresponding to Rp) and to find the phase difference δ from the repetition period of the maximum and the minimum of the characteristic curve shown in FIG. 9. Therefore, on the basis of those values, the line length of the third dielectric guide 55 and the difference in the characteristic impedance at the connecting portion 55a between the third dielectric guide 55 and the antenna 56 (24) may be adjusted to satisfy the conditions of the aforementioned Formula (10).

According to the millimeter-wave transmitter-receiver of the third embodiment of the invention, as has been described hereinbefore, the line length of the third dielectric guide 55 is set so that δ=±π in which δ is the phase difference at the center frequency between Wa and Wb. Here, Wa is a portion of the transmission millimeter-wave signal outputted from the pulse modulator (22), which has propagated through the first dielectric guide 53, which has been outputted from the first connecting portion 54a of the circulator 54 (23) via the second connecting portion 54b to the third dielectric guide 55, and which has been reflected on a connecting portion 55a to be connected with the antenna 56 (24) which is the leading end portion of the third dielectric guide 55 and returned again to the circulator 54 (23) to leak from the third connecting portion 54c to the fourth dielectric guide 57. Wb is another portion of the millimeter-wave signal which has leaked from the first connecting portion 54a through the circulator 54 (23) directly to the third connecting portion 54c. Preferably, the power ratio Rp between one millimeter-wave signal portion Wa and another millimeter-wave signal portion Wb is set 0.27 or more, and the phase difference δ is set to δ=±π±0.42π. In the millimeter-wave transmitter-receiver including the switch (26) capable of preventing the pulse-modulated transmission millimeter-wave signal from being outputted to the reception system by the reflection or the like in the millimeter-wave transmitter-receiver, the transmission/reception can be performed just after the pulse signal was transmitted. Therefore, the radar detection performance at the time when the millimeter-wave transmitter-receiver is used in the millimeter-wave radar can be enhanced to provide a millimeter-wave radar which is excellent especially in the short-range radar detection performance.

By using the transmitting/receiving antenna of the first embodiment of the invention, moreover, a portion of the millimeter-wave signal can be prevented from leaking to the reception system thereby to reduce the interference with the millimeter-wave signal to be received. Thereby, it is possible to make the reception characteristics of the reception system of the millimeter-wave transmitter-receiver. As a result, the power of the millimeter-wave signal of the transmission system can be raised to elongate the transmission range of the millimeter-wave signal to be transmitted by the transmitting/receiving antenna and to improve the S/N (Signal/Noise) ratio. Thus, the millimeter-wave transmitting/receiving performance can be improved as a whole.

Here will be described in detail the millimeter-wave radar, to which the millimeter-wave transmitter-receiver of the fourth embodiment of the invention using the transmitting/receiving antenna of the second embodiment of the invention is applied.

The configuration of the millimeter-wave signal transmitter in the millimeter-wave radar, to which the millimeter-wave transmitter-receiver of the fourth embodiment of the invention is applied, is similar to that shown in the top plan view of FIG. 7. Moreover, the fundamental configuration of the NRD guide as the dielectric guide to be used in the configuration of that transmitter is similar to that shown in the partially broken perspective view of FIG. 4.

Of the case, in which the millimeter-wave transmitter-receiver of the fourth embodiment of the invention is applied to the millimeter-wave radar, the configurations of the millimeter-wave signal transmitter and the intermediate-frequency signal transmitter are shown in the block circuit diagram of FIG. 5, and the transmitting/receiving antenna to be used in the millimeter-wave transmitter-receiver of the fourth embodiment of the invention is shown in the top plan view of FIG. 2A. The millimeter-wave transmitter-receiver of the fourth embodiment of the invention is described in the following. When components corresponding to those of the configuration shown in FIG. 7 are present in FIG. 5, they are additionally denoted by parenthesizing the reference numerals of FIG. 5.

As shown in FIG. 7 and FIG. 5, a millimeter-wave radar R2 using a millimeter-wave transmitter-receiver of the fourth embodiment of the invention comprises a pair of the parallel flat plate conductors 51, a transmitting/receiving antenna shown in FIG. 2A, a first dielectric guide 53, a millimeter-wave signal oscillator (VCO) 52 (21), a pulse modulator (RF switch) (22), a fourth dielectric guide 57, and a mixer 59 (25). The pair of the parallel flat plate conductors 51 is arranged in parallel at the spacing of one half or less of the wavelength of the millimeter-wave signal. The transmitting/receiving antenna is disposed between the parallel flat plate conductors 51. The millimeter-wave signal oscillator (VCO) 52 (21) is disposed between the parallel flat plate conductors 51, and attached to the first dielectric guide 53 and frequency-modulates the high-frequency signal outputted from a high-frequency diode and propagates the modulated signal as the millimeter-wave signal via the first dielectric guide 53. The pulse modulator (22) is disposed between the parallel flat plate conductors 51, and disposed midway of the first dielectric guide 53 and pulsates the millimeter-wave signal to output the pulsated millimeter-wave signal as the millimeter-wave signal to be transmitted.

The fourth dielectric guide 57 is disposed between the parallel flat plate conductors, and disposed so that its one end side is close to the first dielectric guide 53 to obtain electromagnetic coupling, and propagates a portion of the millimeter-wave signal to the mixer 59 (25). The mixer 59 (25) is disposed between the parallel flat plate conductors, and is configured so that the midway of the fourth dielectric guide 57 and the midway of the second dielectric guide 58 are close to or joined to each other to obtain electomagnetic coupling, and mixes a portion of the transmission millimeter-wave signal having propagated via the fourth dielectric guide 57 and the received wave having propagated via the second dielectric guide 58, and generates an intermediate-frequency signal.

In this millimeter-wave transmitter-receiver of the fourth embodiment of the invention, it is also possible that the difference in the characteristic impedance is adjusted between the third dielectric guide 55 and the antenna connected to the through hole 9, or the waveguide or the primary radiator connected to the antenna, and the power ratio Rp between one millimeter-wave signal portion Wa and another millimeter-wave signal portion Wb is set 0.27 or more, and the phase difference δ is set to δ=±π±0.42π as described above.

Further, it is preferable that an output terminal of the mixer 59 (25) is provided with a switching controller for opening the output terminal when the pulse-modulated transmission millwave signal is outputted from the pulse modulator (RF switch) (22).

With the configuration described above, the millimeter-wave transmitter-receiver of the fourth embodiment of the invention has advantages like those of the first millimeter-wave transmitter-receiver of the invention, excepting that the transmission millimeter-wave signal having propagated via the third dielectric guide 55 passes through the through hole 9, and that a portion of the transmission millimeter-wave signal is reflected on the through hole 9.

According to the millimeter-wave transmitter-receiver of the fourth embodiment of the invention having the configuration thus far described, a portion of the millimeter-wave signal of the transmission system can be prevented from leaking to the reception system so that its interference with the millimeter-wave signal to be received can be reduced. Thereby, it is possible to make the reception characteristics of the reception system of the millimeter-wave transmitter-receiver satisfactory. As a result, the power of the millimeter-wave signal of the transmission system can be enhanced to extend the transmission range of the millimeter-wave signal to be transmitted by the transmitting/receiving antenna and to improve the S/N (Signal-to-Noise) ratio so that the millimeter-wave transmitting/receiving performance can be improved as a whole. In the millimeter-wave transmitter-receiver of the fourth embodiment of the invention, moreover, either the antenna or the waveguide or the primary radiator connected to the antenna is connected over the through hole 9 of the parallel flat plate conductor 2 so that the millimeter-wave transmitter-receiver is advantageous in that the antenna can be housed on the parallel flat plate conductor when the millimeter-wave transmitter-receiver is to be made into a module thereby to configure the module in a small size.

Thus, according to the transmitting/receiving antenna of the invention and the millimeter-wave transmitter-receiver using the antenna, it is possible to provide the transmitting/receiving antenna, which can prevent a portion of the millimeter-wave signal of the transmission system from leaking directly to the reception system, and the millimeter-wave transmitter-receiver using the antenna, which has a high millimeter-wave transmitting/receiving performance.

The invention should not be limited to the aforementioned embodiments but may be modified in various manners without departing from the gist thereof. For example, the millimeter-wave radar R1 which is of the third embodiment of the invention may also be configured such that an opening is formed in the first parallel flat plate conductor of the NRD guide which has the dielectric guides between the first and second parallel flat plate conductors which are the parallel flat plate conductors 51, such that the antenna 56 (24) is connected to one end of the third dielectric guide 55 through either the opening or a waveguide or the dielectric guide connected to the opening, and such that the length taken along the third dielectric guide 55 from the other end of the third dielectric guide 55 to the opening is set to δ=±π. In this case, the mixer output fluctuation $\Delta P_{MIX}$ is suppressed to provide a satisfactory millimeter-wave transmitting/receiving performance. In addition, the millimeter-wave transmitting/receiving electromagnetic wave can be irradiated from the antenna 56 (24) disposed on the first parallel flat plate conductor to an upper direction of the first conductor plate so that the millimeter-wave radar R1 can be mounted as the module on an objective by using the side face in general parallel with the second conductor plate as the mounting face. Usually, the millimeter-wave radar module is configured by arranging a plurality of parts such as the dielectric guides configuring the millimeter-wave circuit between the parallel flat plate conductors 51. Therefore, the millimeter-wave radar module has a principal face of a wide area in parallel with the parallel flat plate conductors. By using the face as the mounting face, the radar module can be stably mounted on the objective. The millimeter-wave radar R1 can be firmly mounted on a vehicle, for example, on the front or rear portion of the vehicle so that it can easily transmit/receive the millimeter-wave signal to/from another vehicle ahead or behind.

Next, an isolator of the fifth embodiment of the invention will be described in detail with reference to the accompanying drawings.

Figure 10:
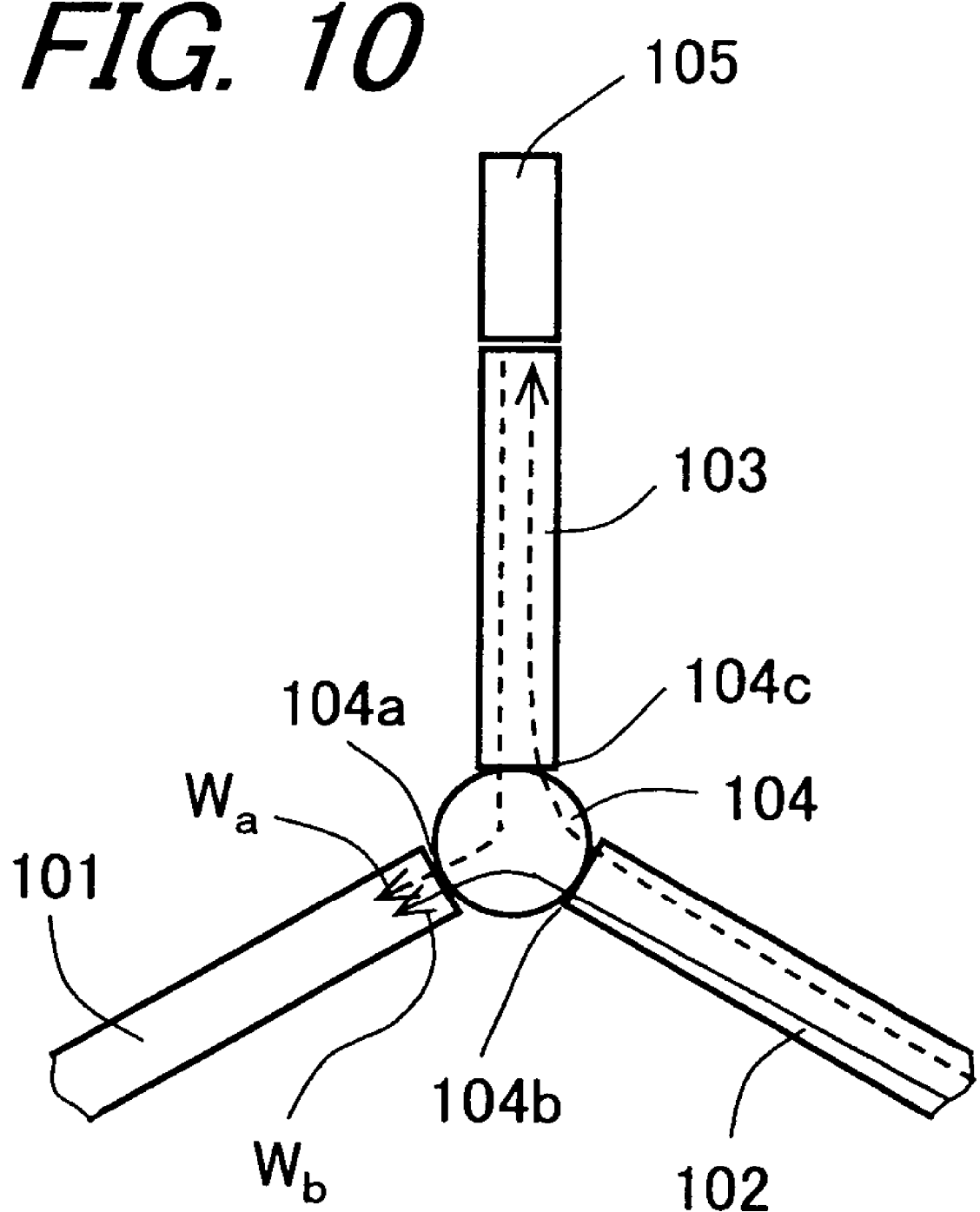
FIG. 10 is a schematic top plan view showing an isolator of a fifth embodiment of the invention.
Figure 11:
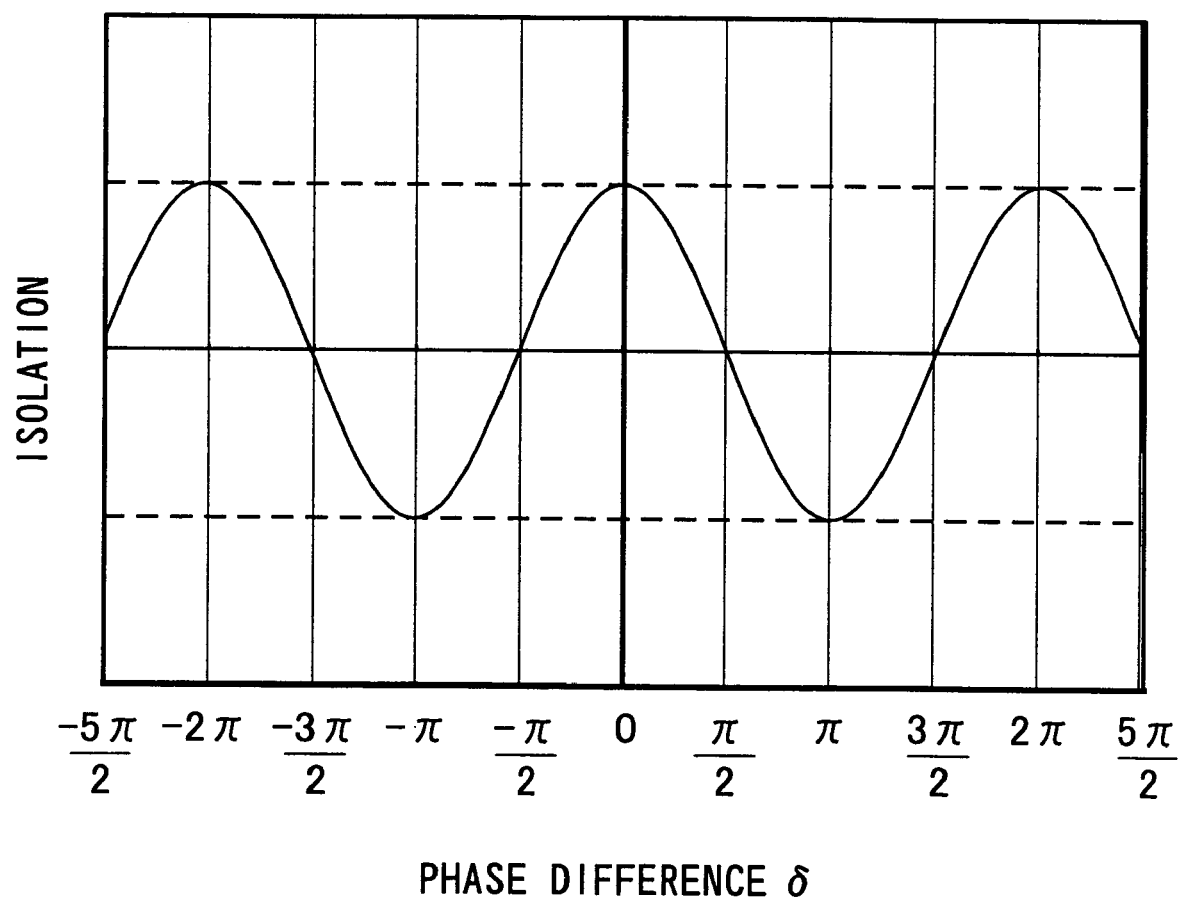
FIG. 11 is a diagram showing a dependency of isolation characteristics in the isolator of FIG. 10 upon a phase difference δ.

FIG. 10 is a schematic top plan view showing the isolator of the fifth embodiment of the invention. FIG. 11 is a diagram showing a dependency of the isolator characteristics of the isolator shown in FIG. 10, upon the phase difference δ. In FIG. 10, reference numerals 101, 102 and 103 denote first, second and third dielectric guides, respectively, acting as transmission lines. Reference numeral 104 denotes a ferrite plate as a magnetic element; reference numeral 105 denotes a non-reflective terminator; reference numerals 104a, 104b and 104c denote first, second and third connecting portions, respectively. Moreover, letters Wa and Wb represent a high-frequency signal to leak from the second dielectric guide 102 to the first dielectric guide 101, and the high-frequency signal to leak from the third dielectric guide 103 to the first dielectric guide 101, respectively. With reference to FIG. 4, reference numerals 1 and 2 denote parallel flat plate conductors, and reference numeral 3 denotes a dielectric guide.

An isolator as shown in FIG. 1 comprises a circulator and a non-reflective terminator 105. In the circulator, the first dielectric guide 101, the second dielectric guide 102 and the third dielectric guide 103 for transmitting the high-frequency signal are connected radially to the peripheral edge portion of the ferrite plate 104 by the first connecting portion 104a, the second connecting portion 104b and the third connecting portion 104c, respectively, and the high-frequency signal inputted from one connecting portion is outputted from one of the remaining adjacent connecting portions. The non-reflective terminator 105 is connected to the other end of the third dielectric guide 103 connected at its one end to the third connecting portion 104c. In the isolator of the embodiment, the line length of the third dielectric guide 103 is set so that $\delta = \pm \pi$ in which $\delta$ is a phase difference at the center frequency between signals Wa and Wb. Here, Wa is one portion of the high-frequency signal to be transmitted, which has been reflected via the third dielectric guide 103 on the non-reflective terminator 105 and returned to leak from the third connecting portion 104c via the circulator (or the ferrite plate 104) and from the first connecting portion 104a to the first dielectric guide 101. Wb is another portion of high-frequency signal, which has leaked from the second dielectric guide 102 and from the second connecting portion 104b through the circulator (or the ferrite plate 104) and from the first connecting portion 104a to the first dielectric guide 101.

Specifically in this configuration, the first dielectric guide 101, the second dielectric guide 102 and the third dielectric guide 103 correspond to the dielectric guide 3 which is the component of the non-radiative dielectric waveguide shown in FIG. 4. Those first, second and third dielectric guides 101, 102 and 103 function as the first, second and third transmission lines, respectively, by the non-radiative dielectric waveguides.

In a fundamental configuration of that non-radiative dielectric waveguide, as shown in a partially broken perspective view of FIG. 4, the dielectric guide 3 having a rectangular section is arranged between the parallel flat plate conductors 1 and 2 arranged at a predetermined spacing a, as defined by a $\leq \lambda/2$ for the wavelength $\lambda$ of the high-frequency signal. As a result, the high-frequency signal can be propagated without any substantial loss in the dielectric guide 3 by eliminating the intrusion of the noise from the outside into the dielectric guide 3 and the radiation of the high-frequency signal to the outside. Herein, the wavelength $\lambda$ is a wavelength of the millimeter-wave signal in the air (or the free space) for the frequency in use.

The isolator of the fifth embodiment of the invention, as shown in the top plan view of FIG. 10, shows the case, in which the non-radiative dielectric waveguides are used as the first, second and third transmission lines. The first, second and third dielectric guides 101, 102 and 103, the ferrite plate 104 and the non-reflective dielectric guide 105 are sandwiched between the parallel flat plate conductors (although not shown in FIG. 10) having a spacing of one half of the wavelength of the high-frequency signal or less.

In the isolator of the fifth embodiment of the invention, the first, second and third transmission lines may also be exemplified in addition to those dielectric guides by the strip guides, the micro-strip guides, the coplanar guides, the coplanar guides with the ground, the slot guides, the waveguides or the dielectric waveguides.

In the isolator of the fifth embodiment of the invention shown in FIG. 10, like the isolator of the related art, the high-frequency signal inputted to the first dielectric guide 101 is inputted from the first connecting portion 104a to the adjacent second connecting portion 104b and is outputted from the second dielectric guide 102. That portion of the high-frequency signal, which was reflected on the output terminal of the second dielectric guide 102, is returned via the second dielectric guide 102 and is inputted from the second connecting portion 104b and is outputted from the adjacent third connecting portion 104c to the third dielectric guide 103 so that the high-frequency signal portion is terminated at the non-reflective terminator 105 connected to the other end of the third dielectric guide 103. Thus, the isolator operates to prevent the high-frequency signal from leaking from the second dielectric guide 102 to the first dielectric guide 101. However, the line length of the third dielectric guide 103 connected to the non-reflective terminator 105 is set unlike the related art. In the isolator of the fifth embodiment of the invention, the line length of the third dielectric guide 103 is set to $\delta = \pm \pi$. As a result, the high-frequency signal to leak from the second dielectric guide 102 to the first dielectric guide 101 and the high-frequency signal to leak from the third dielectric guide 103 to the first dielectric guide 101 can be reliably reversed in phase even when the high-frequency signal changes in the advancement of phase at the reflecting time of the high-frequency signal on the non-reflective terminator 105. The two high-frequency signals can interfere to weaken and cancel each other effectively thereby to make the isolation characteristics satisfactory.

FIG. 11 is a diagram showing the dependency of those isolation characteristics upon the phase difference $\delta$. The abscissa and the ordinate indicate the phase difference $\delta$ (unit: radian) and the isolation (having no unit), respectively, and the solid characteristic curve indicates the dependency of the isolation characteristics on the phase difference $\delta$. The isolation is a quantity expressing the intensity of the high-frequency signal, which is returned from the output terminal side to the input terminal side, to the intensity (having a unit of watt (W)) of the high-frequency signal inputted, in terms of a ratio. The isolation characteristics are the better for the smaller isolation.

The isolation characteristics of the isolator of the fifth embodiment of the invention, as shown in FIG. 10, are borne such that the isolation varies according to $A \cdot \cos \delta$ (in which A is a proportional coefficient and a real number), as shown in the diagram in FIG. 11, and such that the isolation is characterized to become the smallest when the phase difference $\delta$ at the center frequency between the high-frequency signal Wa, which has leaked from the second dielectric guide 102 via the second connecting portion 104b, the ferrite plate 104 and the third connecting portion 104c to the third dielectric guide 103 and which is reflected via the third dielectric guide 103 on the non-reflective terminator 105 and returned to leak via the third connecting portion 104c, the ferrite plate 104 and the first connecting portion 104a to the first dielectric guide 101, and the high-frequency signal Wb, which is reflected on the output terminal side which is the other end side of the second dielectric guide 102 to leak from the second dielectric guide 102 via the second connecting portion 104b, the ferrite plate 104 and the first connecting portion 104a to the first dielectric guide 101, is $\pm\pi$, $\pm 3\pi$, ..., and $(2N+1) \cdot \pi$ (N is an integer).

The variation of the phase at the time when the high-frequency signal leaks from the second connecting portion 104b to the first connecting portion 104a is identical to the variation of the phase at the time when the high-frequency signal leaks from the third connecting portion 104c to the first connecting portion 104a. Moreover, in a case where the phase of the high-frequency signal does not vary when the high-frequency signal is reflected on the non-reflective terminator 105, the phase difference between the high-frequency signal, which leaks from the second dielectric guide 102 to the third dielectric guide 103 and which is reflected via the third dielectric guide 103 on the non-reflective terminal 105 and returned to leak to the first dielectric guide 101, and the high-frequency signal, which leaks from the second dielectric guide 102 to the first dielectric guide 101, is identical to the phase variation of the high-frequency signal while this high-frequency signal reciprocates via the third dielectric guide 103. In a case where the third dielectric guide 103 has the line length of $(2n+1)/4 \cdot \lambda g$ (n is an integer, and $\lambda g$ is a wavelength of the high-frequency signal in the third dielectric guide 103) at this time, the phase difference between the high-frequency signal to leak from the second dielectric guide 102 via the third dielectric guide 103 to the first dielectric guide 101 and the high-frequency signal to leak from the second dielectric guide 102 via the second connecting portion 104b, the ferrite plate 104 and the first connecting portion 104a to the first dielectric guide 101 can be just reversed.

As a matter of fact, however, the high-frequency signal varies in phase in most cases when the signal is reflected on the non-reflective terminator 105. This is because the non-reflective terminator 105 usually deviates from the ideal characteristics so that the high-frequency signal is advanced or retarded in its phase by the reactance component of the reflection coefficient when the high-frequency signal is reflected.

As a matter of fact, moreover, it may occur that the phase variation at the time when the high-frequency signal leaks from the second dielectric guide 102 via the second connecting portion 104b, the ferrite plate 104 and the first connecting portion 104a to the first dielectric guide 101 is different from the phase variation at the time when the high-frequency signal leaks from the third dielectric guide 103 via the third connecting portion 104c, the ferrite plate 104 and the first connecting portion 104a to the first dielectric guide 101. This is because those phase variations may be caused by the fact that the angles made individually by the first dielectric guide 101, the second dielectric guide 102 and the third dielectric guide 103 arranged radially on the ferrite plate 104 are made different by the deviations of arrangement or the like.

As a matter of fact, therefore, the length L corresponding to that phase difference of the high-frequency signals, which is thus made by causes other than the line length of the third dielectric guide 103 in the two different routes, is corrected with respect to the line length of the third dielectric guide 103. Then, it is possible to reverse the phase difference correctly between the high-frequency signal, which leaks from the second dielectric guide 102 to the third dielectric guide 103, which are these two different routes, and which is reflected via the third dielectric guide 103 on the non-reflective terminal 105 and returned to leak to the first dielectric guide 101, and the high-frequency signal which leaks from the second dielectric guide 102 to the first dielectric guide 101. For this phase reversal, the line length of the third dielectric guide 103 may be set to $\{(2n+1)/4 \cdot \lambda g + L\}$, which is corrected from $\{(2n+1)/4 \cdot \lambda g\}$.

In the isolator of the fifth embodiment of the invention, the value of $\{(2n+1)/4 \cdot \lambda g + L\}$ is not finally determined by measuring the individual phase variations corresponding to the contents of the length L and by summing the measured values to determine the length L. Alternatively as a more convenient method, the line length of the third dielectric guide 103 is so set by measuring the phase difference $\delta$ that the phase difference $\delta$ may be $\delta = \pm \pi$. Specifically, the line length of the third dielectric guide 103 may be set in the following manner.

At first, the line length of the third dielectric guide 103 is set to $(2n+1)/4 \cdot \lambda g$, and the test terminals of the network analyzer are individually connected to the input terminal (or the other terminal) of the first dielectric guide 101 and the output terminal (or the other end) of the second dielectric guide 102 thereby to measure the transmission characteristics of the high-frequency signal to transmit from the second dielectric guide 102 to the first dielectric guide 101. Next, the line length of the third dielectric guide 103 is changed to values changed from the initially set one. For some of these different lengths, the transmission characteristics of the high-frequency signal to transmit from the second dielectric guide 102 to the first dielectric guide 101 are measured by the same method. Then, the measured values of those transmission characteristics are plotted on the ordinate of the diagram, as shown in FIG. 11, against the line length of the third dielectric guide 103 on the abscissa. An approximate curve of $A \cdot \cos \theta$ is drawn over that plot, and the line length of $\{(2n+1)/4 \cdot \lambda g + L\}$ of the third dielectric guide 103 for the phase difference $\delta$ of $\delta = \pm \pi$ may be read from the minimum of that curve. Thus, it is possible to reverse the phase difference reliably between the high-frequency signal, which leaks from the second dielectric guide 102 to the third dielectric guide 103 and which is reflected via the third dielectric guide 103 on the non-reflective terminal 105 and returned to leak to the first dielectric guide 101, and the high-frequency signal which leaks from the second dielectric guide 102 to the first dielectric guide 101. As a result, the isolation characteristics can be made better than those of the related art.

Next, here will be described in detail the components of the isolator of the fifth embodiment of the invention. In the isolator of the fifth embodiment of the invention, the material for the first, second and third dielectric guides 101, 102 and 103 is preferably resin such as ethylene tetrafluoride or polystylene, or ceramics having a low dielectric constant such as cordierite ($2MgO \cdot 2Al_2O_3 \cdot 0.5SiO_2$) ceramics, alumina ($Al_2O_3$) ceramics or glass ceramics, and these substances have a low loss in the millimeter-wave band.

Further, the sectional shape of the first, second and third dielectric guides 101, 102 and 103 is basically a rectangular one but may also be a rectangle having rounded corners and a variety of sectional shapes used for transmitting the millimeter-wave signal.

Further, the material for the ferrite plates 104 and 7 is preferably a ferrite of zinc.nickel.iron oxide ($Zn_aNi_bFe_cO_x$), for example, for the millimeter-wave signal.

Further, the ferrite plate 104 is normally formed into a disc shape but may also be formed into a regular polygon shape in a top plan view. In this case, when the number of dielectric guides to be connected is n (n is an integer of 3 or more), it is preferable that their top plan shape is made to be a regular m-polygon shape (m is an integer lager than n of 3 or more).

Further, the non-reflective terminator 105 may be configured at the other end of the third dielectric guide 103 by attaching a layered resistor or electric wave absorber to the upper and lower end portions of the side faces (i.e., the faces not confronting the inner faces of the not-shown parallel flat plate conductors) of the two sides. At this time, a nickel-chromium alloy or carbon is preferred as the material for the resistor. Moreover, permalloy or Sendust is preferred as the material for the electric wave absorber. The high-frequency signal can be efficiently attenuated by using those materials. Another material may be used for attenuating the high-frequency signals.

Thus according to the isolator of the fifth embodiment of the invention, it is possible to provide a circulator type isolator for high-frequency signals, which has been improved in the isolation characteristics.

Tthe invention should not be limited to the example of the mode of embodiment thus far described, but can be modified in various manners without departing from the gist thereof. For example, the resistance of the non-reflective terminator 105 may be so deviated from the characteristic impedance of the third dielectric guide 103 as to equalize the intensity of the high-frequency signal to leak from the second dielectric guide 102 via the second connecting portion 104b, the ferrite plate 104 and the first connecting portion 104a to the first dielectric guide 101 and the intensity of the high-frequency signal to leak from the third dielectric guide 103 via the third connecting portion 104c, the ferrite plate 104 and the first connecting portion 104a to the first dielectric guide 101. In this case, the two high-frequency signals of opposite phases to leak to the first dielectric guide 101 have equal intensities and cancel each other more effectively so that the isolation characteristics become more satisfactory.

Next, a isolator of the sixth embodiment of the invention will be described in detail with reference to the drawings.

Figure 12:
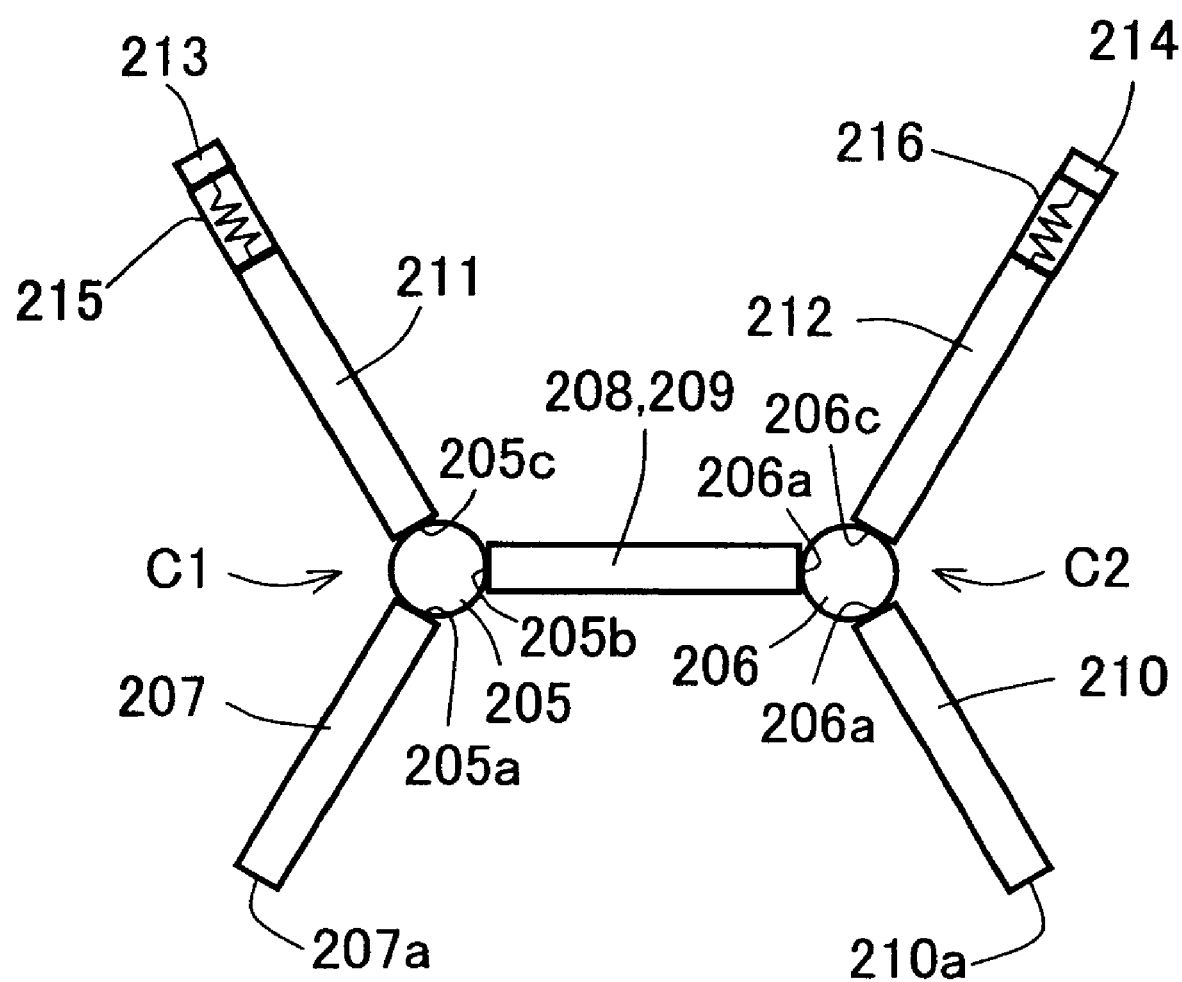
FIG. 12 is a schematic top plan view showing an isolator of a sixth embodiment of the invention.

FIG. 12 is a schematic top plan view showing the isolator of the sixth embodiment of the invention. In FIG. 12, reference numerals 205 and 206 denote ferrite plates as magnetic elements, reference numerals 207 and 208 denote microstrip guides individually as first transmission lines, reference numerals 209 and 210 denote microstrip guides individually as the second transmission lines, reference numerals 211 and 212 denote microstrip guides individually as the third transmission lines, reference numerals 213 and 214 denote grounded conductors, and reference numerals 215 and 216 denote terminal resistors individually as non-reflective terminators.

An isolator of the sixth embodiment of the invention, as shown in the top plan view of FIG. 12, comprises first and second circulators C1 and C2, and terminal resistors 215 and 216 as non-reflective terminators. In the circulators C1 and C2, the microstrip guides 207 and 208 as the first transmission line, the microstrip guides 209 and 210 as the second transmission line and the microstrip guides 211 and 212 as the third transmission line to transmit the high-frequency signal are radially connected to the peripheral edge portions of the ferrite plates 205 and 206 as the magnetic elements, respectively, by first connecting portions 205a and 206a, second connecting portions 205b and 206b and third connecting portions 205c and 206c, and the high-frequency signal inputted from one connecting portion to another adjacent connecting portion is outputted. The second microstrip guide 209 of the first circulator C1 acts as the first microstrip guide 208 of the second circulator C2, and thereby the second microstrip guide 209 of the first circulator C1 is provided.

The terminal resistors 215 and 216 are connected to the other ends of the third microstrip guides 211 and 212 which are connected at their one-ends with the respective third connecting portions 205c and 206c of the first and second circulators C1 and C2. In the isolator of the embodiment, the frequency dependency of the isolation characteristics between the high-frequency signal to transmit from the first microstrip guide 207 to the second microstrip guide 209 and the high-frequency signal to transmit from the second microstrip guide 209 to the first microstrip guide 207 of the first circulator C1 is different from the frequency dependency of the isolation characteristics between the high-frequency signal to transmit from the first microstrip guide 208 to the second microstrip guide 210 and the high-frequency signal to transmit from the second microstrip guide 210 to the first microstrip guide 208 of the second circulator C2.

In the first and second circulators C1 and C2, however, the high-frequency signals are individually transmitted forward (counter-clockwise, as seen downward, in this example) in the order from the first microstrip guides 207 and 208 to the second microstrip guides 209 and 210, from the second microstrip guides 209 and 210 to the third microstrip guides 211 and 212, and from the third microstrip guides 211 and 212 to the first microstrip guides 207 and 208. Moreover, the isolator, in which the first and second circulators C1 and C2 are connected, outputs the high-frequency signal inputted to the input terminal 207a of the first microstrip guide 207 of the first circulator C1, from the output terminal 210a of the second microstrip guide 210 of the second circulator C2.

In this configuration, each of the microstrip guides 207 to 212 may include a strip conductor formed on a surface of a dielectric substrate (not shown), and a grounded conductor (not shown) formed on the back of the dielectric substrate. The grounded conductor (not shown) and the grounded conductor 213, 214 may be connected to each other by a through conductor (not shown) extending through that dielectric substrate, and the terminal resistors 215 and 216 may be connected between the grounded conductors 213 and 214 and the end portions of the strip conductors of the third microstrip guides 211 and 212. Moreover, each of the microstrip guides 207 and 212 may be preset to a predetermined characteristic impedance such as 50 Ω0 by adjusting a dielectric constant, a thickness of the dielectric substrate, or a width of the strip conductor, and the resistance of the terminal resistor 215 or 216 may also be set to the values matching that the characteristic impedance.

The material to be used for the dielectric substrate of the individual microstrip guides 207 to 212 may be preferably a material having a high resistivity and a low dielectric loss tangent such as quartz, sapphire, ceramics, epoxy, glass epoxy or ethylene tetrafluoride. In a case where the isolator is to be formed as one circuit element over a microwave monolithic integrated circuit (MMIC) the dielectric substrate may be replaced by a semiconductor substrate of a compound of III-V group such as gallium arsenide (GaAs). Moreover, the material of the strip conductor or the grounded conductor of the individual microstrip guides 207 to 212 may be preferably a metal having an excellent conductivity such as copper (Cu), gold (Au), silver (Ag), titanium (Ti) or aluminum (Al). For the terminal resistors 215 and 216, there may be properly used a thin film resistor made of tantalum nitride (TaN). Thus, the high-frequency signals to be transmitted to the third microstrip guides 211 and 212 can be terminated so satisfactorily as may not be reflected on the terminal resistors 215 and 216.

On the other hand, the ferrite plates 205 and 206 may be placed at the center of the area which is enclosed by the end portions of the strip conductors of the individual microstrip guides 207 to 212 radially arranged. In order to make the frequency dependency of the isolation characteristics different between the first circulator C1 and the second circulator C2, moreover, the material, the size, the thickness or the shape may be different between those two ferrite plates 205 and 206. Of the ferrites, for example, a zinc/nickel/iron oxide ($Zn_aNi_b$-$Fe_cO_x$) is suitable for the material of the ferrite plates 205 and 206. Moreover, the shape of the ferrite plates 205 and 206 may be a disc shape or a regular polygon shape in the top plan shape (or in the top plan view). In the case of the regular polygon top plan shape, the number of the transmission lines to be connected is three, and the top plan shape may be a regular triangle or a regular m-polygon shape (m: an integer of 3 or more). Thus, the frequency dependency of the isolation characteristics can be exclusively controlled without exerting any affection on the transmission characteristics of the individual microstrip guides 207 to 212.

In another method, the first circulator C1 and the second circulator C2 may be different in the width of the strip conductors of the individual microstrip guides 207 to 212. In this modification, it is necessary to consider that the microstrip guides 207 to 212 having different widths of their strip conductors vary in the characteristic impedances so that the transmission characteristics of the high-frequency signals change.

In the configuration thus far described, moreover, the line lengths of the third microstrip guides 211 and 212 are set so that $\delta=\pm\pi$ in which $\delta$ is a phase difference at a center frequency between singals Wa, which is a high-frequency signal portion reflected via the third microstrip guides 211 and 212 on the terminal resistors 215 and 216 and returned to leak to the first microstrip guides 207 and 218, and wb, which is another high-frequency signal portion having leaked from the second microstrip guides 209 and 210 through the first and second circulators C1 and C2 to the first microstrip guides 207 and 208.

For this setting, the line lengths of the third microstrip guides 211 and 212 may be so adjusted that the transmission characteristics $S_{21}$ of the high-frequency signal to transmit from the output terminal 210a of the second microstrip guide 210 of the second circulator C2 to the input terminal 207a of the first microstrip guide 207 of the first circulator C2.

In the configuration thus far described, moreover, the first and second circulators C1 and C2 may preferably be so connected that the second microstrip guide 209 of the first circulator C1 acts as the first microstrip guide 208 of the second circulator C2.

The isolator thus configured, as shown in FIG. 12, operates in the following manner. The high-frequency signal inputted to the input terminal 207a is outputted via the first microstrip guide 207 of the first circulator C1, the second microstrip guide 209 (or the first microstrip guide 208 of the second circulator C2) and the second microstrip guide 210 of the second circulator C2 sequentially in the recited order from the output terminal 210a. On the contrary, the high-frequency signal, which has been reflected and returned from the outside and inputted to the output terminal 210a, is inputted as a portion, after reflected on the terminal resistor 216, from the third microstrip guide 212 and as another portion from the second microstrip guide 210, respectively, as $Wa_2$ and $Wb_2$ for the signals Wa and Wb to the second microstrip guide 209 of the first circulator C1 (or the first microstrip guide 208 of the second circulator C2) through the second circulator C2. Moreover, the high-frequency signal inputted to the second microstrip guide 209 (or the first microstrip guide 208) is inputted as a portion, after reflected on the terminal resistor 215 via the first circulator C1, from the third microstrip guide 211 and as another portion from the second microstrip guide 209 (or the first microstrip guide 208), respectively, as $Wa_1$ and $Wb_1$ for the signals Wa and Wb to the second microstrip guide 209 (or the first microstrip guide 208).

At this time, the frequency dependency of $(Wa_1+Wb_1)$ and the frequency dependency of $(Wa_2+Wb_2)$ are made different by the aforementioned configuration, the high-frequency signal to be returned to the input terminal 207a can be suppressed over a wide frequency band by combining two attenuation characteristics of the frequency band width, in which the value of $(Wa_1+Wb_1)$ becomes smaller, and the frequency band width, in which the value of $(Wa_2+Wb_2)$ becomes smaller. This makes it possible to widen the frequency band width for retaining an isolation at a predetermined or higher value.

Independently of the variation in the phase of the high-frequency signal at the time when the high-frequency signal is reflected on the terminal resistors 215 and 216, moreover, the wave portions of $(Wa_1+Wb_1)$ are just reversed so that they are effectively weakened and synthesized, and the wave portions of $(Wa_2+Wb_2)$ are just reversed so that they are effectively weakened and synthesized. As a result, it is possible to enhance the isolation more.

Therefore, an isolator of a sixth embodiment of the invention, as shown in the top plan view of FIG. 12, takes the configuration thus far described so that the isolation can be taken without being deviated only to a specific frequency. As a result, the frequencies, at which the first and second circulators C1 and C2 take the maximum isolation, can be set to different values thereby to make the frequency band width, for which an isolation at a predetermined or higher value is retained, wider than that of the case in which the frequencies at which the first and second circulators C1 and C2 take the maximum isolation are set to equal value.

Moreover, the line lengths of the third microstrip guides 211 and 212 are set so that $\delta=\pm\pi$, in which $\delta$ is a phase difference at the center frequency between a signal Wa, which is a high-frequency signal portion reflected via the third microstrip guides 211 and 212 on the terminal resistors 215 and 216 and returned to leak to the first microstrip guides 207 and 208, and a signal Wb, which is another high-frequency signal portion having leaked from the second microstrip guides 209 and 210 through the first and second circulators C1 and C2 to the first microstrip guides 207 and 208. Then, the phase difference $\delta$ between the signals Wa and Wb is $\delta=\pm\pi$. Even when the advancements of the phases of the high-frequency signals change at the time when the high-frequency signals are reflected on the terminal resistors 215 and 216, the aforementioned two high-frequency signal portions to leak to the first microstrip guides 207 and 208 are reliably reversed in phase so that the signal portions can effectively cancel each other thereby to make the isolation characteristics satisfactory.

Moreover, the first and second circulators C1 and C2 can reduce the size of the isolator, when the circulators are so connected that the second microstrip guide 209 of the first circulator C1 acts as the first microstrip guide 208 of the second circulator C2.

In the isolator of the sixth embodiment of the invention, as first, second and third transmission lines, a strip line, a coplanar with a ground plane, a slot line, a waveguide, and a dielectric waveguide may be used instead of such microstrip guides.

Next, a high-frequency oscillator of a seventh embodiment of the invention and high-frequency transmitter-receivers of eighth and ninth embodiments of the invention will be described in detail by taking as examples of the millimeter-wave oscillator as the high-frequency oscillator and the millimeter-wave radar module as the high-frequency transmitter-receiver using the millimeter-wave oscillator.

Figure 13:
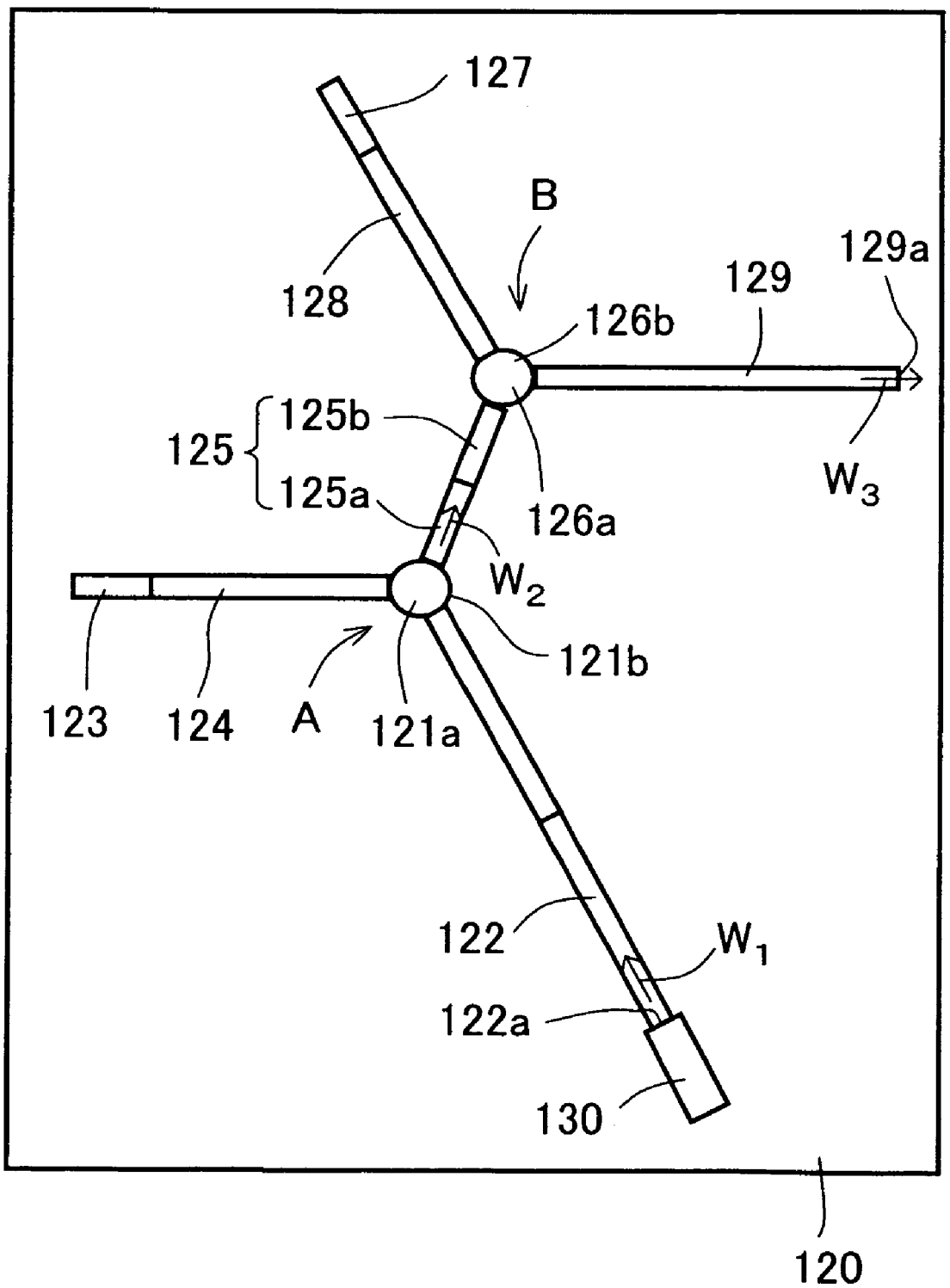
FIG. 13 is a top plan view showing a millimeter-wave oscillator as a high frequency oscillator of a seventh embodiment of the invention.
Figure 14:
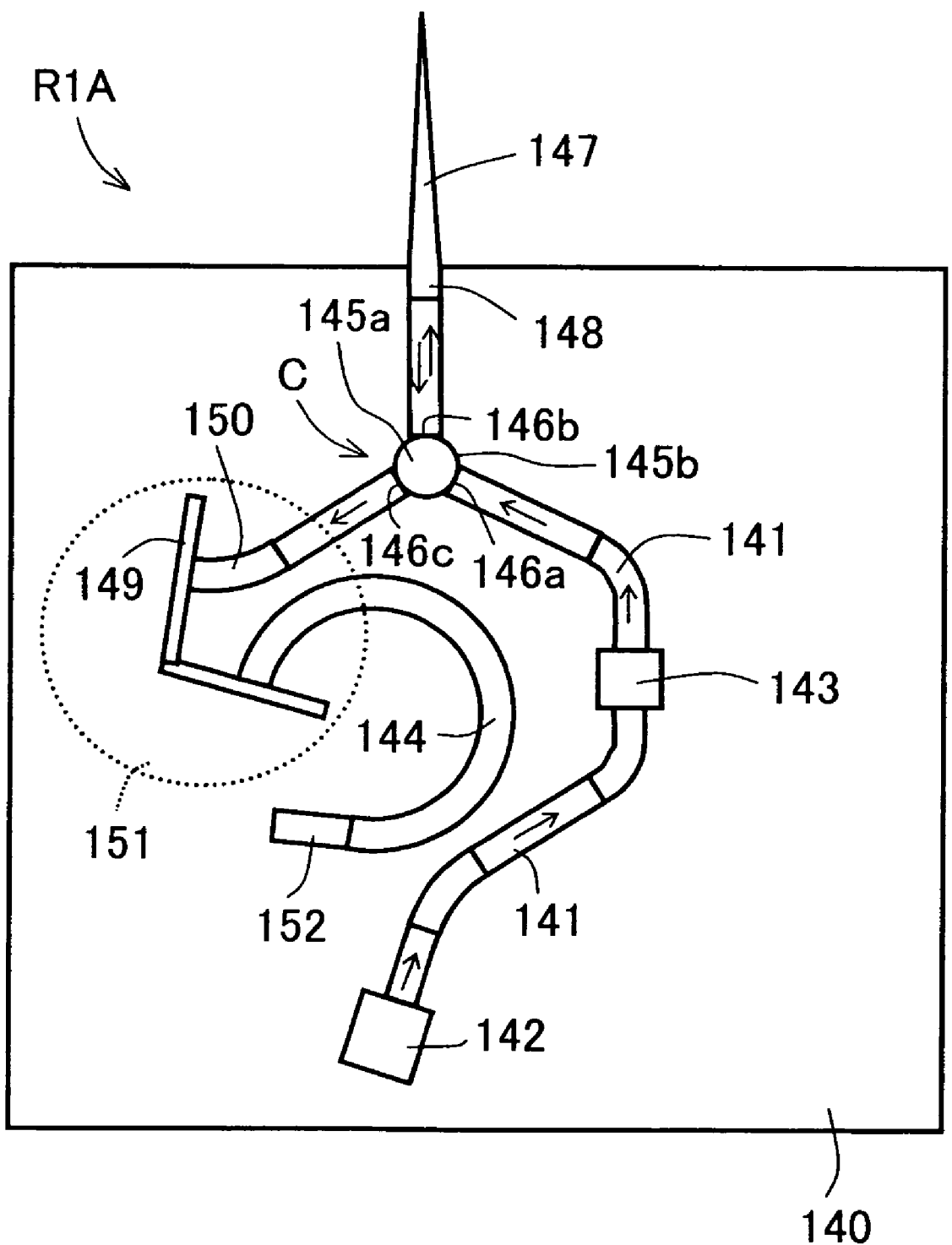
FIG. 14 is a top plan view showing a millimeter-wave radar module as a high frequency oscillator of an eighth embodiment of the invention.
Figure 15:
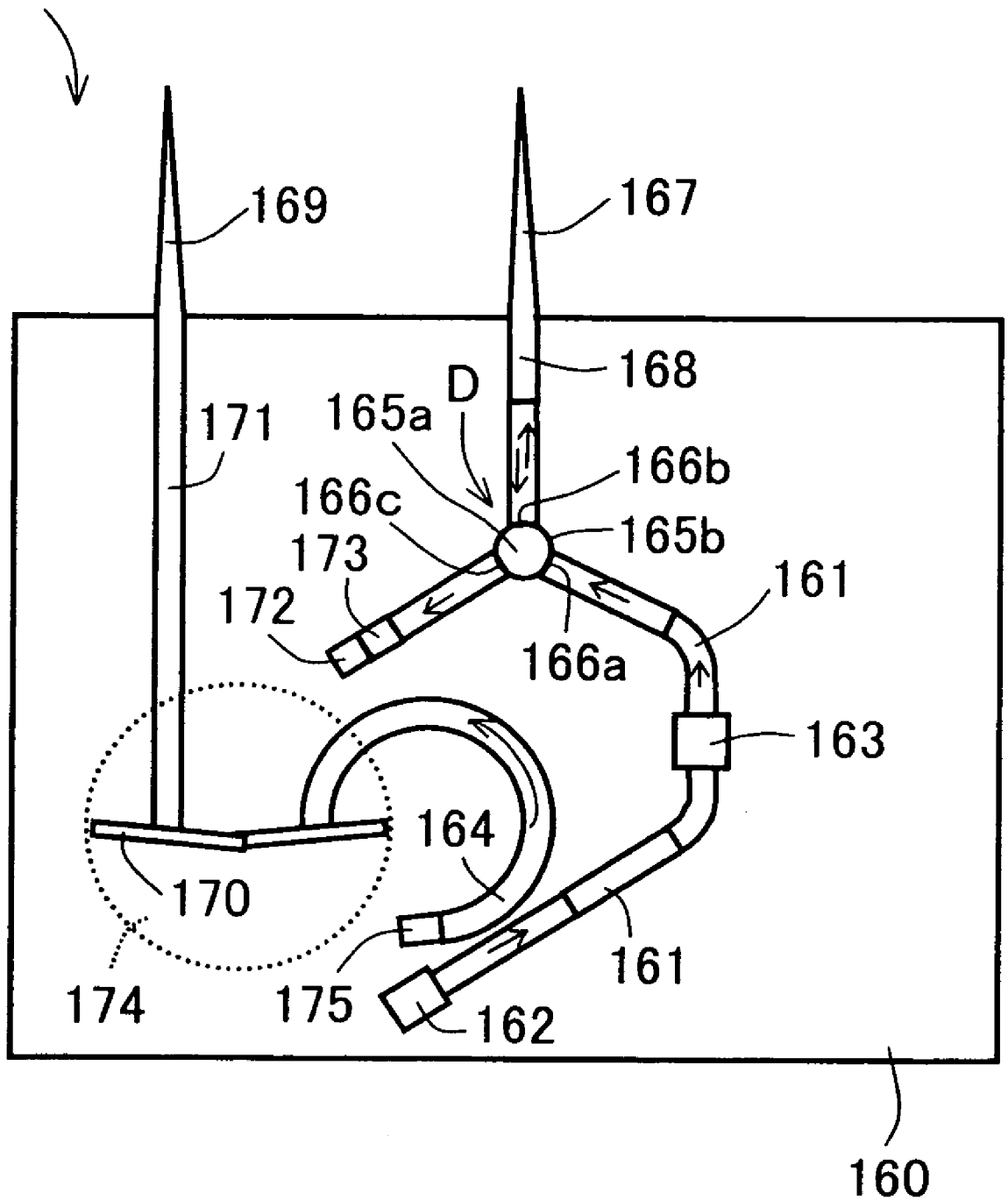
FIG. 15 is a top plan view showing a millimeter-wave radar module as a high frequency oscillator of a ninth embodiment of the invention.

FIG. 13 is a top plan view showing a millimeter-wave oscillator O according to the high-frequency oscillator of the seventh embodiment of the invention. Moreover, FIG. 14 and FIG. 15 are top plan views showing millimeter-wave radar modules R1A and R2A of the high-frequency transmitter-receivers of the eighth and ninth embodiments of the invention.

First of all, here will be described the main configuration of the millimeter-wave oscillator O according to the high-frequency oscillator of the seventh embodiment of the invention and its operations. As shown in FIG. 13, the millimeter-wave oscillator O includes a pair of parallel flat plate conductors 120 (the other of the pair is not shown), a first circulator A, and a second circulator B. The pair of parallel flat plate conductors 120 is arranged in parallel at a spacing therebetween of one half of less of the wavelength of a millimeter-wave signal $W_1$. The first circulator A is disposed between the parallel flat plate conductors 120, the first circulator A includes two ferrite plates 121a and 121b (the latter 121b is arranged on the lower side of the former 121a) disposed to confront each other in an inner face of the parallel flat plate conductors 120; an inputting dielectric guide 122, disposed radially with respect to the two ferrite plates 121a and 121b, respectively, for inputting the millimeter-wave signal $W_1$; a terminating dielectric guide 124 having a non-reflective terminator 123 provided at a leading end thereof; and an outputting dielectric guide 125a for outputting a millimeter-wave signal $W_1$ inputted to the inputting dielectric guide 122. Similarly, the second circulator B includes two ferrite plates 126a and 126b (the latter 126b is arranged on the lower side of the former 126a) disposed to confront each other in the inner face of the parallel flat plate conductors 120; and an inputting dielectric guide 125b disposed generally radially with respect to the two ferrite plates 126a and 126b, respectively, for inputting a millimeter-wave signal $W_2$; a terminating dielectric guide 128 having a non-reflective terminator 127 provided at a leading end thereof; and an outputting dielectric guide 129 for outputting a millimeter-wave signal inputted to the inputting dielectric guide 25b. The first circulator A and the second circulator B are connected by an inputting/outputting dielectric guide 125 in which the outputting dielectric guide 125a also acts as the inputting dielectric guide 125b. Moreover, a voltage-controlled oscillator 130 is connected to the input terminal 122a, to which the millimeter-wave signal $W_1$ of the inputting dielectric guide 122 is inputted.

In the high-frequency oscillator O of the embodiment, the frequency dependency of the isolation characteristics between a millimeter-wave signal $W_{12}$ to be transmitted from the inputting dielectric guide 122 of the first circulator A to the outputting dielectric guide 125a and a millimeter-wave signal $W_{21}$ to be transmitted backward of the millimeter-wave signal $W_{12}$ from the outputting dielectric guide 125a to the inputting dielectric guide 122 is different from the frequency dependency of the isolation characteristics between a millimeter-wave signal $W_{23}$ to be transmitted from the inputting dielectric guide 125b of the second circulator B to the outputting dielectric guide 129 and a millimeter-wave signal $W_{32}$ to be transmitted backward of the millimeter-wave signal $W_{23}$ from the outputting dielectric guide 129 to the inputting dielectric guide 125b. Here, the outputting dielectric guide 125a also acts as the inputting dielectric guide 125b, and these two dielectric guides will be occasionally explained as identical as the inputting/outputting dielectric guide 125. In FIG. 13, moreover, the ferrite plates 121b and 126b are individually arranged in parallel on the lower sides of the ferrite plates 121a and 126a.

In the embodiment, the isolation characteristics in the high-frequency oscillator of the invention are so defined as are defined by an isolation $I_1$ of the first circulator A or an isolation $I_2$ of the second circulator B, as expressed by the following Formulas:

$I_1 = -10 \cdot \log(P_{21}/P_{12})$; and $I_2 = -10 \cdot \log(P_{32}/P_{23})$.

Herein, $P_{21}$, $P_{12}$, $P_{32}$ and $P_{23}$ represent the powers of the millimeter-wave signals $W_{21}$, $W_{12}$, $W_{32}$ and $W_{23}$, respectively.

Figure 31:
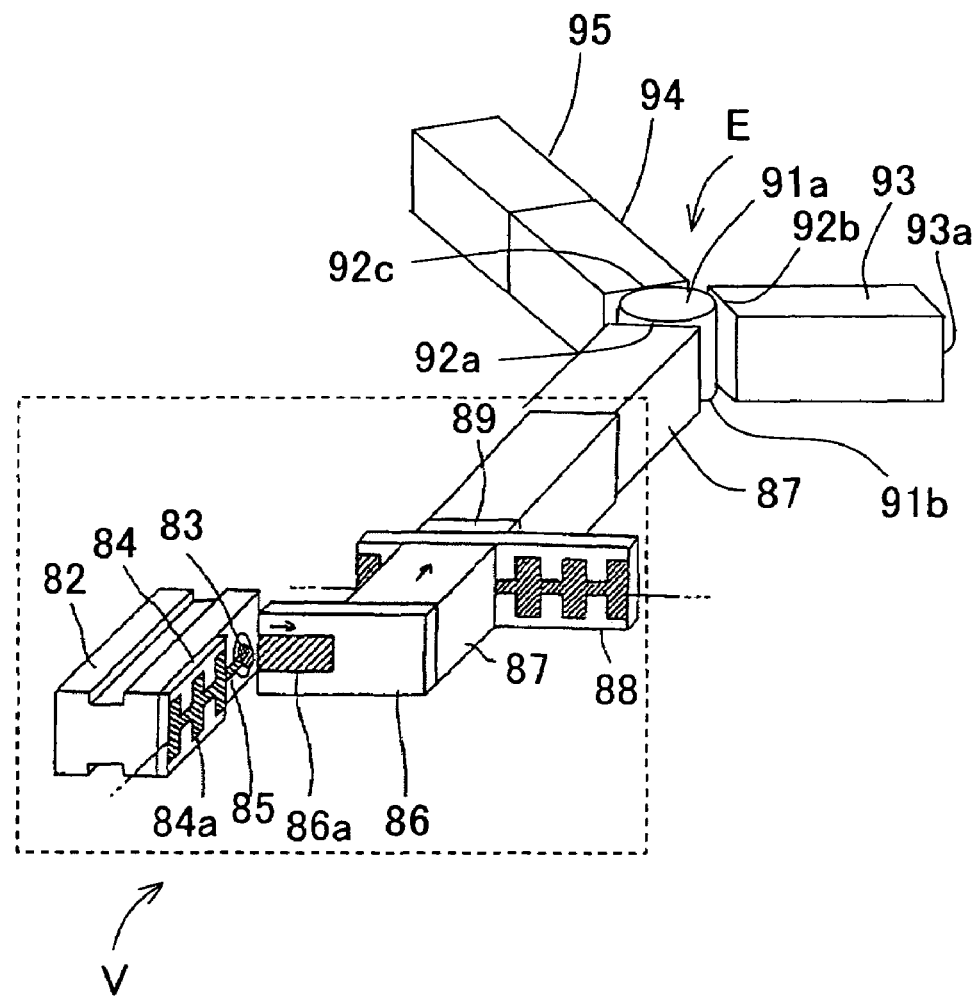
FIG. 31 is a perspective view showing an exmple of a conventional high-frequency oscillator.

In the configuration of the high-frequency oscillator shown in FIG. 13, the voltage-controlled oscillator 130 has a configuration similar to that of a voltage-controlled oscillator V shown in FIG. 31. Moreover, the two ferrite plates 121a and 121b of the circulator A and the two ferrite plates 126a and 126b of the circulator B are so arranged to confront each other that their principal faces are parallel to and concentric with the inner face of the parallel flat plate conductors 120. Those ferrite plates may have their principal faces in contact with or at a predetermined spacing from the inner faces of the parallel flat plate conductors 120. In the example shown in FIG. 13, the principal faces of the two ferrite plates 121a and 121b or the two ferrite plates 126a and 126b are made so flush with the principal faces of the inputting dielectric guides 122 and 125b, the outputting dielectric guides 125a and 129 and the terminating dielectric guides 124 and 128 that they contact with the inner faces of the parallel flat plate conductors 120. Those ferrite plates 121a, 121b, 126a and 126b are usually formed into a disc shape but may be a regular polygon shape. In this case, the number of the transmission lines to be connected is three, and the top plan shape may be a regular m-polygon shape (m: an integer of 3 or more).

Moreover, the materials for the inputting dielectric guides 122 and 125b, the outputting dielectric guides 125a and 129 and the terminating dielectric guides 124 and 128 are preferably resin such as ethylene tetrafluoride and polystylene, or ceramics such as cordierite ($2MgO.2Al_2O_3.5SiO_2$) ceramics, alumina ($Al_2O_3$) ceramics or glass ceramics, and these materials have a low loss in the high-frequency band.

On the other hand, the material for the parallel flat plate conductors 120 for the NRD guides is preferably exemplified in a high electric conductivity and in an excellent workability by a conductor plate of Cu, Al, Fe, Ag, Au, Pt, SUS (i.e., stainless steel) or brass (i.e., a Cu—Zn alloy). Alternatively, a conductor layer of those materials may also be formed on the surface of an insulating plate made of ceramics or resin.

Moreover, a line length of the inputting/outputting dielectric guide 125 is preferably set to such a value that the directly reflected millimeter-wave signal and the millimeter-wave signal multiply reflected between the first circulator A and the second circulator B are synthesized in opposite phases at the connecting portion between the first circulator A and the inputting dielectric guide 122. As a result, the millimeter-wave signal, which is multiply reflected between the first circulator A and the second circulator B, can be prevented from leaking to the inputting dielectric guide 122, thereby the isolation of the entire two-stage type circulator is improved.

The main operations of the millimeter-wave oscillator O according to the high-frequency oscillator of the seventh embodiment of the invention are as follows. At first, in the millimeter-wave oscillator O, the millimeter-wave signal $W_1$ generated by the voltage-controlled oscillator 130 propagates in the inputting dielectric guide 122 of the first circulator A and is outputted as the millimeter-wave signal $W_2$ from the outputting dielectric guide 125a. Next, the millimeter-wave signal $W_2$ is propagated through the inputting dielectric guide 125b of the second circulator B and is outputted as a millimeter-wave signal $W_3$ from the outputting dielectric guide 129. Finally, the millimeter-wave signal is outputted as a millimeter-wave oscillating output from the output terminal 129a of the outputting dielectric guide 129. At this time, a portion of the millimeter-wave oscillating output is reflected and returned from another millimeter-wave circuit connected to the output terminal 129a, and is inputted again as a return millimeter-wave signal from the output terminal 129a to the millimeter-wave oscillator O. This return millimeter-wave signal is guided from the outputting dielectric guides 129 and 125a to the terminating dielectric guides 128 and 124, and it is almost absorbed and terminated by the non-reflective terminators 127 and 123. However, that portion of the return millimeter-wave signal, which is returned by directly leaking from the outputting dielectric guide 129 to the inputting dielectric guide 122, which is not terminated by the non-reflective terminators 127 and 123 but partially reflected to propagate again to the terminating dielectric guides 127 and 123 and to leak to the inputting dielectric guide 122, or which leaks from both those routes, is inputted even slightly to the voltage-controlled oscillator 130.

Even this slight portion of the return millimeter-wave signal may obstruct the normal oscillation of the voltage-controlled oscillator 130. Therefore, the frequency for maximizing the isolation $I_1$ or the isolation $I_2$ is adjusted to attenuate the return millimeter-wave signal portion to a predetermined or higher level in the operating frequency band. In other words, the frequency dependency of the isolation $I_1$ and the frequency dependency of the isolation $I_2$ are so adjusted that the frequency band for retaining the isolation at the predetermined or higher level may cover the operation frequency band most widely.

In the high-frequency oscillator of the seventh embodiment of the invention, the frequency dependency of the isolation $I_1$ and the frequency dependency of the second isolation $I_2$ are set different from each other. As a result, the frequency band range, in which the isolation $(I_1+I_2)$ as their synthesized isolation is at the predetermined or higher level, can be made wider than that of the case, in which the frequency dependency of the isolation $I_1$ and the frequency dependency of the isolation $I_2$ are identical. Therefore, the voltage-controlled oscillator 130 can be stably oscillated over a wide frequency range so that the millimeter-wave oscillator O can stably operate.

On the other hand, the phrase "predetermined or higher level" is 30 dB or higher, for example, for the sum of the two circulators in the high-frequency oscillator of the invention. For a value less than 30 dB, the isolation is too low for the return millimeter-wave signal to be sufficiently suppressed in the case of oscillations at a high output so that the oscillation of the millimeter-wave oscillator becomes unstable. The millimeter-wave radar module may be, when the millimeter-wave oscillator is built in the millimeter-wave radar module, unable to perform the radar detection or may cause an erroneous detection.

Here will be described a more detailed configuration of the millimeter-wave oscillator O according to the high-frequency oscillator of the seventh embodiment of the invention, and its operations.

The high-frequency band, as termed in the high-frequency oscillator of the invention, corresponds to a micro-wave band and a millimeter-wave band within several tens to several hundreds GHz, as properly exemplified by a high-frequency band such as 30 GHz or higher, preferably 50 GHz or higher, or more preferably 70 GHz or higher. The especially preferred range is 76 to 77 GHz. In a case where the high-frequency oscillator of the invention is then used as a high-frequency transmitter-receiver such as a millimeter-wave radar module for an automobile having an operating frequency of 76 to 77 GHz, high transmission characteristics of the high-frequency signal can be attained over a wide range even when the oscillation frequency of the high-frequency oscillator varies according to the temperature or the like.

Means for setting different the frequency dependency of the isolation $I_1$ and the frequency dependency of the isolation $I_2$ is specified in the following. The ferrite plates 121a, 121b, 126a and 126b may be mounted such that at least one of the spacing and sizes of the two ferrite plates 121a and 121b and at least one of the spacing and sizes of the two ferrite plates 126a and 126b corresponding to the former are set different, and such that the center of the ferrite plates 121a and 121b is aligned to the center of the area which is defined by the end portions of the inputting dielectric guides 122 and 125b on the side of the ferrite plates 121a and 121b, the end portions of the outputting dielectric guides 125a and 129 on the side of the ferrite plates 121a and 121b and the end portions of the terminating dielectric guides 124 and 128 on the side of the ferrite plates 121a and 121b. As a result, the positioning of the ferrite plates 121a, 121b, 126a and 126b can be easily made by the positioning of only one point. Moreover, the ferrite plates 121a, 121b, 126a and 126b are mounted at the precise positions, so that the frequency dependency can be determined while excluding the causes for the characteristic fluctuation caused due to the misalignment at the assembling time. Moreover, the frequency dependency can be set and adjusted without deteriorating the characteristics of the transmission from the inputting dielectric guides 122 and 125b to the inputting dielectric guides 125a and 129 so that the delicate adjustment of the frequency dependency can be made easily and reliably. The frequencies, at which the first circulator A and the second circulator B take the maximum isolation, are set to different values so that the frequency band width for retaining the isolation at the predetermined or higher value can be easily and reliably made wider than that of the case, in which the frequencies for the first and second circulators to take the maximum isolation are set to equal values. As a result, the millimeter-wave signal returned to the high-frequency oscillator can be sufficiently suppressed over a wide frequency range so that a stable oscillation can be attained. In a case where the operating frequency range is restricted, on the other hand, the effect to set the predetermined level of the isolation to be retained at a high value becomes far higher, as compared with the case, in which the frequencies for the first and second circulators to take the maximum isolation are set equal, than the case, in which the characteristic fluctuating causes due to the displacement at the assembling time are added. Thus, stabler oscillations can be attained than those of the case, in which a factor for unstable oscillations as caused by the pulsating millimeter-wave signal returned to the high-frequency oscillator is added.

Even after the assembly, moreover, the ferrite plates 21a, 21b, 26a and 26b can be easily replaced by others while the causes for the characteristic fluctuation at the assembly being suppressed by a similar method. Even after the assembly, therefore, the isolation characteristics can be easily changed or adjusted by replacing the ferrite plates 21a, 21b, 26a and 26b.

Another means for setting different the frequency dependency of the isolation $I_1$ and the frequency dependency of the isolation $I_2$ may be made such that the ferrite plates 121a and 121b and the ferrite plates 126a and 126b are different in the material or magnetization for the millimeter-wave oscillator O. In this case, the means can be used not only for making a similar adjustment singly but also as auxiliary adjusting means for adjusting the frequency dependency together with the aforementioned means. This another means can also be used for correcting the deterioration of the isolation in the operating frequency range at the time when the size or arrangement spacing of the ferrite plates 121a and 121b is adjusted to shift the isolation characteristics of either the circulator A or the circulator B in parallel with the frequency axis.

As still another means for setting different the frequency dependency of the isolation $I_1$ and the frequency dependency of the isolation $I_2$, on the other hand, the size or material of any of the inputting dielectric guides 122 and 125b and the outputting dielectric guides 125a and 129 may be different in the millimeter-wave oscillator O.

When the frequency dependency of the isolation $I_1$ and the frequency dependency of the isolation $I_2$ are to be set different, the isolations may become poor all over the frequency band, in a case where one condition is singly varied to shift the isolation characteristics in parallel with the frequency axis. In this case, the setting may be made by combining the aforementioned plural conditions suitably.

Next, of the millimeter-wave radar module as the first and second high-frequency transmitter-receivers of the eighth and ninth embodiments of the invention is described in the following.

FIG. 14 and FIG. 15 show the millimeter-wave radar modules R1A and R2A as the high-frequency transmitter-receivers of the eighth and ninth embodiments of the invention. FIG. 14 is a top plan view of the millimeter-wave radar module, in which the transmitting antenna and the receiving antenna are integrated, and FIG. 15 is a top plan view of the millimeter-wave radar module, in which the transmitting antenna and the receiving antenna are independent.

The millimeter-wave radar module R1A shown in FIG. 14 includes a pair of parallel flat plate conductors 140 (the other of the pair is not shown), a first dielectric guide 141, a millimeter-wave signal oscillator 142, a pulse modulator 143, a second dielectric guide 144, a circulator C, a third dielectric guide 148, a fourth dielectric guide 150, a mixer 151, and a non-reflective terminator 152. The pair of parallel flat plate conductors 140 is arranged in parallel at a spacing therebetween of one half of less of the wavelength of a transmission millimeter-wave signal. The first dielectric guide 141 is disposed between the parallel flat plate conductors 140. The millimeter-wave signal oscillator 142 is disposed between the parallel flat plate conductors 140, attached to the first dielectric guide 141 for frequency-modulating a high-frequency signal outputted from a high-frequency diode, and propagates the modulated high-frequency signal as a millimeter-wave signal via the first dielectric guide 141. The pulse modulator 143 is disposed between the parallel flat plate conductors 140, disposed midway of the first dielectric guide 141 and pulsates the millimeter-wave signal and outputs the pulsated millimeter-wave signal as the transmission millimeter-wave signal from the first dielectric guide 141. The second dielectric guide 144 is disposed between the parallel flat plate conductors 140, and disposed so that its one end is close to the first dielectric guide 141 or joined at its one end to the first dielectric guide 141 to obtain electromagnetic coupling, and propagates a portion of the millimeter-wave signal inputted to the first dielectric guide 141, to the mixer 151.

The circulator C is disposed between the parallel flat plate conductors 140, and includes ferrite plates 145a and 145b (the latter 145b is arranged on the lower side of the former 145a) disposed in parallel on the parallel flat plate conductors 140, and a first connecting portion 146a, a second connecting portion 146b, and a third connecting portion 146c arranged at a predetermined spacing on the peripheral edge portions of the ferrite plates 145a and 145b, each acting as input/output terminals of the millimeter-wave signal. Further, the circular C outputs a millimeter-wave signal inputted from one of the connecting portions, from either one of the connecting portions adjacent to the one connecting portion clockwise or counter-clockwise in the planes of the ferrite plates 145a and 145b. The first connecting portion 146a is connected to the millimeter-wave signal output terminal of the first dielectric guide 141. The third dielectric guide 148 is disposed between the parallel flat plate conductors 140, and connected to the second connecting portion 146b of the circulator C and propagates the millimeter-wave signal. The third dielectric guide 148 has a transmitting/receiving antenna 147 at its leading end portion. The fourth dielectric guide 150 is disposed between the parallel flat plate conductors 140, and connected to the third connecting portion 146c of the circulator C, and propagates a received wave which is received by the transmitting/receiving antenna 147, is propagated via the third dielectric guide 148 and is outputted from the third connecting portion 146c, to a mixer detection portion 149. The mixer 151 is disposed between the parallel flat plate conductors 140, and is configured so that either a midway of the second dielectric guide 144 and a midway of the fourth dielectric guide 150 are close to or joined to each other to obtain electromagnetic coupling, and mixes the millimeter-wave signal inputted from the second dielectric guide 144 and the millimeter-wave signal inputted from the fourth dielectric guide 150, and generates an intermediate-frequency signal. The non-reflective terminator 152 is disposed between the parallel flat plate conductors 140, and connected to an end portion on opposite side of the mixer 151 of the second dielectric guide 144.

Moreover, the millimeter-wave radar module R1A according to the high-frequency transmitter-receiver of the eighth embodiment of the invention is configured to include the millimeter-wave oscillator O, as shown in FIG. 13, in which the millimeter-wave signal oscillator 142 is the high-frequency oscillator of the invention.

On the other hand, the millimeter-wave radar module as the second high-frequency transmitter-receiver of the ninth embodiment of the invention is of the type, in which the transmitting antenna and the receiving antenna are made independent, as shown in the top plan view of FIG. 15.

The millimeter-wave radar module R2A shown in FIG. 15 includes a pair of parallel flat plate conductors 160 (the other of the pair is not shown), a first dielectric guide 161, a millimeter-wave signal oscillator 162, a pulse modulator 163, a second dielectric guide 164, a circulator D, a third dielectric guide 168, a fourth dielectric guide 171, a fifth dielectric guide 173, a mixer 174, and a non-reflective terminator 175. The pair of parallel flat plate conductors 160 is arranged in parallel at a spacing of one half of less of the wavelength of a transmission millimeter-wave signal. The first dielectric guide 161 is disposed between the parallel flat plate conductors 160, and attached to the first dielectric guide 161 for frequency-modulating a high-frequency signal outputted from a high-frequency diode and propagates the modulated high-frequency signal as a millimeter-wave signal via the first dielectric guide 161. The pulse modulator 163 is disposed between the parallel flat plate conductors 160, and disposed midway of the first dielectric guide 161 and pulsates the millimeter-wave signal and outputs the pulsated millimeter-wave signal as the transmission millimeter-wave signal via the first dielectric guide 161. The second dielectric guide 164 is disposed between the parallel flat plate conductors 160, and disposed so that its one end is close to the first dielectric guide 161 or joined at its one end to the first dielectric guide 161 to obtain electromagnetic coupling, and propagates a portion of the millimeter-wave signal inputted to the first dielectric guide 161, to the mixer 74.

The circulator D is disposed between the parallel flat plate conductors 160, and includes ferrite plates 165a and 165b (the latter 165b is arranged on the lower side of the former 165a), and a first connecting portion 166a, a second connecting portion 166b and a third connecting portion 166c arranged at a predetermined spacing on the peripheral edge portions of the ferrite plates 165a and 165b arranged in parallel on the parallel flat plate conductors 160, each acting as the input/output terminals of the millimeter-wave signal. The circulator D outputs the millimeter-wave signal inputted from one of the connecting portions, from either onoe of the connecting portions adjacent to the one connecting portion clockwise or counter-clockwise in the planes of the ferrite plates 165a and 165b. The first connecting portion 166a is connected to the millimeter-wave signal output terminal of the first dielectric guide 161. The third dielectric guide 168 is disposed between the parallel flat plate conductors 160, and connected to the second connecting portion 166b of the circulator D and propagates the millimeter-wave signal. The third dielectric guide 168 has a transmitting antenna 167 at its leading end portion.

The fourth dielectric guide 171 is disposed between the parallel flat plate conductors 160, and has a receiving antenna 169 at its leading end portion and a mixer detection portion 170 at its other end portion. The fifth dielectric guide 173 is disposed between the parallel flat plate conductors 160, and connected to the third connecting portion 166c of the circulator D and propagates the received and mixed mini-wave signal by the transmitting antenna 167 and attenuates the millimeter-wave signal at a non-reflective terminator 172 disposed at its leading end portion. The mixer 174 is disposed between the parrallel flat plate conductors 160, and is configured so that either a midway of the second dielectric guide 164 and a midway of the fourth dielectric guide 171 are close to or by joined to each other to obtain electromagnetic coupling, and mixes the millimeter-wave signal inputted from the second dielectric guide 164 and the millimeter-wave signal inputted from the fourth dielectric guide 171 and generates an intermediate-frequency signal. The non-reflective terminator 175 is disposed between the parallel flat plate conductors 160, and connected to the end portion on opposite side of the mixer 174 of the second dielectric guide 164.

Moreover, the millimeter-wave radar module R2A according to the high-frequency transmitter-receiver of the ninth embodiment of the invention is configured to include the millimeter-wave oscillator O, as shown in FIG. 13, in which the millimeter-wave signal oscillator 62 is the high-frequency oscillator of the invention.

These millimeter-wave radar modules R1A and R2A operate as a radar for detecting a target, as will be described in the following. At first, the transmission millimeter-wave signal, which is generated by the millimeter-wave signal oscillators 142 and 162, is pulse-modulated by the pulse modulators 143 and 163 and is then transmitted from the transmitting/receiving antenna 147 or the transmitting antenna 167 toward the target. Next, the millimeter-wave signal reflected on the target is received by the transmitting/receiving antenna 147 or the transmitting antenna 169, and the millimeter-wave signal received and the transmission millimeter-wave signal before pulse-modulated are mixed by the mixers 151 and 174 to attain the intermediate-frequency output. The distance to the target can be attained by subjecting the intermediate-frequency output to a suitable operation.

These millimeter-wave radar modules R1A and R2A configure the so-called "FM pulse type millimeter-wave radar", but the high-frequency oscillator of the seventh embodiment of the invention is used in the millimeter-wave signal oscillator of the millimeter-wave radar module. Even in a case where the pulsating return millimeter-wave signal is inputted from the pulse modulator to the millimeter-wave signal oscillator, the pulsating return millimeter-wave signal is sufficiently attenuated, or specifically the millimeter-wave signal oscillator has a high isolation, over a wide frequency range of the millimeter-wave signal generated from the millimeter-wave signal oscillator. Therefore, the stable millimeter-wave transmission having small noises can be reliably performed even in a case where the fluctuation of the oscillation frequency of the millimeter-wave signal oscillator is high, in a case where the fluctuation by the environmental temperature is high or in a case where the transmission output is high.

According to these millimeter-wave radar modules R1A and R2A, moreover, the return millimeter-wave signal to be inputted to the millimeter-wave signal oscillator is sufficiently attenuated even in the system containing no pulse modulator as its component. In other words, the isolation of the millimeter-wave signal oscillator is so high that a stable millimeter-wave transmission can be performed even for a high transmission output. The millimeter-wave signal transmission and reception to and from the target can be reliably performed, for example, even in a case where the target is located at a distance.

It is important for the high-frequency transmitter-receivers of the eighth and ninth embodiments of the invention and for the high-frequency oscillator of the seventh embodiment of the invention used in the former that the frequency dependency of the isolation $I_1$ and the frequency dependency of the isolation $I_2$ are set different. It is accordingly important that the frequency bandwidth, in which their synthesized isolation $(I_1+I_2)$ is at a predetermined or higher level, can be wider than that of the case, in which the frequency dependency of the isolation $I_1$ and the frequency dependency of the isolation $I_2$ are identical. This importance will be described in connection with Examples.

EXAMPLES

The mill-wave oscillator O shown in FIG. 13 was configured in the following manner. At first, two Al plates having a thickness of 6 mm were arranged as the parallel flat plate conductors 20 at a spacing of a=1.8 mm. Between these plates, there were so arranged the two ferrite plates 121a and 121b having a diameter of 2 mm and the later-described thickness of t mm that the ferrite plates were brought into close contact with the upper flat plate conductor and the lower flat plate conductor, respectively, and confronted each other while having their center axes lying on the common straight line. Around the ferrite plates 121a and 121b, moreover, there were radially arranged the inputting dielectric guide 122, the terminating dielectric guide 124 and the inputting/outputting dielectric guide 125, which were made of cordierite ceramics having a sectional shape of a rectangle of 1.8 mm (height)× 0.8 mm (width) and a specific dielectric constant of 4.8, thereby to configure the first circulator A. In this first circulator A, the ferrite plates 121a and 121b were set to have such a direction of magnetic field that the inputting dielectric guide 122, the terminating dielectric guide 124 and the inputting/outputting dielectric guide 125 individually had an angle of 120 degrees between the adjoining guides, and that the clockwise adjoining guides were isolated from each other.

Between the parallel flat plate conductors 120, there were likewise so arranged the two ferrite plates 126a and 126b having a diameter of 2 mm and the later-described thickness of t mm that the ferrite plates were brought into close contact with the upper flat plate conductor and the lower flat plate conductor, respectively, and confronted each other while having their center axes lying on the common straight line. Around the ferrite plates 126a and 126b, moreover, there were radially arranged the inputting/outputting dielectric guide 125, the terminating dielectric guide 128 and the outputting dielectric guide 129, which were made of cordierite ceramics having a sectional shape of a rectangle of 1.8 mm (height)×0.8 mm (width) and a specific dielectric constant of 4.8, thereby to configure the second circulator B. In this second circulator B, the ferrite plates 121a and 121b were set to have such a direction of magnetic field that the inputting/outputting dielectric guide 125, the terminating dielectric guide 128 and the outputting dielectric guide 129 individually had an angle of 120 degrees between the adjoining guides, and that the clockwise adjoining guides were isolated from each other.

For the ferrite plates 121a, 121b, 126a and 126b, there was used the common material which had a specific dielectric constant of 13.5 and a saturation magnetization of 3,300 G (Gausses) (or a magnetic flux density Bm according to the DC magnetism measurement of JIS C2561) Moreover, the first circulator A and the second circulator B were connected by the inputting/outputting dielectric guide 125, and the non-reflective terminators 123 and 127 were connected to the side of the ferrite plates 121a and 126a and the opposite end portions of the non-reflective terminating guides 124 and 128, respectively.

There were prepared two kinds of samples for the circulators or the components of the mill-wave oscillator O thus configured. One of them was named as the sample (a) for the embodiment of the invention, and another was named as the sample (b) for a comparison. The sample (a) was set to make different the frequency dependency of the isolation $I_1$ and the frequency dependency of the isolation $I_2$. The sample (b) was to set to make identical the frequency dependency of the isolation $I_1$ and the frequency dependency of the isolation $I_2$. In the sample (b), specifically, both the ferrite plates 121a and 121b and the ferrite plates 126a and 126b were made to have a thickness t of t=0.234 mm. In the sample (a), the ferrite plates 121a and 121b were made to have the same thickness of t=0.234 mm as that of the sample (b), but the ferrite plates 126a and 126b were made to have a thickness of t=0.231 mm different from that of the sample (b). On the other hand, the samples (a) and (b) were held under the same conditions excepting the thickness of the ferrite plates.

For the samples (a) and (b), the isolation characteristics (i.e., the isolations $I_1+I_2$) of the two circular stages were measured. For the sample (a), moreover, the individual isolation characteristics (i.e., the isolations $I_1$ and $I_2$) (of the one circulator stage) were measured before the first circulator A and the second circulator B were connected. Of these samples, the ferrite plates 121a and 121b or the ferrite plates 126a and 126b having the thickness of t=0.234 mm were the sample (c), and the ferrite plates 126a and 126b having the thickness of t=0.231 mm was the sample (d).

For measuring the isolation characteristics, a network analyzer for the millimeter-wave band was used. In the samples (a) and (b), the isolation of ($I_1+I_2$) of 75 to 80 GHz between the input terminal 122a and the output terminal 129a was measured by connecting the port 1 and the port 2 of the network analyzer with the input terminal 122a and the output terminal 129a, respectively. In the samples (c) and (d), on the other hand, the isolations $I_1$ and $I_2$ of 75 to 80 GHz between the input terminals of the inputting dielectric guides 122 and 125b and the output terminals of the outputting dielectric guides 125a and 129 were measured by connecting the port 1 and the port 2 of the network analyzer with the input terminal and the output terminal, respectively. The results were plotted in the graph of FIG. 16.

Figure 16:
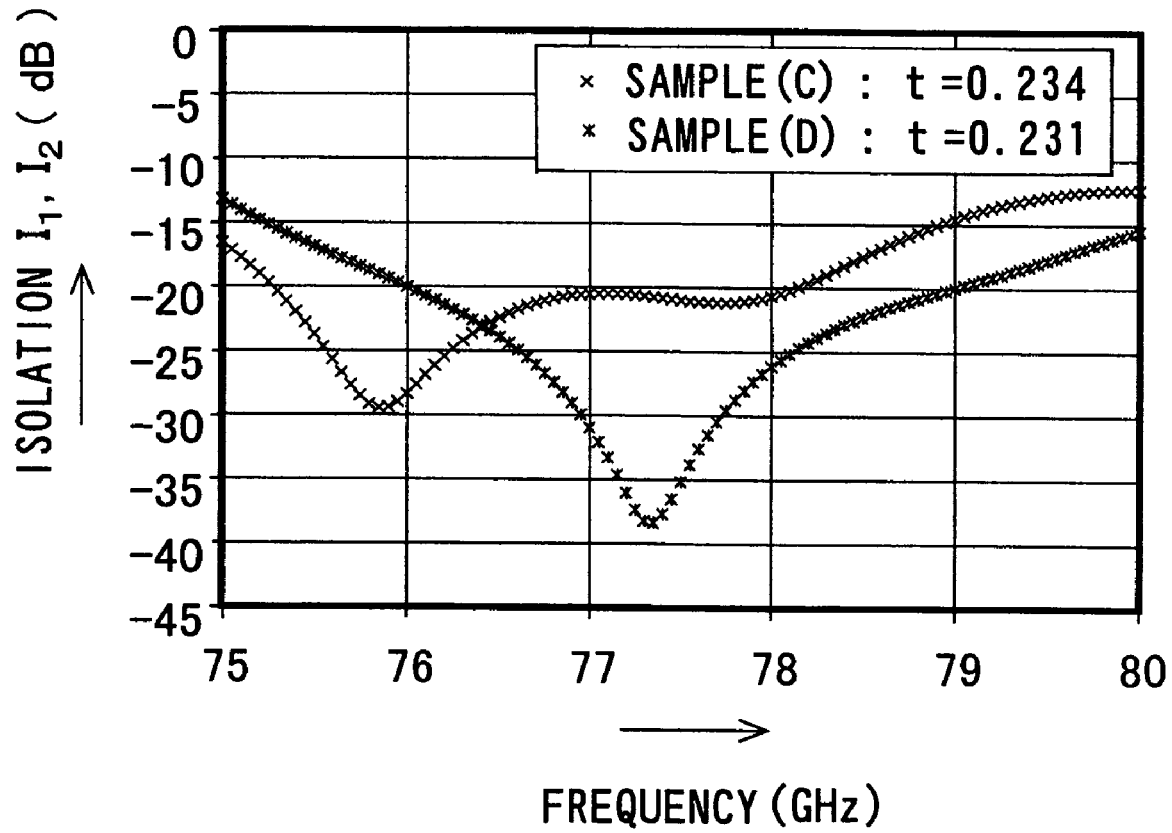
FIG. 16 is a graph showing representative actual measurements of isolation characteristics of one circulator.
Figure 17:
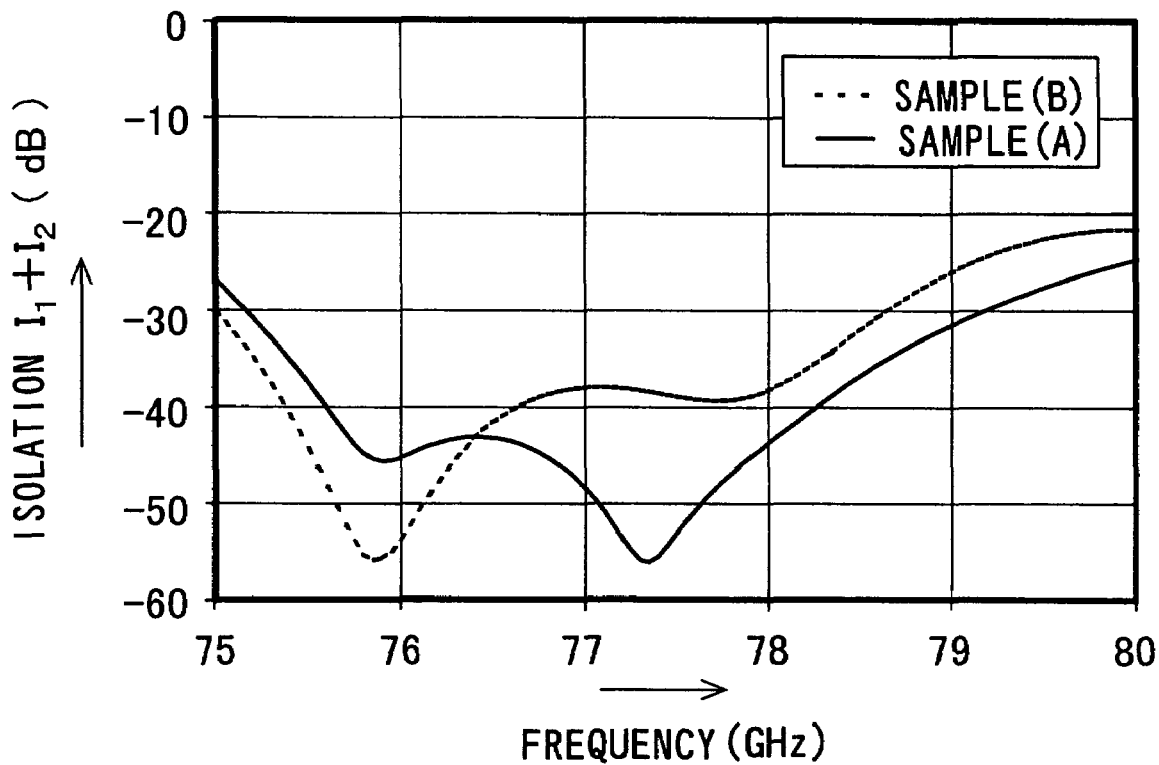
FIG. 17 is a graph showing representative actual measurements of isolation characteristics of two circulators which are used for the high-frequency oscillator of the eighth embodiment of the invention and a comparative example of two circulators.

FIG. 16 is a graph showing the isolation characteristics of one stage of the first circulator A or the second circulator B configuring the mill-wave oscillator O. The abscissa indicates the frequency (having a unit of GHz), and the ordinate indicates the gain (having a unit of dB) of the isolation. Plots X indicate representative measured values of the isolation characteristics of the sample (c), and plots * indicate representative measured values of the isolation characteristics of the sample (d). FIG. 17 is a graph showing the isolation characteristics of two stages of the first circulator A and the second circulator B configuring the mill-wave oscillator O. The abscissa and the ordinate are similar to those of FIG. 16. A solid characteristic curve indicates the representative measured values of the isolation characteristics of the sample (a), and a broken characteristic curve indicates the representative measured values of the isolation characteristics of the sample (b).

From the measurement results of the samples (c) and (d) shown in FIG. 16, it is found that the frequency dependency of the isolation $I_1$ of the first circulator A and the frequency dependency of the isolation $I_2$ of the second circulator B were made different by making different the thickness of the ferrite plates 121a and 121b of the first circulator A and the thickness of the ferrite plates 126a and 126b of the second circulator B. Specifically, the frequency taking the maximum of the isolation takes 75.9 GHz in the sample (c), but the frequency taking the maximum of the isolation takes 77.4 GHz in the sample (d). Thus, the characteristic curves drawn by the individual plots were different to make the frequency dependencies different.

From the measurement results of the samples (a) and (b) shown in FIG. 17, it is found that the frequency band width for the synthesized isolation of ($I_1+I_2$) to become 30 dB or higher was wider than that of the case, in which the frequency dependency of the isolation $I_1$ and the frequency dependency of the isolation $I_2$ were identical, by setting these frequency dependencies different. Specifically, in the sample (b) in which the frequency dependency of the isolation $I_1$ and the frequency dependency of the isolation $I_2$ were identical, the frequency band width, in which the isolation of ($I_1+I_2$) was 30 dB or higher, was 3.6 GHz. In the sample (a) in which the frequency dependency of the isolation $I_1$ and the frequency dependency of the isolation $I_2$ were different, the frequency band width, in which the isolation of ($I_1+I_2$) was 30 dB or higher, was 4.0 GHz. Thus, it can be confirmed that the frequency band width for the isolation of 30 dB or higher set as the predetermined value of the isolation was widened.

Next, two kinds of mill-wave oscillator were configured by connecting the voltage-controlled oscillator V, as shown in FIG. 14 and FIG. 15, with the input terminal 122a of the sample (a) and (b).

By using the mill-wave oscillators having the samples (a) and (b) built therein, the millimeter-wave radar modules were configured, as shown in FIG. 14, and were subjected to the millimeter-wave transmitting/receiving tests. At this time, in the millimeter-wave radar module having the sample (a) built therein, the operational center frequency was set to 77.2 GHz, and the millimeter-wave radar module was operated by changing the oscillation frequency of the mill-wave oscillator within the range of ±2 GHz around 77.2 GHz. In the millimeter-wave radar module having the sample (b) built therein, the operational center frequency was set to 76.9 GHz, and the millimeter-wave radar module was operated by changing the oscillation frequency of the mill-wave oscillator within the range of ±2 GHz around 76.9 GHz.

Thus, the two kinds of the millimeter-wave radar modules were operated at the substantially identical operation center frequency within the same frequency band width. The millimeter-wave radar module having the sample (a) built there in could perform the millimeter-wave transmission/reception stably, but the millimeter-wave radar module having the sample (b) built therein was unstable in the oscillation of the mill-wave oscillator so that the radar module could not perform the satisfactory millimeter-wave transmission/reception. The millimeter-wave radar module having the sample (b) built therein was confirmed to have the isolation of $(I_1+I_2)$ lower than 30 dB by 3 dB at the maximum. On the contrary, the millimeter-wave radar module having the sample (a) built therein was also confirmed to have the isolation of $(I_1+I_2)$ of 30 dB or more at all times so that the radar module could perform the millimeter-wave transmission/reception stably.

Thus, the millimeter-wave radar modules R1A and R2A exemplifying the high-frequency transmitter-receivers of the eighth and ninth embodiments of the invention are enabled to have high performances by having the high-frequency oscillator of the high isolation. Moreover, the isolation characteristics of the voltage-controlled oscillator and the transmitting/receiving antenna side or the transmitting antenna are improved over a wider bandwidth. As a result, the stable millimeter-wave transmission/reception can be reliably performed even in a case where the fluctuation of the oscillation frequency of the millimeter-wave signal oscillator is high, in a case where the fluctuation by the environmental temperature is high or in a case where the transmission output is high.

Herein, the invention should not be limited to the foregoing embodiment but may be modified in various manners within the scope not departing from the gist thereof. For example, in the high-frequency oscillator of the seventh embodiment, the first and second circulators, which are configured to include the two ferrite plates, the inputting dielectric guides and the outputting dielectric guides, may be replaced by the combination of two stages of a Faraday's rotary type isolator, a resonance absorption type isolator or a field displacement type isolator. In this case, the non-reflective terminator need not be connected unlike the circulator to one end so that the number of parts is reduced to facilitate the assembly. Moreover, similar functions can be realized by the two terminals thereby to reduce the size.

In another configuration, the ferrite plates 121a and 126a and the ferrite plates 121b and 126b may be attached through a support, which is joined to the end faces of the inputting dielectric guide 122, the inputting/outputting dielectric guide 125, the terminating dielectric guides 124 and 128 and the outputting dielectric guide 129, and at an even spacing regulated by that support. In this case, the frequency dependencies of the isolations $I_1$ and $I_2$ can also be adjusted by adjusting the size or dielectric constant of the support.

Next, a high-frequency oscillator of a tenth embodiment of the invention and high-frequency transmitter-receivers of eleventh and twelfth embodiments of the invention will be described in detail with reference to the accompanying drawings.

Figure 18:
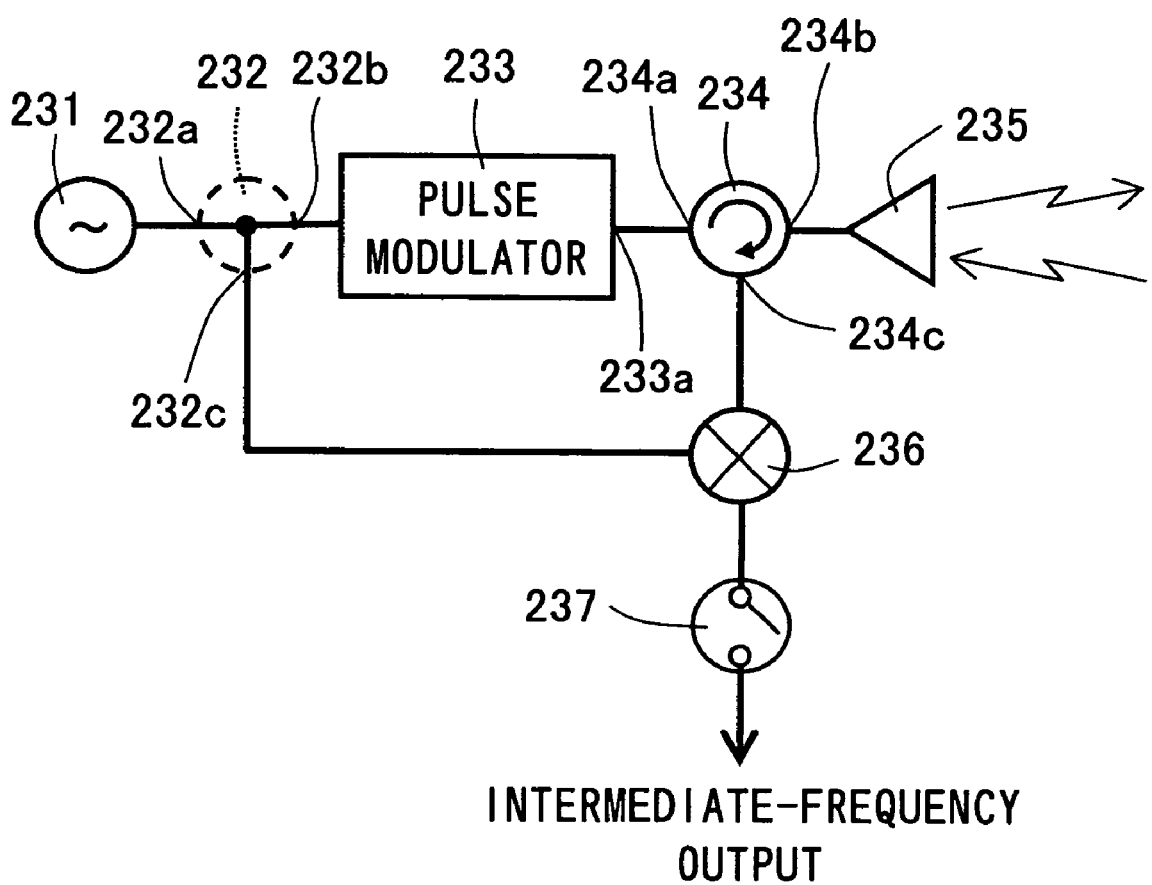
FIG. 18 is a schematic block circuit diagram showing a high-frequency transmitter-receiver of an eleventh embodiment of the invention.
Figure 19:
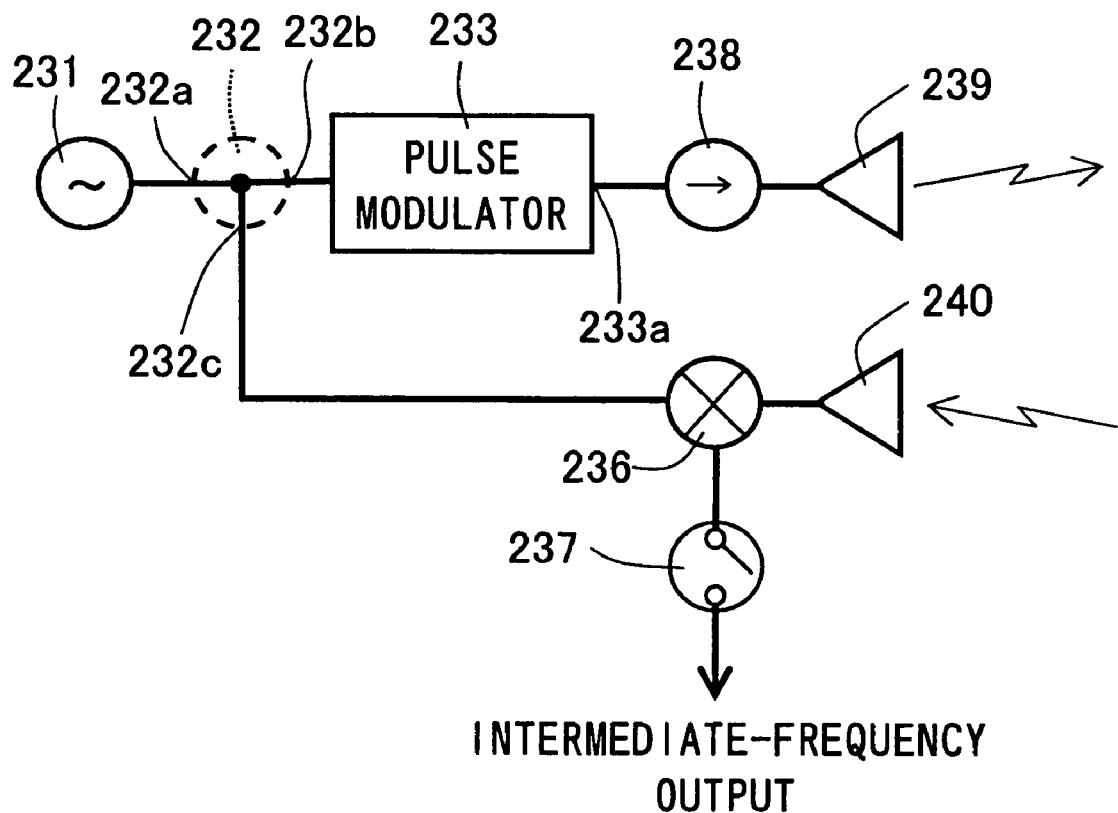
FIG. 19 is a schematic block circuit diagram showing a high-frequency transmitter-receiver of a twelfth embodiment of the invention.

FIG. 18 is a schematic block circuit diagram showing the high-frequency transmitter-receiver of the eleventh embodiment of the invention. FIG. 19 is a schematic block circuit diagram showing the high-frequency transmitter-receiver of the twelfth embodiment of the invention. In FIG. 18 and FIG. 19: reference numeral 231 denotes a high-frequency oscillator; reference numeral 232 denotes a branching device; reference numeral 232a denotes an input terminal; reference numeral 232b denotes one input terminal; 232c the other output terminal; reference numeral 233 denotes a modulator; reference numeral 234 denotes a circulator; reference numeral 234a denotes an input terminal; reference numeral 234b denotes one output terminal; reference numeral 234c denotes the other output terminal; reference numeral 235 denotes a transmitting/receiving antenna; reference numeral 236 denotes a mixer; reference numeral 237 denotes a switch; reference numeral 238 denotes an isolator; reference numeral 239 denotes a transmitting antenna; and reference numeral 240 denotes a receiving antenna.

The high-frequency oscillator of the tenth embodiment of the invention is configured to include the aforementioned isolator 232 of the fifth or sixth embodiment of the invention, and the voltage-controlled oscillator (VCO) 231 connected to the input terminal 232a of the isolator 232.

The isolator 232 and the voltage-controlled oscillator 231 may be so connected through a connecting transmission line of a proper mode by selecting the connecting transmission line in accordance with the mode of the voltage-controlled oscillator 231 as to reduce the connection loss to the minimum. In the case of the voltage-controlled oscillator 231 configured of the MMIC, for example, a suitable transmission line is a plane type such as a microstrip line or a coplanar line. Moreover, the same transmission line as that planar type transmission line may also be used as the transmission line configuring the isolator 232. In a case where a pill type gun diode oscillator, on the other hand, the connecting transmission line is preferably exemplified by the waveguide or the dielectric waveguide, the transmission line configuring the isolator 232 is preferably exemplified by not only the waveguide or the dielectric waveguide but also the non-radiative dielectric waveguide. In a case where the non-radiative dielectric waveguide is used as the transmission line of the isolator 232, a through hole may be formed at a portion of one of the flat plate conductors of the non-radiative dielectric waveguide, in which portion electric field of a standing wave in the LSM mode of the dielectric guide of the non-radiative dielectric waveguide is high. Moreover, one end of the waveguide or the dielectric guide may be connected to that through hole, and the pill type gun diode oscillator may be connected to the other end of the waveguide or the dielectric guide.

The second high-frequency oscillator of the tenth embodiment of the invention has the aforementioned configuration so that the isolator has the satisfactory isolation characteristics. As a result, the isolator can sufficiently attenuate the unstable high-frequency signal returned to the voltage-controlled oscillator so that the isolator can generate the high-frequency signal stably in a satisfactory oscillation output.

The high-frequency transmitter-receiver of the eleventh embodiment of the invention, as shown in the block circuit diagram of FIG. 18, comprises a high-frequency oscillator 231, a branching device 232, a modulator 233, a circulator 234, a transmitting/receiving antenna 235, and a mixer 236. The high-frequency oscillator 231 generates a high-frequency signal. The branching device 232 is connected to the high-frequency oscillator 231 and branches a high-frequency signal and outputs the branched signals to the one output terminal 232b thereof and the other output terminal 232c thereof. The modulator 233 is connected to the one output terminal 232b and modulates a portion of the high-frequency signal to output the modulated portion as the transmission high-frequency signal. Further, the circulator 234 has the first terminal 234a, the second terminal 234b and the third terminal 234c around the magnetic element and outputs a high-frequency signal inputted from one of the terminals in the recited order, from a next terminal adjacent to the one terminal. In the circulator 234, the first terminal 234a is connected to the output terminal 233a of the modulator 233. The transmitting/receiving antenna 235 is connected to the second terminal 234b of the circulator 234 and transmits the transmission high-frequency signal and receives the high-frequency signal reflected and returned on the objective to be detected. The mixer 236 is connected between the other output terminal 232c and the third terminal 234c of the circulator 234. Further, the mixer 236 mixes the high-frequency signal outputted to the other output terminal 232c and the high-frequency signal received by the transmitting/receiving antenna 235, and outputs the intermediate-frequency signal. Incidentally, the high-frequency oscillator 231 has a configuration according to the aforementioned high-frequency oscillator of the tenth embodiment of the invention.

In the configuration thus far described, moreover, the mixer 236 may preferably be provided at its output terminal with the switch 237 for turning ON/OFF (or switching) the intermediate-frequency signal in response to the ON/OFF control signal coming from the outside he high-frequency transmitter-receiver, as shown in FIG. 18, operates like the high-frequency transmitter-receiver of the related art. The isolator belonging to the high-frequency oscillator 231 attenuates the high-frequency signal returned from the side of the modulator 233 or the mixer 236, in a high isolation. Even in a case where portion of the transmission high-frequency signal, which has been pulse-modulated by the modulator 233, is reflected on the circulator 234, the transmitting/receiving antenna 235, the mixer 236 or the like so that the high-frequency signal reflected is returned in various phases or intensities to the high-frequency oscillator 231, the high-frequency signal can be stably generated with a satisfactory oscillation output by the high-frequency oscillator 231 so that the high-frequency signal easily discriminated on the reception side can be transmitted.

In a case where the mixer 236 is provided at its output terminal with the switch 237 for turning ON/OFF (or switching) the intermediate-frequency signal in response to the ON/OFF control signal coming from the outside, a portion of the transmission high-frequency signal may leak, due to the shortage or the like of the isolation of the circulator 234, from the input terminal 234a of the circulator 234 to the other output terminal 234c. Even with this leak, however, the switch 237 can act to block the intermediate-frequency signal for the leaked high-frequency signal from being outputted. Therefore, the high-frequency signal to be received can be more easily discriminated on the reception side.

Moreover, the high-frequency transmitter-receiver of the twelfth embodiment of the invention, as shown in the block circuit diagram of FIG. 19, is configured to include a high-frequency oscillator 231, a branching device 232, a modulator 233, an isolator 238, a transmitting antenna 239, a receiving antenna 240, and a mixer 236. The high-frequency oscillator 231 generates a high-frequency signal. The branching device 232 is connected to the high-frequency oscillator 231 and branches a high-frequency signal and outputs the branched signals to the one output terminal 232 band the other output terminal 232c. The modulator 233 is connected to the one output terminal 232b and modulates a portion of the high-frequency signal to output the modulated portion as the transmission high-frequency signal. The isolator 238 has one one end connected to the output terminal 233a of the modulator 233 and transmits the transmission high-frequency signal. The receiving antenna 240 is connected to the other output terminal 232c of the branching device 232. The mixer 236 is connected between the other output terminal 232c and the receiving antenna 240. Further, the mixer 236 mixes the high-frequency signal outputted to the other output terminal 232c and the high-frequency signal received by the receiving antenna 240, and outputs an intermediate-frequency signal Incidentally, the high-frequency oscillator 231 has a configuration according to the aforementioned high-frequency oscillator of the tenth embodiment of the invention.

In the configuration thus far described, moreover, the mixer 236 may preferably be provided at its output terminal with the switch 237 for turning ON/OFF (or switching) the intermediate-frequency signal in response to the ON/OFF control signal coming from the outside.

The high-frequency transmitter-receiver, as shown in FIG. 19, acts like the high-frequency transmitter-receiver shown in FIG. 18. The isolator belonging to the high-frequency oscillator 231 attenuates the high-frequency signal returned from the side of the modulator 233 or the mixer 236, in a high isolation. Even in a case where portion of the transmission high-frequency signal, which has been pulse-modulated by the modulator 233, is reflected on the transmitting/receiving antenna 235 or the like so that the high-frequency signal reflected is returned in various phases or intensities to the high-frequency oscillator 231, the high-frequency signal can be stably generated with a satisfactory oscillation output by the high-frequency oscillator 231 so that the high-frequency signal easily discriminated on the reception side can be transmitted.

Moreover, the isolator connected between the modulator 233 and the transmitting antenna 239 acts to attenuate the high-frequency signal returned in various phases or intensities to the modulator 233, thereby to operate the modulator 233 stably.

In case the mixer 236 is provided at its output terminal with the switch 237 for turning ON/OFF (or switching) the intermediate-frequency signal in response to the ON/OFF control signal coming from the outside, a portion of the transmission high-frequency signal may leak, due to the shortage of the isolation between the transmitting antenna 239 and the receiving antenna 240, to the receiving antenna 240. Even with this leak, however, the switch 237 can act to block the intermediate-frequency signal for the high-frequency signal having leaked. Therefore, the high-frequency signal to be received can be more easily discriminated on the reception side.

In the invention, the frequency band to be used as the high-frequency signal is effective not only for the millimeter-wave band but also for the micro-wave band or a less frequency band.

Here will be described the radar apparatus of the invention, a radar-apparatus mounted vehicle and a radar-apparatus mounted small-sized boat.

The radar apparatus of the invention comprises any of the high-frequency transmitter-receivers of the eighth, ninth, and twelfth embodiments of the invention, and a range information detector for processing an intermediate-frequency signal outputted from the high-frequency transmitter-receiver and detecting range information to an objective.

Since the radar apparatus of the invention is configured as above, the high-frequency transmitter-receiver transmits the satisfactory high-frequency signal which is easily recognized on the receiving side. Thus, the radar apparatus which can detect a objective rapidly and reliably and a point-blank range or distant objective reliably, can be provided.

Moreover, the radar-apparatus mounted vehicle of the invention comprises the aforementioned radar apparatus of the invention, and the radar apparatus is used for detecting the objective.

With this configuration, like the radar-apparatus mounted vehicle of the related art, the radar-apparatus mounted vehicle of the invention can control the behavior of the vehicle on the basis of the range information detected by the radar apparatus or can warn the driver against it with a sound, a light or a vibration that the radar apparatus has detected an obstacle on the road or another vehicle. In the radar-apparatus mounted vehicle of the invention, the radar apparatus detects the objective such as the obstacle on the road or another vehicle rapidly and reliably so that the apparatus can allow a proper control of the vehicle and can give a proper warning to the driver without causing an abrupt behavior in the vehicle.

On the other hand, the radar-apparatus mounted small-sized boat of the invention comprises the aforementioned radar apparatus of the invention, and the radar apparatus is used for detecting the objective.

Like the radar-apparatus mounted vehicle of the related art, the radar-apparatus mounted small-sized boat of the invention thus configured acts to control the behavior of the small-sized boat on the basis of the range information detected by the radar apparatus, or to warn the driver against it with the sound, light or vibration that the small-sized boat has detected an obstacle such as sunken rock, another ship or another small-sized boat. In the radar-apparatus mounted small-sized boat of the invention, the radar apparatus detects the objective such as the obstacle such as the sunken rock, another ship or another small-sized boat rapidly and reliably so that the radar apparatus can warn the driver for a proper control and for a proper warning without causing any abrupt behavior in the small-sized boat.

Thus, the invention can provide a circulator type isolator, in which the non-reflective terminator is connected with one of the inputting/outputting transmission line of the circulator, and which has improved isolation characteristics.

Moreover, the invention can provide a high-frequency oscillator, which can widen the frequency band width for retaining an isolation at a predetermined level or higher and a frequency band width for stable oscillations and which can stably act even when the frequency characteristics of the high-frequency oscillator are influenced by the used environment temperature, and a high-performance high-frequency transmitter-receiver using the high-frequency oscillator.

Still moreover, the invention can provide a radar apparatus having such high-performance high-frequency transmitter-receiver, and a radar-apparatus mounted vehicle and a radar-apparatus mounted small-sized boat having the radar apparatus mounted thereon.

Next, the high-frequency transmitter-receivers of the thirteenth, fourteenth and fifteenth embodiments of the invention will be described in detail in connection with a high-frequency transmitter-receiver for transmitting/receiving a high-frequency signal of a millimeter-wave band, with reference to the accompanying drawings.

Figure 20:
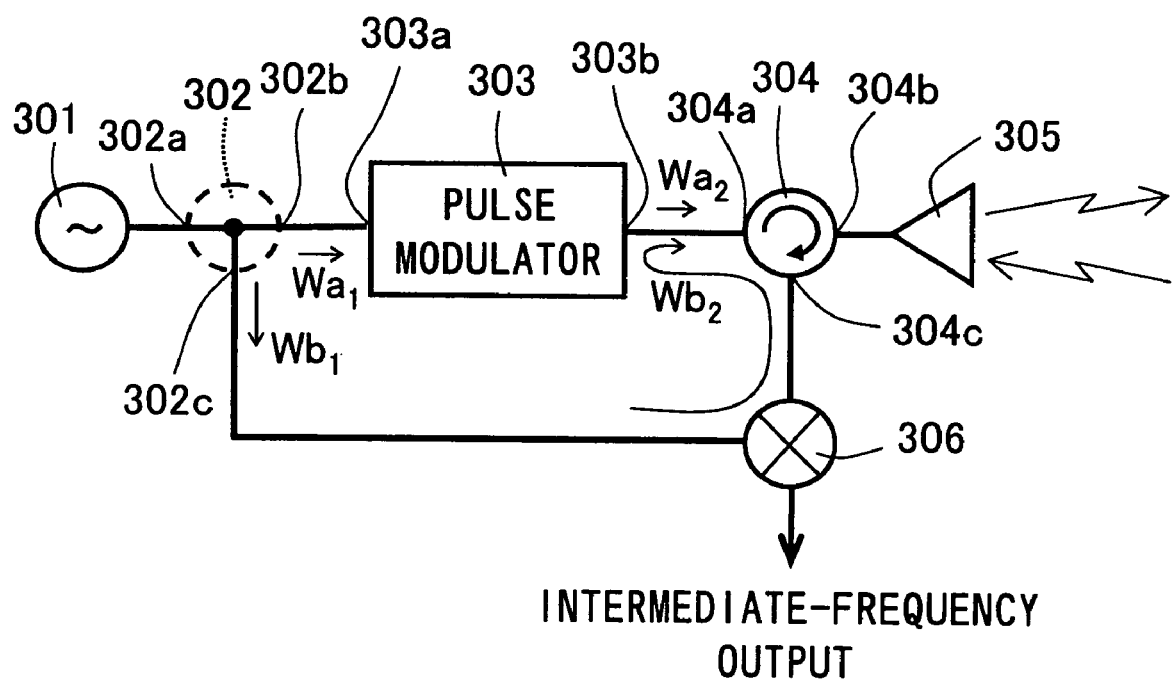
FIG. 20 is a schematic block circuit diagram showing a configuration of a high-frequency transmitter-receiver of a thirteenth embodiment of the invention.
Figure 21:
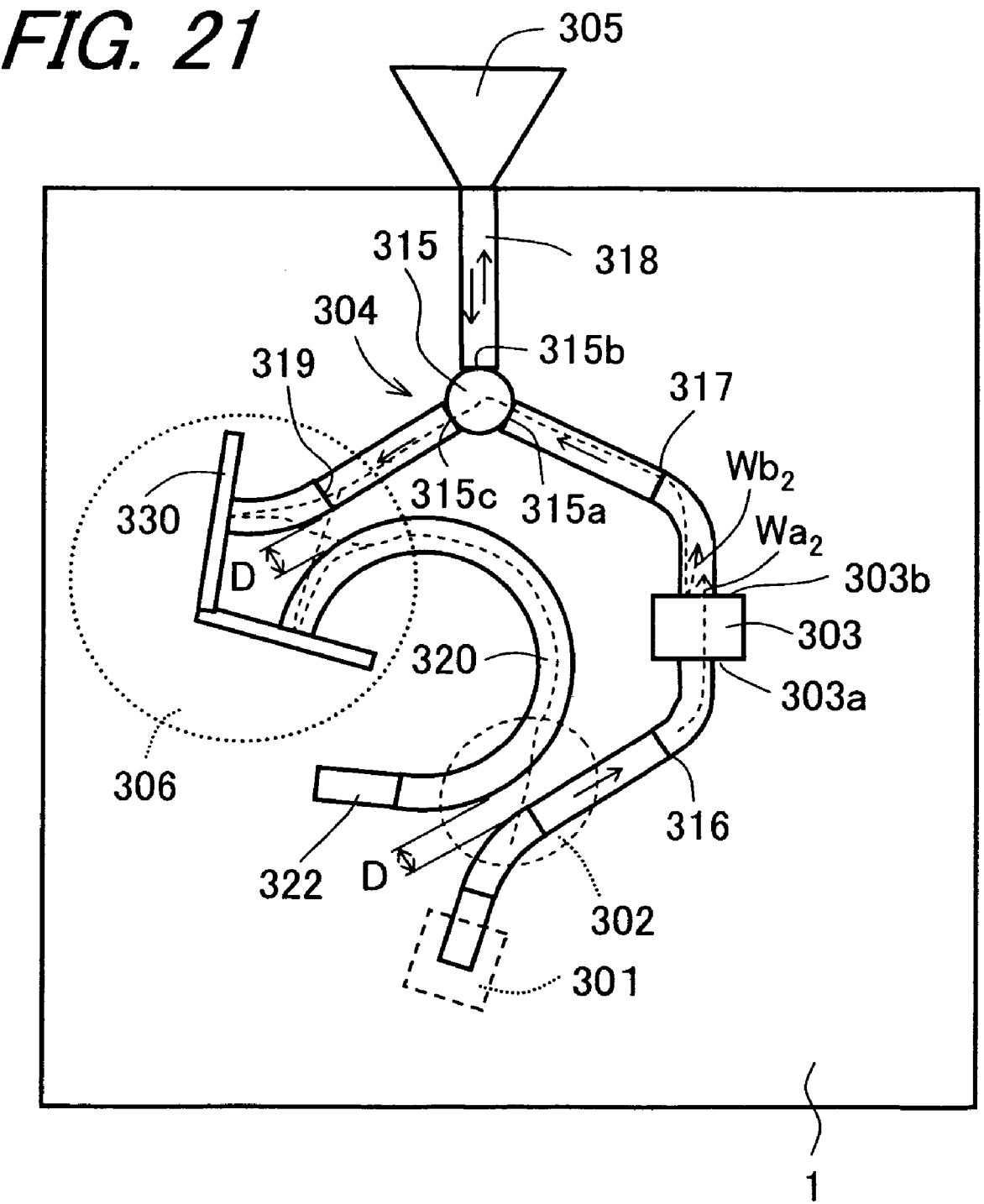
FIG. 21 is a top plan view showing a configuration of the high-frequency transmitter-receiver of the thirteenth embodiment of the invention.
Figure 22:
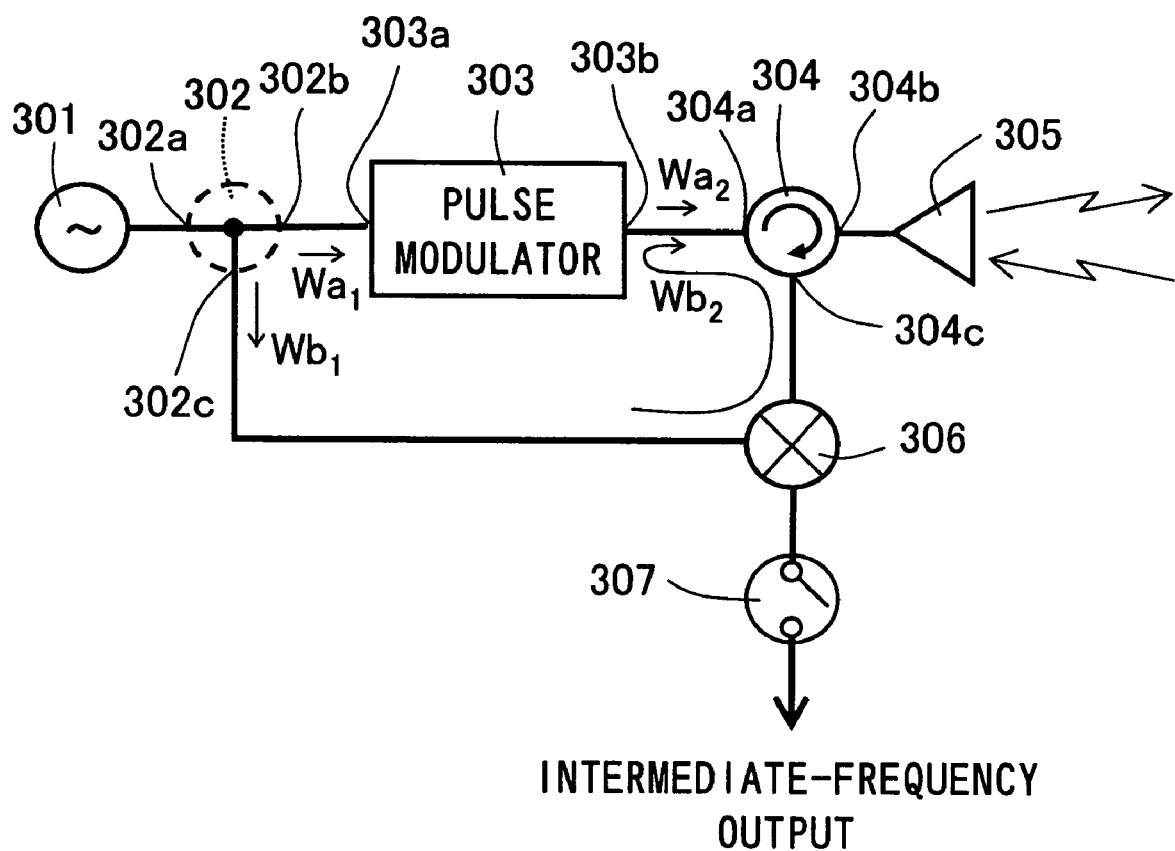
FIG. 22 is a schematic block circuit diagram showing a configuration of a high-frequency transmitter-receiver of a fourteenth embodiment of the invention.
Figure 23:
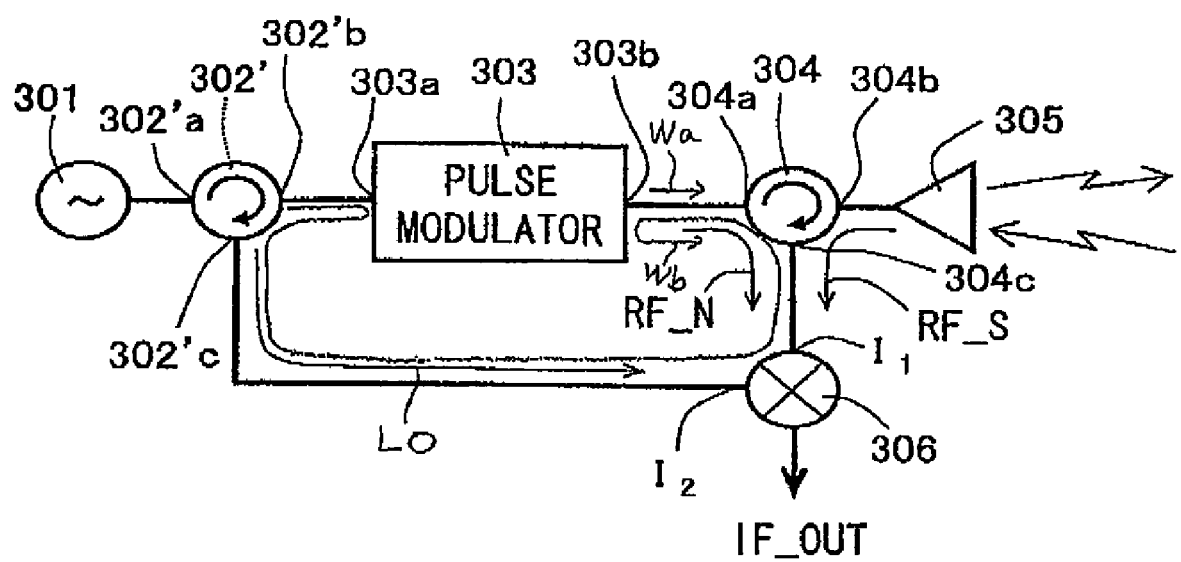
FIG. 23 is a schematic block diagram showing a configuration of a high-frequency transmitter-receiver of a fifteenth embodiment of the invention.
Figure 24:
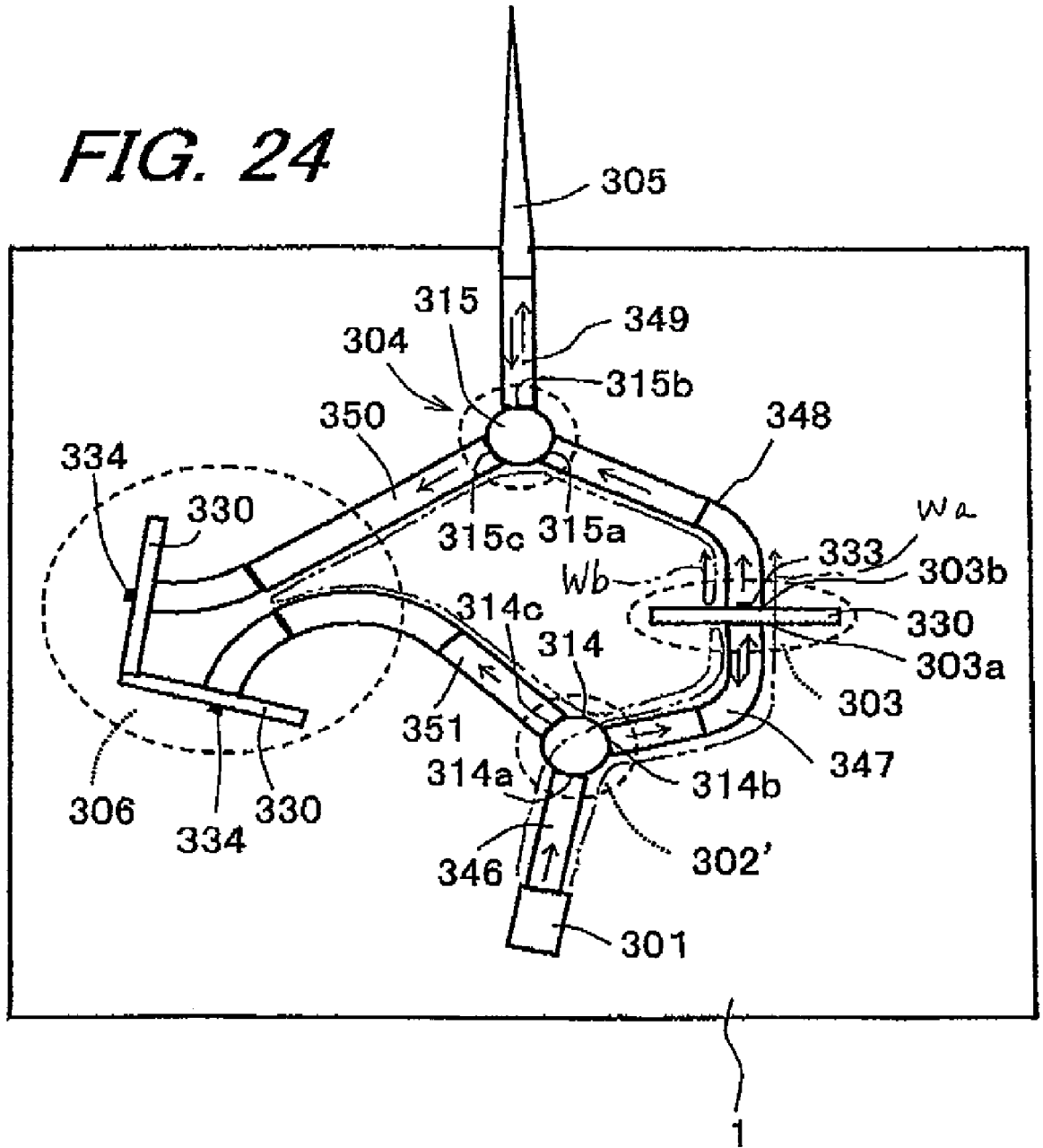
FIG. 24 is a top plan view showing a configuration of the high-frequency transmitter-receiver of the fifteenth embodiment of the invention.

FIG. 20 and FIG. 21 are a schematic block circuit diagram and a top plan view, respectively, showing the high-frequency transmitter-receiver of the thirteenth embodiment of the invention. FIG. 22 is a schematic block circuit diagram showing the high-frequency transmitter-receiver of the fourteenth embodiment of the invention. FIG. 23 and FIG. 24 are a schematic block diagram and a top plan view, respectively, showing the high-frequency transmitter-receiver of the fifteenth embodiment of the invention.

In FIG. 20 to FIG. 24: reference numeral 301 denotes a millimeter-wave oscillator as the high-frequency oscillator; reference numeral 302 denotes a branching device; reference numeral 302' denotes a first circulator; reference numeral 303 denotes a pulse modulator as the modulator; reference numeral 304 denotes a circulator (i.e., a second circulator in the high-frequency transmitter-receiver of the fifteenth embodiment of the invention shown in FIG. 23 and FIG. 24); reference numeral 305 denotes a transmitting/receiving antenna; reference numeral 306 denotes a mixer; reference numeral 302a denotes an input terminal; reference numeral 302b denotes one output terminal; reference numeral 302c denotes the other output terminal; reference numeral 303a denotes an input terminal; reference numeral 303b denotes an output terminal; reference numerals 302'a and 304a denote first terminals; reference numerals 302'b and 304b denote second terminals; reference numerals 302'c and 304c denote third terminals; reference numeral 1 denotes a parallel flat plate conductor; reference numerals 314 and 315 denote ferrite plates; reference numerals 316 and 346 denote first dielectric guides; reference numerals 317 and 347 denote second dielectric guides; reference numerals 318 and 348 denote third dielectric guides; reference numerals 319 and 349 denote fourth dielectric guides; reference numerals 320 and 350 denote fifth dielectric guides; reference numerals 321 and 351 denote sixth dielectric guides; reference numeral 322 denotes a non-reflective terminator; reference numerals 314a and 315a denote first connecting portions; reference numerals 314b and 15b denote second connecting portions; reference numerals 314c and 315c denote third connecting portions; reference numeral 330 denotes a substrate to be used in the non-reflective dielectric guide type pulse modulator 303 or a mixer 306; reference numeral 331 denotes a choke type bias feed line formed on the surface of the substrate 330; reference numeral 332 denotes a connecting terminal formed at an interrupted portion midway of the choke type bias feed line 331; reference numeral 333 denotes a diode as a high-frequency modulating element; and reference numeral 334 denotes a diode as a high-frequency detecting element.

In the block circuit diagram shown in FIG. 23, on the other hand, letter $I_1$ represents one input terminal of the mixer 306, i.e., an input terminal (i.e., an input terminal on the RF side of the mixer 306) for inputting a millimeter-wave signal RF_S received by the transmitter-receiver antenna 305, and letter $I_2$ represents the other input terminal of the mixer 306 i.e., an input terminal (i.e., an input terminal on the local side of the mixer 306) for inputting a local signal LO. Herein, the local signal LO is a millimeter-wave signal, which is outputted by the millimeter-wave oscillator 301 and inputted in the millimeter-wave radar to the mixer 306. The input terminal $I_1$ is located on the RF side, and the input terminal $I_2$ is located on the local (LO) side.

In the block circuit diagram shown in FIG. 23, on the other hand, letter RF_N represents that portion of a transmission millimeter-wave signal, which is pulsated by the pulse modulator 303 and which leaks as the pulsated unnecessary millimeter-wave signal to one input terminal $I_1$ of the mixer 306, and letter RF_S represents the millimeter-wave signal which is received by the transmitting/receiving antenna 305 and which is inputted to one input terminal $I_1$ of the mixer 306.

The local signal LO is the millimeter-wave signal which is outputted from the millimeter-wave oscillator 301 and inputted through the first circulator 302' to the other input terminal $I_2$ of the mixer 306.

Letter IF_OUT represents the intermediate-frequency signal to be outputted from the output terminal of the mixer 306. Specifically, the intermediate-frequency signal IF_OUT is prepared by mixing the millimeter-wave signal (i.e., the millimeter-wave signals RF_S and RF_N) inputted to the input terminal $I_1$ of the mixer 306 and the millimeter-wave signal (i.e., the local signal LO) inputted to the local side input terminal $I_2$ of the mixer 306, and is outputted from the output terminal of the mixer 306.

The high-frequency transmitter-receiver of the thirteenth embodiment of the invention comprises, as shown in the block circuit diagram of FIG. 20, the millimeter-wave oscillator 301, the branching device 302, the pulse modulator 303, the circulator 304, the transmitting/receiving antenna 305, and the mixer 306. The millimeter-wave oscillator 301 generates the millimeter-wave signal. The branching device 302 is connected to the millimeter-wave oscillator 301 and branches a millimeter-wave signal and outputs the branched millimeter-wave signals to one output terminal 302b and the other output terminal 302c. The pulse modulator 303 is connected to the one output terminal 302b and modulates the millimeter-wave signal branched to the one output terminal 302b, and outputs the modulated millimeter-wave signal. The circulator 304 has the first terminal 304a, the second terminal 304b and the third terminal 304c around a magnetic element, and outputs the millimeter-wave signal inputted from one terminal, in the recited order, from a next terminal adjacent to the one terminal. Furthermore, in the circulator 304, the output of the pulse modulator 303 is inputted to the first terminal 304a. The transmitting/receiving antenna 305 is connected with the second terminal 304b of the circulator 304. The mixer 306 is connected between the other output terminal 302c of the branching device 302 and the third terminal 304c of the circulator 304. Furthermore, the mixer 306 mixes the millimeter-wave signal branched to the other output terminal 302c and the millimeter-wave signal received by the transmitting/receiving antenna 305 and outputs an intermediate-frequency signal. In the high-frequency transmitter-receiver of the embodiment, the line length between the branching device 302 and the pulse modulator 303 or the line length between the branching device 302 on the side of the mixer 306 and the pulse modulator 303 is set so that δ=±π in which δ is a phase difference at a center frequency between a signal Wa$_2$, which is a millimeter-wave signal which passes through the pulse modulator 303 in the OFF state and a signal Wb$_2$, which is a millimeter-wave signal which passes the mixer 306 and the circulator 304 from the other output terminal 302c of the branching device 302 to the output terminal 303b of the pulse modulator 303 and which is reflected on the output terminal 303b of the pulse modulator 303.

On the other hand, the high-frequency transmitter-receiver of the thirteenth embodiment of the invention shown in FIG. 20 uses the non-radiative dielectric waveguide (as will also be called the "NRD guide") as the high-frequency transmission line for connecting the aforementioned individual configuration components. In a fundamental configuration of that non-radiative dielectric waveguide, as shown in a partially broken perspective view of FIG. 4, the dielectric guide 3 having a rectangular section is arranged between the parallel flat plate conductors 1 and 2 arranged in parallel with a predetermined spacing a, as defined by a ≦λ/2 for the wavelength λ of the millimeter-wave signal. As a result, the millimeter-wave signal can be propagated without any substantial loss in the dielectric guide 3 by eliminating the intrusion of the noise from the outside into the dielectric guide 3 and the radiation of the millimeter-wave signal to the outside. Herein, the wavelength λ is a wavelength of the millimeter-wave signal in the air (or the free space) for the frequency in use.

Specifically, the high-frequency transmitter-receiver of the thirteenth embodiment of the invention shown in FIG. 20 comprises, as shown in the top plan view of FIG. 21, a pair of the flat plate conductors 1 (although the other is not shown), the first dielectric guide 316, the millimeter-wave oscillator 301, the pulse modulator 303, a second dielectric guide 317, the circulator 304, the third dielectric guide 318, the forth dielectric guide 319, the transmitting/receiving antenna 305, the fifth dielectric guide 320, the non-reflective terminator 322, and the mixer 306. The pair of the parallel flat plate conductors 1 is arranged in parallel at a spacing of one half or less of a wavelength of a millimeter-wave signal. The first dielectric guide 316 is arranged between the parallel flat plate conductors 1. The millimeter-wave oscillator 301 is disposed between the parallel flat plate conductors 1 and connected to the one end of the first dielectric guide 316 and frequency-modulates the millimeter-wave signal outputted from the high-frequency diode and propagates and outputting the modulated signal as the millimeter-wave signal via the first dielectric guide 316. The pulse modulator 303 is disposed between the parallel flat plate conductors 1 and connected to the other end of the first dielectric guide 316 and reflects the millimeter-wave signal to the side of the input terminal 303a or passes through the millimeter-wave signal to the side of the output terminal 303b in response to a pulse signal. The second dielectric guide 317 is disposed between the parallel flat plate conductors 1 and has its one end connected to the output terminal 303b of the pulse modulator 303.

The circulator 304 is disposed between the parallel flat plate conductors 1, has the ferrite plates 315 arranged in parallel with the parallel flat plate conductor 1, and the first terminal 315a, the second terminal 315b and the third terminal 315c arranged at the peripheral edge portion of the ferrite plates 315, and outputs the millimeter-wave signal inputted from one of the terminals in the recited order, from a next terminal adjacent to the one terminal. Furthermore, in the circulator 304, the first terminal 315a is connected to the other end of the second dielectric guide 317. The third dielectric guide 318 is disposed between the parallel flat plate conductors 1, arranged radially at the peripheral edge portion of the ferrite plate 315 of the circulator 304, and has its one end connected to the second terminal 315b. The fourth dielectric guide 319 is disposed between the parallel flat plate conductors 1, arranged radially at the peripheral edge portion of the ferrite plate 315 of the circulator 304, and has its one ends connected to the third terminal 315c. The transmitting/receiving antenna 305 is disposed between the parallel flat plate conductors 1 and connected to the other end of the third dielectric guide 318. The fifth dielectric guide 320 is disposed between the parallel flat plate conductors 1, and disposed at its midway close to or joined to the midway of the first dielectric guide 316 and branches and propagates a portion of the millimeter-wave signal propagated via the first dielectric guide 316. The non-reflective terminator 322 is disposed between the parallel flat plate conductors 1 and connected to one end of the fifth dielectric guide 320 on the side of the millimeter-wave oscillator 301. The mixer 306 is disposed between the parallel flat plate conductors 1 and connected between the other end of the fourth dielectric guide 319 and the other end of the fifth dielectric guide 320. The mixer 306 also receives the millimeter-wave signal inputted from the fifth dielectric guide 320, at the transmitting/receiving antenna 305, to mix the millimeter-wave signal inputted from the circulator 304 thereby to output the intermediate-frequency signal.

In the high-frequency transmitter-receiver of the embodiment, the total line length of the line length (corresponding to the line length between the branching device 302 and the pulse modulator 303) from the portion (configuring the branching device 302), at which the first dielectric guide 316 and the fifth dielectric guide 320 are disposed close or joined to each other, to the other end of the first dielectric guide 316 or the line length from that portion, at which the first dielectric guide 316 and the fifth dielectric guide 320 are disposed close or joined to each other, to the other end of the fifth dielectric guide 320, the line length of the fourth dielectric guide 319 and the second dielectric guide 317, is set so that δ=±π in which δ is a phase difference at the center frequency between a signal Wa$_2$, which is a millimeter-wave signal which passes through the pulse modulator 303 in the OFF state and a signal Wb$_2$, which is a millimeter-wave signal which passes through the mixer 306, the fourth dielectric guide 319 and the circulator 304 from the fifth dielectric guide 320 in the closely disposed or joined portion of the first dielectric guide 316 and the fifth dielectric guide 320 to the output terminal 303b of the pulse modulator 303 and which is reflected on the output terminal 303b of the pulse modulator 303. The first dielectric guide 316 and the fifth dielectric guide 320 configure the branching device 302 at the closely disposed portion or the joined portion.

The first terminal 315a, the second terminal 315b and the third terminal 315c in FIG. 21 correspond to the first terminal 304a, the second terminal 304b and the third terminal 304c in FIG. 20, respectively.

Figure 25:
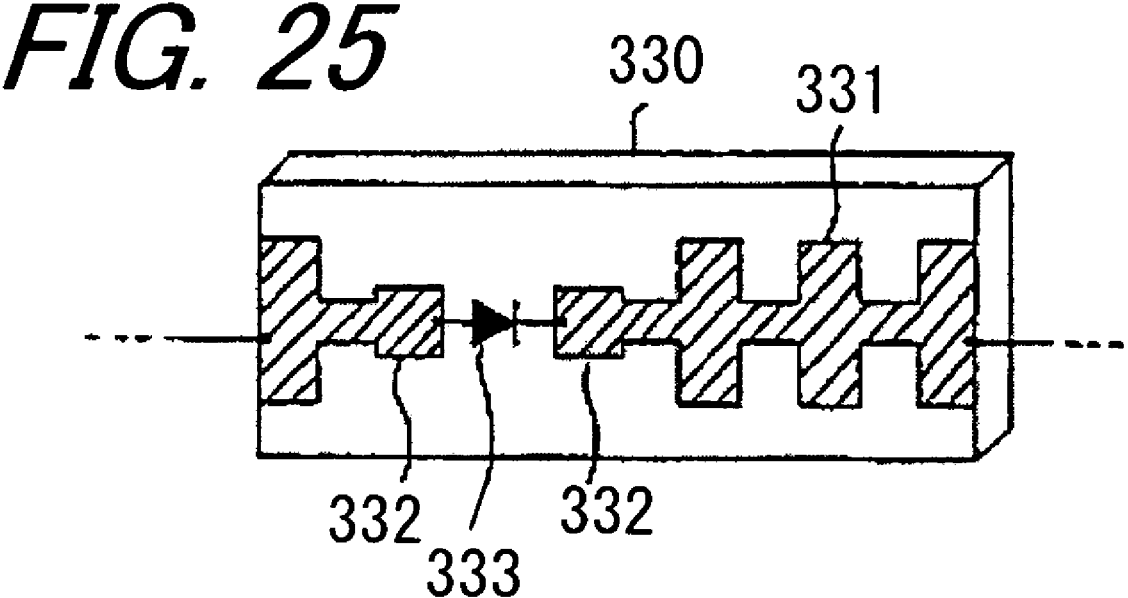
FIG. 25 is a schematic perspective view showing an example of a substrate having a diode used in a pulse modulator of a non-radiative dielectric waveguide type.

In this configuration, as shown in the perspective view of FIG. 25, the pulse modulator 303 inserts such a pulse modulating portion between the first dielectric guide 316 and the second dielectric guide 317 that the diode 333 acting as a high-frequency modulating element is connected with the connecting terminal 332 formed in the interrupted midway portion of the choke type bias feed line 331 formed on the surface of the substrate 330, so that the millimeter-wave signal outputted from the first dielectric guide 316 becomes incident on the diode 333. In this configuration, the diode 333 as the high-frequency modulation element may be exemplified by the PIN diode.

This transmission type pulse modulator is suited for the pulse modulator 303 in the high-frequency transmitter-receiver of the invention. Moreover, this transmission type pulse modulator may be replaced by a switch such as a semiconductor switch or an MEMS (Micro Electro Mechanical System) capable of transmitting or reflecting the high-frequency signal.

Figure 26:
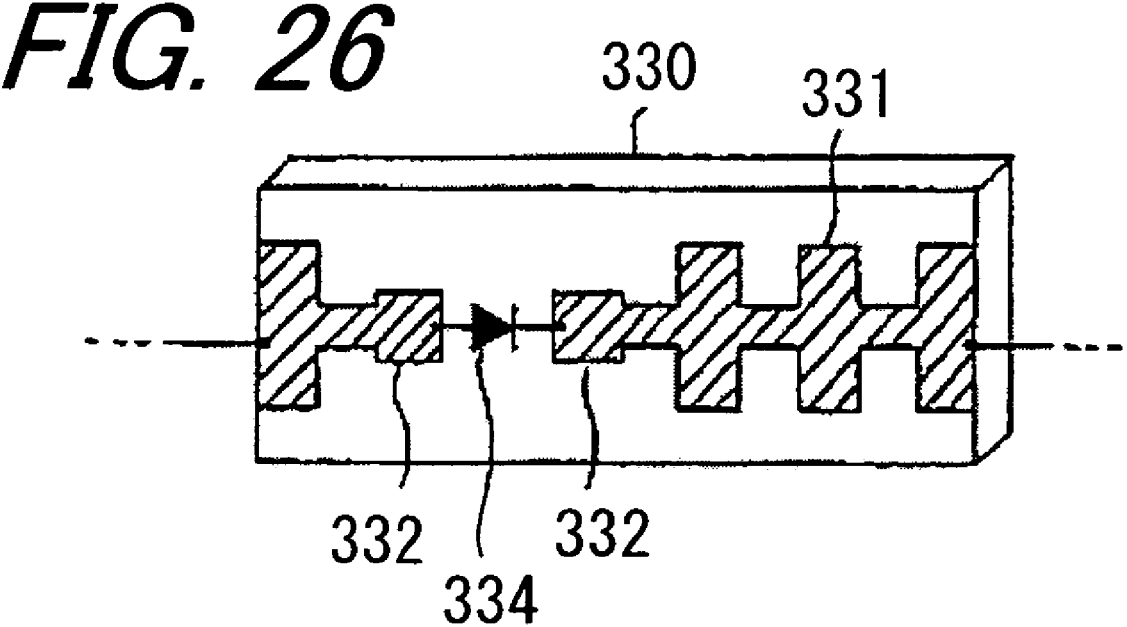
FIG. 26 is a schematic perspective view showing an example of a substrate having a diode used in a mixer of a non-radiative dielectric waveguide type.

As shown in the perspective view of FIG. 26, the mixer 306 connects such a millimeter-wave detecting portion individually with the fourth dielectric guide 319 and the fifth dielectric guide 320 that the diode 334 acting as the high-frequency modulating element is connected to the connecting terminal 332 formed in the interrupted midway portion of the choke type bias feed line 331 formed on the individual surfaces of the two substrates 330, so that the millimeter-wave signals outputted from the fourth dielectric guide 319 and the dielectric guide 320 become incident on the individual diodes 334. At the same time, the midway of the fourth dielectric guide 319 and the midway of the fifth dielectric guide 320 are so disposed close or joined to each other that the fourth dielectric guide 319 and the fifth dielectric guide 320 may be electromagnetically coupled to each other. In this configuration, the diodes 334 as the high-frequency detecting elements may be exemplified by the Schottky barrier diodes.

In order to set the phase difference $\delta$ to $\delta=\pm\pi$, moreover, the line length of the second dielectric guide 317 may be so shortened that the line length of the first dielectric guide 316 is elongated, or the line length of the second dielectric guide 317 may be so elongated that the line length of the first dielectric guide 316 is shortened. Thus, the arrangement of the circuit elements other than the pulse modulator 303 need not be changed so that the adjustment can be made easy. In this case, the position of the portion (i.e., the portion to configure the branching device 302), at which the first dielectric guide 316 and the fifth dielectric guide 320 are disposed close to or joined to each other, is not changed.

The high-frequency transmitter-receiver of the thirteenth embodiment of the invention thus configured, as shown in FIG. 20 and FIG. 21, operates like the high-frequency transmitter-receiver of the related art. At this time, however, the line length between the branching device 302 and the pulse modulator 303 or the line length between the branching device 302 on the side of the mixer 306 and the pulse modulator 303 is set so that $\delta=\pm\pi$ in which $\delta$ is a phase difference at the center frequency between a signal $Wa_2$, which is a millimeter-wave signal which passes through the pulse modulator 303 in the OFF state, and a signal $Wb_2$, which is a millimeter-wave signal which passes through the mixer 306 and the circulator 304 from the other output terminal 302c of the branching device 302 to the output terminal 303b of the pulse modulator 303 and to be reflected on the output terminal 303b of the pulse modulator 303. As a result, the signals $Wa_2$ and $Wb_2$ are synthesized in opposite phases between the output terminal 303b of the pulse modulator 303 and the circulator 304 so that they cancel each other and effectively attenuate. When the pulse modulator 303 is OFF, therefore, the ON/OFF ratio of the transmission output can be enhanced while suppressing the transmission of the portion of the transmission millimeter-wave signal as the unnecessary signal, thereby to enhance the transmission/reception performance.

Next, the high-frequency transmitter-receiver of the fourteenth embodiment of the invention comprises, as shown in FIG. 22, the millimeter-wave oscillator 301, the branching device 302, the pulse modulator 303, the circulator 304, the transmitting/receiving antenna 305, and the mixer 306. The millimeter-wave oscillator 301 generates the millimeter-wave signal. The branching device 302 is connected to the millimeter-wave oscillator 301 and branches a millimeter-wave signal and outputs the branched millimeter-wave signals to one output terminal 302b and the other output terminal 302c. The pulse modulator 303 is connected to the one output terminal 302b and modulates the millimeter-wave signal branched to the one output terminal 302b, and outputs the modulated millimeter-wave signal. The circulator 304 has the first terminal 304a, the second terminal 304b and the third terminal 304c around a magnetic element, and outputs the millimeter-wave signal inputted from one of the terminals, in the recited order from a next terminal adjacent to the one terminal. Furthermore, in the circulator 304, the output of the pulse modulator 303 is inputted to the first terminal 304a. The transmitting/receiving antenna 305 is connected to the second terminal 304b of the circulator 304.

The mixer 306 is connected between the other output terminal 302c of the branching device 302 and the third terminal 304c of the circulator 304. Furthermore, the mixer 306 mixes the millimeter-wave signal branched to the other output terminal 302c and the millimeter-wave signal received by the transmitting/receiving antenna 305 and outputs the intermediate-frequency signal. In the high-frequency transmitter-receiver of the embodiment, the branching ratio R of the branching device 302 is expressed by $R=Pb_1/Pa_1$ (R: an real number of 0 or more) and is set to $R<1$, in which $Wa_1$ is a millimeter-wave signal to be outputted to one output terminal 302b of the branching device 302 and $Pa_1$ is an intensity thereof (unit: watt), $Wb_1$ is a millimeter-wave signal to be outputted to the other output terminal 302c of the branching device 302 and $Pb_1$ is an intensity thereof (unit: watt).

In the configuration thus far described, moreover, it is preferred that the branching ratio R is set to $R=A_1/(B_1 \cdot B_2 \cdot B_3)$, in which $A_1$, $B_1$, $B_2$ and $B_3$ are a transmission coefficient of the millimeter-wave signal to transmit through the pulse modulator 303 in the OFF state, a transmission coefficient of the millimeter-wave signal to transmit between the two input terminals of the mixer 306, a transmission coefficient of the millimeter-wave signal to transmit between the third terminal 304c and the first terminal 304a of the circulator 304, and a reflection coefficient of the millimeter-wave signal to be reflected on the output terminal 303b of the pulse modulator 303, respectively.

In the aforementioned configuration, moreover, it is preferred that the line length between the branching device 2 and the pulse modulator 303 or the line length between the branching device 302 on the side of the mixer 306 and the pulse modulator 303 is set so that $\delta=\pm\pi$ in which $\delta$ is a phase difference at the center frequency between a signal $Wa_2$, which is a millimeter-wave signal which passes through the pulse modulator 303 in the OFF state and a signal $Wb_2$, which is a millimeter-wave signal which passes through the mixer 306 and the circulator 304 from the other output terminal 302c of the branching device 302 to the output terminal 303b of the pulse modulator 303 and to be reflected on the output terminal 303b of the pulse modulator 303.

Moreover, the high-frequency transmitter-receiver of the fourteenth embodiment of the invention, as shown in FIG. 22, uses the non-radiative dielectric waveguide as the high-frequency transmission line for connecting the aforementioned individual components, as in the high-frequency transmitter-receiver of the thirteenth embodiment of the invention, as shown in the top plan view of FIG. 21.

In the high-frequency transmitter-receiver of the fourteenth embodiment of the invention, as shown in FIG. 22, unlike the high-frequency transmitter-receiver of the thirteenth embodiment of the invention shown in FIG. 21, the distance D of the closely disposed portion between the first dielectric guide 316 and the fifth dielectric guide 320 may be set such that the ratio between $Pb_1$ and $Pa_1$ is expressed by $Pb_1/Pa_1<1$, in which $Wa_1$ is a millimeter-wave signal to be outputted to the other output terminal of the first dielectric guide 316, $Pa_1$ is an intensity thereof (unit: watt), $Wb_1$ is a millimeter-wave signal to be outputted to the other end of the fifth dielectric guide 20 and $Pb_1$ is an intensity thereof (unit: watt). Moreover, the branching ratio R may be set to $R=A_1/(B_1 \cdot B_2 \cdot B_3)$.

The high-frequency transmitter-receiver of the fourteenth embodiment of the invention thus configured acts like the high-frequency transmitter-receiver of the related art. At this time, however, the branching ratio R of the branching device 302 is expressed by $R=Pb_1/Pa_1$ and is set to $R<1$, in which $Wa_1$ is a millimeter-wave signal to be outputted to one output terminal 302b of the branching device 302, $Pa_1$ is an intensity thereof, $Wb_1$ is a millimeter-wave signal to be outputted to the other output terminal 302c of the branching device 302 and $Pb_1$ is an intensity thereof. Thus, even when the isolation between the two input terminals of the mixer 306 is worse than the isolation of the pulse modulator 303 in the OFF state, the branching device 302 outputs the millimeter-wave signal of a low intensity to the side of the other output terminal 302c (of the fifth dielectric guide 320) rather than the side of one output terminal 302b (of the first dielectric guide 316), thereby to lower the intensity of the millimeter-wave signal to pass through the mixer 306 and the circulator 304 to the output terminal 303b of the pulse modulator 303. Therefore, it is possible to reduce the intensity of the millimeter-wave signal which becomes incident on the side of the mixer 306 and which is reflected on the output terminal 303b of the pulse modulator 303. Moreover, this intensity of the millimeter-wave signal can be made as equal to that of the millimeter-wave signal to pass through the pulse modulator 303 in the OFF state, so that those millimeter-wave signals can interfere and attenuate each other. By these operations, the simple configuration is enabled to suppress the transmission of the portion of the transmission millimeter-wave signal as the unnecessary signal when the pulse modulator 303 is in the OFF state, thereby to raise the ON/OFF ratio of the transmission output and to enhance the transmission/reception performance.

The reason for setting the branching ratio to $R<1$ is explained in the following. The intensity $Pa_2$ (unit:watt) of the millimeter-wave signal $Wa_2$ and the intensity $Pb_2$ (unit:watt) of the millimeter-wave signal $Wb_2$ can approach each other so that the millimeter-wave signal $Wa_2$ and the millimeter-wave signal $Wb_2$ can effectively interfere each other thereby to make the intensity at the time when those millimeter-wave signals $Wa_2$ and $Wb_2$ are synthesized, drastically lower than that of the sum $(Pa_2+Pb_2)$ of the individual intensities of those millimeter-wave signals $Wa_2$ and $Wb_2$. This fact follows the general interference theory of the case, in which two high-frequency signals are made to interfere. When the branching ratio R is $R=1$, on the other hand, the relation of $Pa_2<Pb_2$ holds in ordinary almost cases, as has been described, when the pulse modulator 303 is OFF. When the branching ratio R is set to $R>1$, on the other hand, the intensity $Pb_2$ becomes far higher than the intensity $Pa_2$ so that the intensities $Pb_2$ and $Pa_2$ become remarkably different to lower the effect that the millimeter-wave signals $Wa_2$ and $Wb_2$ interfere and weaken each other. As a result, the intensity at the time when the millimeter-wave signals $Wa_2$ and $Wb_2$ are synchronized is not substantially different from the sum of $(Pa_2+Pb_2)$ the individual intensities of the millimeter-wave signals $Wa_2$ and $Wb_2$. Thus, the output of the millimeter-wave signal at the time when the pulse modulator 303 is OFF cannot be reduced so that the ON/OFF ratio cannot be raised.

Moreover, the branching ratio R is set to $R=A_1/(B_1 \cdot B_2 \cdot B_3)$, in which $A_1$, $B_1$, $B_2$ and $B_3$ are the transmission coefficient of the millimeter-wave signal to transmit through the pulse modulator 303 in the OFF state, the transmission coefficient of the millimeter-wave signal to transmit between the two input terminals of the mixer 306, the transmission coefficient of the millimeter-wave signal to transmit between the third terminal 304c and the first terminal 304a of the circulator 304, and the reflection coefficient of the millimeter-wave signal to be reflected on the output terminal 303b of the pulse modulator 303, respectively. Then, the intensity of the millimeter-wave signal coming from the side of the mixer 306 and reflected on the output terminal 303b of the pulse modulator 303 can be made as equal to that of the millimeter-wave signal to pass through the pulse modulator 303 in the OFF state, so that those millimeter-wave signals can interfere and attenuate each other. Therefore, the transmission of the portion of the transmission millimeter-wave signal as the unnecessary signal can be more suppressed when the pulse modulator 303 is in the OFF state, thereby to raise the ON/OFF ratio of the transmission output and to enhance the transmission/reception performance.

The reason for setting the branching ratio to $R=A_1/B_1 \cdot B_2 \cdot B_3$ is explained in the following. The intensity $Pa_2$ (unit:watt) of the millimeter-wave signal $Wa_2$ and the intensity $Pb_2$ (unit:watt) of the millimeter-wave signal $Wb_2$ can approach substantially equal values so that the millimeter-wave signal $Wa_2$ and the millimeter-wave signal $Wb_2$ can more effectively interfere each other than for $R<1$, thereby to make the intensity at the time when those millimeter-wave signals $Wa_2$ and $Wb_2$ are synthesized, lower than that of the sum $(Pa_2+Pb_2)$ of the individual intensities of those millimeter-wave signals $Wa_2$ and $Wb_2$.

As a matter of fact, of those $A_1$, $B_1$, $B_2$ and $B_3$, the coefficient $B_2 \approx 1$, because the millimeter-wave signal transmits without any substantial loss from the third terminal 304c to the first terminal 304a of the circulator 304. The coefficient $B_3 \approx 1$, because the millimeter-wave signal is substantially totally reflected on the output terminal 303b of the pulse modulator 303 in the OFF state. Therefore, the branching ratio R may be substantially determined at the ratio of $A_1$ and $B_1$. At this time, for the coefficient $A_1$, the transmission coefficient $S_{21}$ between the input terminal 303a and the output terminal 303b of the pulse modulator 303 may be measured by the network analyzer for the millimeter-wave band while the pulse modulator 303 being OFF. For the coefficient $B_1$, on the other hand, the transmission coefficient $S_{21}$ between the two input terminals of the mixer 306 may be measured by the network analyzer for the millimeter-wave band while the mixer 306 being fed with a predetermined bias current. For these measurements, as will be described hereinafter, a metal plate for shielding the electromagnetic wave is inserted in place of the millimeter-wave modulating switch between the first dielectric guide 316 and the second dielectric guide 317 or between the first dielectric guide 316 and the fifth dielectric guide 320. Then, both the coefficients $A_1$ and $B_1$ can be measured in the module state without disassembling the individual components for the measurements. Then, the ratio of those two transmission coefficients $S_{21}$ may be determined on the center frequency of the millimeter-wave signals $Wa_2$ and $Wb_2$. For example, the coefficient $B_1$ is usually larger than the coefficient $A_1$ by ten and several dB. In this case, the branching ratio R may be set as much as possible to −10 and several dB. Thus, the intensities $Pa_2$ and $Pb_2$ can be substantially equalized so that the millimeter-wave signals $Wa_2$ and $Wb_2$ can effectively interfere with each other. As a result, the intensity at the synthesization of the millimeter-wave signals $Wa_2$ and $Wb_2$ can be made far lower than $(Pa_2+Pb_2)$ so that the intensity can be made better than that of the otherwise case by about 6 dB. Herein, it is ordinary that $A_1 < B_1$. The method of setting the branching ratio to R<1 or $R=A_1/(B_1 \cdot B_2 \cdot B_3)$ is effectively but should not be limitative in other cases.

Moreover, the line length between the one output terminal 302b of the branching device 302 and the pulse modulator 303 or the line length between the other output terminal 302c of the branching device 302 and the pulse modulator 303 through the mixer 306 and the circulator 304 is set so that $\delta = \pm \pi$ in which δ is a phase difference at the center frequency between a signal $Wa_2$, which is a millimeter-wave signal which passes through the pulse modulator 303 in the OFF state, and a signal $Wb_2$, which is a millimeter-wave signal which passes through the mixer 306 and the circulator 304 from the other output terminal 302c of the branching device 302 to the output terminal 303b of the pulse modulator 303 and to be reflected on the output terminal 303b of the pulse modulator 303. Then, the signals $Wa_2$ and the $Wb_2$ are synthesized in opposite phases between the output terminal 303b of the pulse modulator 303 and the circulator 304 so that they cancel each other and effectively attenuate. When the pulse modulator 303 is OFF, therefore, the ON/OFF ratio of the transmission output can be enhanced while suppressing the transmission of the portion of the transmission millimeter-wave signal more effectively as the unnecessary signal, thereby to enhance the transmission/reception performance.

In the high-frequency transmitter-receiver of the fourteenth embodiment of the invention, the millimeter-wave signals $Wa_2$ and $Wb_2$ never fail to interfere to attenuate each other in other than the special case, in which the phase difference δ is $\delta = 2N\pi$, although not especially intentionally set so, so that the high-frequency transmitter-receiver outputs the millimeter-wave signal of an intensity always smaller than the sum of the intensity $Pa_2$ of the signal $Wa_2$ and the intensity $Pb_2$ of the signal $Wb_2$ when the pulse modulator 303 is in the OFF state. However, the intensity $Pb_2$ of the signal $Wb_2$ and the intensity $Pa_2$ of the signal $Wa_2$ are different (usually the former $Wb_2$ has a higher intensity than that of the latter $Wa_2$) so that the effect cannot be sufficiently attained. When the intensity $Pb_2$ of the signal $Wb_2$ and the intensity $Pa_2$ of the signal $Wa_2$ are intentionally made equal, on the contrary, it is possible to drastically enhance the effect that those signals $Wa_2$ and $Wb_2$ interfere and attenuate each other. When the phase difference δ is intentionally set to the aforementioned value, that effect can be additionally further enhanced. This principle is generally known as the theory of the Mach-Zehnder interferometer or the like.

With the branching ratio R being so set as described above, moreover, the local signal of a proper intensity is inputted from the other output terminal 302c of the branching device 302 to the mixer 306 thereby to make the reception sensitivity satisfactory. In addition, the branching device 302 intensifies the millimeter-wave signal to be outputted from the one output terminal 302b of the branching device 302 to the pulse modulator 303, thereby to provide an effect that the transmission output of the transmission millimeter-wave signal is increased.

A high-frequency transmitter-receiver of the fifteenth embodiment of the invention comprises, as shown in the block circuit diagram of FIG. 23, the first and second circulators 302' and 304, a millimeter-wave oscillator 301, the pulse modulator 303, the transmitting/receiving antenna 305, and the mixer 306. The first and second circulators 302' and 304 each have the first terminals 302'a and 304a, the second terminals 302'b and 304b and the third terminals 302'c and 304c around the magnetic element, and outputs the millimeter-wave signal inputted from one of the terminals, in the recited order, from a next terminal adjacent to the one terminal. The millimeter-wave oscillator 301 is connected to the first terminal 302'a of the first circulator 302' and generates the millimeter-wave signal. The pulse modulator 303 is connected between the second terminal 302'b of the first circulator 302' and the first terminal 304a of the second circulator 304. Furthermore, the pulse modulator 303 transmits the millimeter-wave signal to the side of the second circulator 304 or reflects that millimeter-wave signal to the first circulator 302' in response to the pulse signal. The transmitting/receiving antenna 305 is connected to the second terminal 304b of the second circulator 304. The mixer 306 is connected between the third terminal 302'c of the first circulator 302' and the third terminal 304c of the second circulator 304, and mixes the millimeter-wave signal reflected on the pulse modulator 303 and inputted from the third terminal 302' c of the first circulator 302' and the millimeter-wave signal received by the transmitting/receiving antenna 305 and inputted from the third terminal 304c of the second circulator 304, and outputs the intermediate-frequency signal. In the high-frequency transmitter-receiver of the embodiment of the invention, $\delta = \pm\pi$ in which δ is a phase difference δ at the center frequency between a signal Wa which is a millimeter-wave signal which passes through the pulse modulator 303 in the OFF state, and Wb, which is a millimeter-wave signal which passes from the third terminal 302'c of the first circulator 302' through the mixer 306 and the second circulator 304 to the output terminal 303b of the pulse modulator and which is reflected on the output terminal 303b of the pulse modulator 303.

Moreover, the high-frequency transmitter-receiver of the fifteenth embodiment of the invention, as shown in FIG. 23, uses the non-radiative dielectric waveguides as the high-frequency transmission lines for connecting the aforementioned individual components, as in the example of the high-frequency transmitter-receiver of the thirteenth embodiment of the invention, as shown in the top plan view of FIG. 21.

Specifically, the high-frequency transmitter-receiver of the fifteenth embodiment of the invention shown in the block circuit diagram of FIG. 23 is configured, as shown in the top plan view of FIG. 24, to include, a pair of the parallel flat plate conductors 1 (although the other is not shown), the first circulator 302' and the second circulator 304, the first dielectric guide 346, the millimeter-wave oscillator 301, the second dielectric guide 347, the pulse modulator 303, the third dielectric guide 348, the fourth dielectric guide 349, the transmitting/receiving antenna 305, the fifth dielectric guide 350, the sixth dielectric guide 351, and the mixer 306. The pair of the parallel flat plate conductors 1 is arranged in parallel at a spacing of one half or less of the wavelength of the millimeter-wave signal. The first circulator 302' and the second circulator 304 are disposed between the parallel flat plate conductors 1 and each have ferrite plates 314 and 315 arranged in parallel between the parallel flat plate conductors 11, and the first terminals 314a and 315a, the second terminals 314b and 315b and the third terminals 314c and 315c arranged at the peripheral edge portion of the ferrite plates 314 and 315, each acting as the input/output terminals of the millimeter-wave signal, and the millimeter-wave signal inputted in the recited order from one terminal is outputted to the adjoining next terminal. The first dielectric guide 346 is disposed between the parallel flat plate conductors 1 and has its one end connected to the first terminal 314a of the first circulator 302'.

The millimeter-wave oscillator 301 is disposed between the parallel flat plate conductors 1 and connected to the other end of the first dielectric guide 346 for frequency-modulating the millimeter-wave signal outputted from the high-frequency diode and outputs the modulated signal as the millimeter-wave signal via the first dielectric guide 346. The second dielectric guide 347 is disposed between the parallel flat plate conductors 1 and connected at its one end with the second terminal 314b. The pulse modulator 303 is disposed between the parallel flat plate conductors 1 and connected to the other end of the second dielectric guide 347 and reflects the millimeter-wave signal to the input terminal 303a or transmits the millimeter-wave signal to the output terminal 303b in response to the pulse signal. The third dielectric guide 348 is disposed between the parallel flat plate conductors 1 and connected between the output terminal 303b of the pulse modulator 303 and the first terminal 315a of the second circulator 304. The fourth dielectric guide 349 is disposed between the parallel flat plate conductors 1 and connected at its one end with the second terminal 315b of the second circulator 304. The transmitting/receiving antenna 305 is disposed between the parallel flat plate conductors 1 and connected to the other end of the fourth dielectric guide 349. The fifth dielectric guide 350 is disposed between the parallel flat plate conductors 1 and connected at its one end with the third terminal 315c of the second circulator 304. The sixth dielectric guide 351 is disposed between the parallel flat plate conductors 1, connected at its one end with the third terminal 314c of the first circulator 302' and disposed so that its midway and the midway of the fifth dielectric guide 350 are close to each other to obtain electromagnetic coupling. The mixer 306 is disposed between the parallel flat plate conductors 1 and connected between the other end of the fifth dielectric guide 350 and the other end of the sixth dielectric guide 351. Furthermore, the mixer 306 mixes the millimeter-wave signal inputted from the sixth dielectric guide 351 and the millimeter-wave signal received by the transmitter-receiver antenna 305 and inputted from the second circulator 304, and outputs the intermediate-frequency signal. In the high-frequency transmitter-receiver of the embodiment, $\delta=\pm\pi$ in which $\delta$ is a phase difference at the center frequency between a signal Wa, which is the millimeter-wave signal to transmit through the pulse modulator 303 in the OFF state, and a signal Wb, which is a millimeter-wave signal which passes from the third terminal 314c (302'c) of the first circulator 302' through the mixer 306 and the second circulator 304 to the output terminal 303b of the pulse modulator 303 and which is reflected on the output terminal 303b of the pulse modulator 303.

In the aforementioned configuration, moreover, it is preferable that an attenuator or a variable attenuator is interposed between the first circulator 302' and the mixer 306.

The high-frequency transmitter-receiver of the fifteenth embodiment of the invention thus configured acts like the high-frequency transmitter-receiver of the related art. However, $\delta=+\pi$ in which $\delta$ is a phase difference $\delta$ at the center frequency between a signal Wa, which is a millimeter-wave signal to transmit through the pulse modulator 303 in the OFF state, and a signal Wb, which is a millimeter-wave signal which passes from the third terminal 302'c (314c) of the first circulator 302' through the mixer 306 and the second circulator 304 to the output terminal 303b of the pulse modulator 303 and which is reflected on the output terminal 303b of the pulse modulator 303. As a result, the signals Wa and the Wb are synthesized in opposite phases between the output terminal 303b of the pulse modulator 303 and the second circulator 304 so that they cancel each other and effectively attenuate. When the pulse modulator 303 is OFF, therefore, the ON/OFF ratio of the transmission output can be enhanced while suppressing the transmission of the portion of the transmission millimeter-wave signal as the unnecessary signal, thereby to enhance the transmission/reception performance.

While the pulse modulator 303 is outputting the transmission millimeter-wave signal, the first circulator 302' and the pulse modulator 303 are associated to act not to input the local signal LO to the mixer 306. A portion of the transmission millimeter-wave signal may leak from the first terminal 304a (315a) of the second circulator 304 to the third terminal 304c (315c) due to the shortage or the like of the isolation of the second circulator 304. Even with this leakage, the mixer 306 does not output the intermediate-frequency signal corresponding to the millimeter-wave signal having leaked. Therefore, the reception performance can be enhanced not only to raise the ON/OFF ratio of the transmission output, i.e., the improvement in the transmission system but also to improve the reception system.

In case the attenuator or the variable attenuator is interposed between the first circulator 302' and the mixer 306, the attenuator or the variable attenuator can attenuate the millimeter-wave signal outputted from the third terminal 302'c (or the third terminal 314c) of the first circulator 302' thereby to reduce the intensity of the millimeter-wave signal to transmit between the two input terminals of the mixer 306. As a result, it is possible to equalize the intensity of the millimeter-wave signal Wb, which transmits from the mixer 306 through the second circulator 304 to the pulse modulator 303 and which is reflected on the output terminal 303b of the pulse modulator 303, and the intensity of the millimeter-wave signal Wa which transmits through the pulse modulator 3 in the OFF state. As a result, the signals Wa and Wb are synthesized in opposite phases between the output terminal 303b of the pulse modulator 303 and the second circulator 304 so that they cancel and attenuate each other more effectively. When the pulse modulator 303 is in the OFF state, therefore, transmission of the portion of the transmission millimeter-wave signal as the unnecessary signal can be further suppressed to raise the ON/OFF ratio of the transmission output thereby to enhance the transmission/reception performance more.

The material for the first to sixth dielectric guides 316 to 321, 346 to 351 may be preferably resin such as ethylene tetrafluoride or polystyrene, or ceramics such as cordierite ($2MgO.2Al_2O_3.O.5SiO_2$) ceramics, alumina ($Al_2O_3$) ceramics or glass ceramics, and these substances have a low loss in the millimeter-wave band.

Moreover, the sectional shapea of the first to sisxth dielectric guides 316 to 321, 346 and 351 are basically rectangular but may also be a rectangle having rounded corners and a variety of sectional shapes used for transmitting the millimeter-wave signal.

The material for the ferrite plates 314 and 315 is preferably ferrite of zinc-nickel-iron oxide ($Zn_aNi_bFe_cO_x$) for the millimeter-wave signal.

The ferrite plates 314 and 315 are normally formed into a disc shape but may also be formed into a regular polygon shape in a top plan view. In this case, in case the number of dielectric guides to be connected is n (n: an integer of 3 or more), their top plan shape may be a regular m-polygon shape (m: an integer lager than n of 3 or more).

On the other hand, the non-reflective terminator 322 may be configured at the dielectric guide 3, as shown in FIG. 4, by attaching a layered resistor or electric wave absorber to the faces of the inside of the dielectric guide 3 and parallel to the parallel flat plate conductor 1 (2). At this time, a nickel-chromium alloy or carbon is preferred as a material for the resistor. On the other hand, permalloy or Sendust is preferred as the material for the electric wave absorber. The millimeter-wave signal can be efficiently attenuated by using those materials. Another material may be used for attenuating the millimeter-wave signals.

On the other hand, the substrate 330 used is prepared by forming the choke type bias feed line 331 made of a strip conductor or the like such as aluminum (Al), gold (Au) or copper (Cu) on the principal face of a plate-shaped substrate made of a thermoplastic resin such as ethylene tetrafluoride, polystylene, glassy ceramics, a glassy epoxy resin, an epoxy resin or so-called "liquid crystal polymer".

In the high-frequency transmitter-receiver of the invention, the circuit configurations individually shown in the block circuit diagrams are important. The high-frequency transmission lines for connecting the individual circuit components may be selectively exemplified, according to the frequency band employed and the application, not only by the non-radiative dielectric waveguides but also by the waveguides, the dielectric guides, the strip lines, the micro-strip lines, the coplanar lines, the slot lines, the coaxial lines or their modified high-frequency transmission lines. On the other hand, the frequency band to be used is effective not only for the millimeter-wave band but also for the micro-wave band or a less frequency band.

On the other hand, the circulator 304 (i.e., the second circulator 304) may be replaced by a duplexer, a switch, a hybrid circuit or the like. Moreover, the high-frequency oscillator, the modulator and the mixer may be exemplified not only by the diode but also by a bipolar transistor, a field effect transistor (FET) or an integrated circuit (e.g., CMOS, MMIC) having those transistors integrated therein.

Here will be described the radar apparatus of the invention, a radar-apparatus mounted vehicle and a radar-apparatus mounted small-sized boat.

The radar apparatus of the invention comprises any of the high-frequency transmitter-receivers of the thirteenth to fifteenth embodiments of the invention, and a range information detector for processing an intermediate-frequency signal outputted from the high-frequency transmitter-receiver and detecting the range information to an objective.

Since the radar apparatus of the invention is configured as above, the high-frequency transmitter-receiver transmits the satisfactory high-frequency signal having the high ON/OFF ratio of the transmission output. Thus, the radar apparatus which can detect a objective rapidly and reliably and a point-blank range or distant objective reliably, can be provided.

Moreover, the radar-apparatus mounted vehicle of the invention comprises the aforementioned radar apparatus of the invention, and the radar apparatus is used for detecting the objective.

With this configuration, like the radar-apparatus mounted vehicle of the related art, the radar-apparatus mounted vehicle of the invention can control the behavior of the vehicle on the basis of the range information detected by the radar apparatus or can warn the driver against it with a sound, a light or a vibration that the radar apparatus has detected an obstacle on the road or another vehicle. In the radar-apparatus mounted vehicle of the invention, the radar apparatus detects the objective such as the obstacle on the road or another vehicle rapidly and reliably so that the apparatus can allow a proper control of the vehicle and can give a proper warning to the driver without causing an abrupt behavior in the vehicle.

On the other hand, the radar-apparatus mounted small-sized boat of the invention comprises the aforementioned radar apparatus of the invention, wherein the radar apparatus is used for detecting the objective.

Like the radar-apparatus mounted vehicle of the related art, the radar-apparatus mounted small-sized boat of the invention thus configured acts to control the behavior of the small-sized boat on the basis of the range information detected by the radar apparatus, or to warn the driver against it with the sound, light or vibration that the small-sized boat has detected an obstacle such as sunken rock, another ship or another small-sized boat. In the radar-apparatus mounted small-sized boat of the invention, the radar apparatus detects the objective such as the obstacle such as the sunken rock, another ship or another small-sized boat rapidly and reliably so that the radar apparatus can warn the driver for a proper control and for a proper warning without causing any abrupt behavior in the small-sized boat.

Thus, according to the invention, it is possible to provide a high-frequency transmitter-receiver of a high performance, which can raise the ON/OFF ratio of the transmission output with the simple configuration while suppressing the transmission of the portion of the transmission high-frequency signal as the unnecessary signal when the pulse modulator is OFF, thereby to enhance the transmission/reception performance, a radar apparatus provided with the high-frequency transmitter-receiver, and a radar-apparatus mounted vehicle and a radar-apparatus mounted small-sized boat having the radar apparatus mounted thereon.

EXAMPLE

The high-frequency transmitter-receiver of the thirteenth embodiment of the invention, as shown in FIG. 21, was configured in the following manners. Two Al plates having a thickness of 6 mm were arranged as the parallel flat plate conductors 1 (2) at a spacing of 1.8 mm. Between the two Al plates, there were arranged the first to fifth dielectric guides 316 to 320, which were made of cordierite ceramics having a rectangular sectional shape of 1.8 mm (height)×0.8 mm (width) and a specific dielectric constant of 4.8. At this time, the circulator 304 was configured by arranging one of the two ferrite plates 315 having a diameter of 2 mm and a thickness of 0.23 mm in close contact with the upper side parallel flat plate conductor and the other in close contact with the lower side parallel flat plate conductor so that the ferrite plates confronted each other while having their center axes on the common straight line, and by arranging the second dielectric guide 317, the third dielectric guide 318 and the fourth dielectric guide 319 radially around the ferrite plate 315. Moreover, the branching device 302 was configured by bringing the midway of the first dielectric guide 316 and the midway of the fifth dielectric guide 320 to the closest distance D of D=2.1 mm, and by connecting the non-reflective terminator 322 with the end portion of the fifth dielectric guide 320 on the side of the millimeter-wave oscillator 301. Moreover, the pulse modulator 303 was configured by arranging the millimeter-wave modulating switch using the substrate 330 of an organic resin substrate (having a specific dielectric constant ∈r of ∈r=3.0) made of a thermoplastic resin of a low dielectric constant having a thickness of 0.2 mm between the first dielectric guide 316 and the second dielectric guide 317. On one principal face (i.e., the face opposite of the first dielectric guide 316) of the millimeter-wave modulating switch, there was formed the choke type bias feed line 331 which was made of copper by forming wider lines and narrower lines alternately. The wider lines had a length of $\lambda_1/4=0.7$ mm (in which the value $\lambda_1$ was 2.8 mm against the wavelength of about 4 mm of the frequency of 76.3 GHz of the millimeter-wave signal and was shortened in the dielectric substrate), and the narrower lines had a length of $\lambda_1/4=0.7$ mm. The wider lines had a width of 1.5 mm, and the narrower lines had a width of 0.2 mm. Moreover, the pill type voltage-controlled oscillator (VCO) using the Gunn diode element was connected as the millimeter-wave oscillator 301 with the other end of the waveguide, which was connected at its one end with a through hole formed in the parallel flat plate conductor 1 where the standing wave of the millimeter-wave signal to propagate in the first dielectric guide 316 had a high electric field. Moreover, a metallic horn antenna was connected as the transmitting/receiving antenna 305 with the end portion of the third dielectric guide 318 on the side opposite of the ferrite plate 315. Moreover, a balance type mixer was configured as the mixer 306 by bringing the midway of the fourth dielectric guide 319 and the midway of the fifth dielectric guide 320 to the closest distance of D=1.1 mm and by arranging such a millimeter-wave detecting portion individually on the end portion of the fourth dielectric guide 319 on the opposite side of the ferrite plate 315 and on the end portion of the fifth dielectric guide 320 on the opposite side of the branching device 302 as used the substrate 330 which was made of an organic resin substrate (having a specific dielectric constant of ∈r=3.0) made of a thermoplastic resin of a low dielectric constant having a thickness of 0.2 mm. On one principal face (i.e., the face on the opposite side of the fourth and fifth dielectric guides 319 and 320) of the millimeter-wave detecting portion, there was formed the choke type bias feed line 331 which was made of copper by forming wider lines and narrower lines alternately. The wider lines had a length of $\lambda_1/4=0.7$ mm (in which the value $\lambda_1$ was 2.8 mm against the wavelength of about 4 mm of the frequency of 76.3 GHz of the millimeter-wave signal and was shortened in the dielectric substrate) and the narrower lines had a length of $\lambda_1/4=0.7$ mm. The wider lines had a width of 1.5 mm, and the narrower lines had a width of 0.2 mm.

For the ferrite plate 315, there was used the material which had a specific dielectric constant of 13.5 and a saturation magnetization of 3,300 G (Gausses) (or a magnetic flux density Bm according to the DC magnetism measurement of JIS C2561).

Moreover, the branching ratio R of the branching device 302 was set to −14 dB. At this time, the ratio of $Pa_2/Pb_2$ between the intensity $Pa_2$ of the millimeter-wave signal $Wa_2$ to transmit through the pulse modulator 303 in the OFF state and the intensity $Pb_2$ of the millimeter-wave signal $Wb_2$, which transmits from the fifth dielectric guide 320 through the mixer 306, the fourth dielectric guide 319, the circulator 304 and the second dielectric guide 317 to the output terminal 303b of the pulse modulator 303 and which was reflected on the output terminal 303b of the pulse modulator 303, was about 3 dB for the frequency of 76.3 GHz. At this time, moreover, the mixer 306 had a satisfactory conversion gain.

Two kinds of samples were prepared on the high-frequency transmitter-receiver thus configured. One was adopted as a sample X for the example of the invention, and the other was adopted as a sample Y for a comparison. The sample X was conditioned such that the phase difference δ at 76.3 GHz or the center frequency of the transmission millimeter-wave signal was substantially ±π. The sample Y was conditioned such that the phase difference δ at 76.3 GHz or the center frequency of the transmission millimeter-wave signal was drastically deviated from ±π. Specifically, the sample Y was obtained at first to have a phase difference δ of 1.31π or −0.69π at the frequency of 76.3 GHz. The sample X was obtained for the sample of the same condition by adjusting the line length of the first and second dielectric guides 316 and 317 to have the phase difference δ of ±π at the common frequency. At this time, in the sample X, the line length of the first and second dielectric guides 316 and 317 was made different from the line length of the first and second dielectric guides 316 and 317 of the sample Y only by about −1 mm and about +1 mm thereby to make different the positions of the end portions of the first and second dielectric guides 316 and 317 on the pulse modulator 303 and the position of the pulse modulator 303.

On the samples X and Y, the phase difference δ was measured in the following manner by using the vector network analyzer for the millimeter-wave band. The first test terminal (or the test port 1) of the vector network analyzer was connected with the end portion of the waveguide having the connected VCO by removing the VCO. The second test terminal (or the test port 2) was connected with the end portion of the third dielectric guide 318 having the connected horn antenna by removing the horn antenna. The measurement was made on the transmission characteristics $S_{21}$ between the first and second test terminals. When the millimeter-wave signal $Wa_2$ to transmit through the pulse modulator 303 in the OFF state was to be measured, the metal plate for shielding the electromagnetic wave was inserted between the first dielectric guide 316 and the fifth dielectric guide 320 to shield the millimeter-wave signal $Wb_2$. When the millimeter-wave signal $Wb_2$ to be reflected on the output terminal 303b of the pulse modulator 303 was to be measured, the metal plate for shielding the electromagnetic wave was inserted in place of the millimeter-wave modulating switch between the first dielectric guide 316 and the second dielectric guide 317 thereby to shield the millimeter-wave signal $Wa_2$. In other words, the transmission characteristics $S_{21}$ were independently measured on those signals $Wa_2$ and $Wb_2$. Then, the phase difference δ was obtained by determining the difference between the phase of the signal $Wa_2$ and the phase of the signal $Wb_2$ from the values of the phases of the measured values of those transmission characteristics $S_{21}$. The results are enumerated in Table 1. In Table 1, the term of 2Nπ is omitted from the phase difference δ.

TABLE 1

Comparison of phase difference δ

| Frequency | Phase difference δ (radian) | |
| --- | --- | --- |
| (GHz) | Sample X | Sample Y |
| 75.70 | 0.53 π | 0.87 π |
| 75.75 | 0.60 π | 0.94 π |
| 75.80 | 0.62 π | 0.96 π |
| 75.85 | 0.66 π | 0.99 π |
| 75.90 | 0.73 π | 1.01 π |
| 75.95 | 0.79 π | 1.06 π |
| 76.00 | 0.79 π | 1.09 π |
| 76.05 | 0.84 π | 1.14 π |
| 76.10 | 0.90 π | 1.19 π |
| 76.15 | 0.93 π | 1.24 π |
| 76.20 | 0.96 π | 1.26 π |

TABLE 1-continued

Comparison of phase difference δ

| Frequency (GHz) | Phase difference δ (radian) | |
|---|---|---|
| | Sample X | Sample Y |
| 76.25 | 0.99 π | 1.26 π |
| 76.30 | 1.05 π | 1.31 π |
| 76.35 | 1.08 π | 1.35 π |
| 76.40 | 1.11 π | 1.39 π |
| 76.45 | 1.13 π | 1.40 π |
| 76.50 | 1.17 π | 1.45 π |
| 76.55 | 1.20 π | 1.46 π |
| 76.60 | 1.20 π | 1.46 π |
| 76.65 | 1.23 π | 1.46 π |
| 76.70 | 1.25 π | 1.49 π |

From the results enumerated in Table 1, it is found that the sample Y had a phase difference δ of 1.31π deviated from π by 0.31π for the millimeter-wave signal having the frequency of 76.3 GHz whereas the sample X had a phase difference δ of 1.05π for the same frequency, and it is confirmed that the sample X had a phase difference δ of about π.

Next, the samples X and Y were actually operated, and their ON/OFF ratio characteristics were measured in the following manner. Specifically, the VCO was so stably oscillated as not to change its oscillation output, and the test terminal of the millimeter-wave band spectrum analyzer was connected with the end portion having the connected horn antenna of the third dielectric guide 318 by removing the horn antenna. The intensities of the millimeter-wave signals to be outputted from that end portion were measured at the individual times when the pulse modulator 303 was ON and OFF, to obtain the ON/OFF ratio or the ratio of the measured values. The results are plotted in the diagram of FIG. 27. Herein, W_on is an intensity (unit:watt) of the millimeter-wave signal as the transmission output in the ON state of the pulse modulator 303, and W_off is an intensity (unit:watt) of the millimeter-wave signal as the transmission output in the OFF state of the pulse modulator 303.

Figure 27:
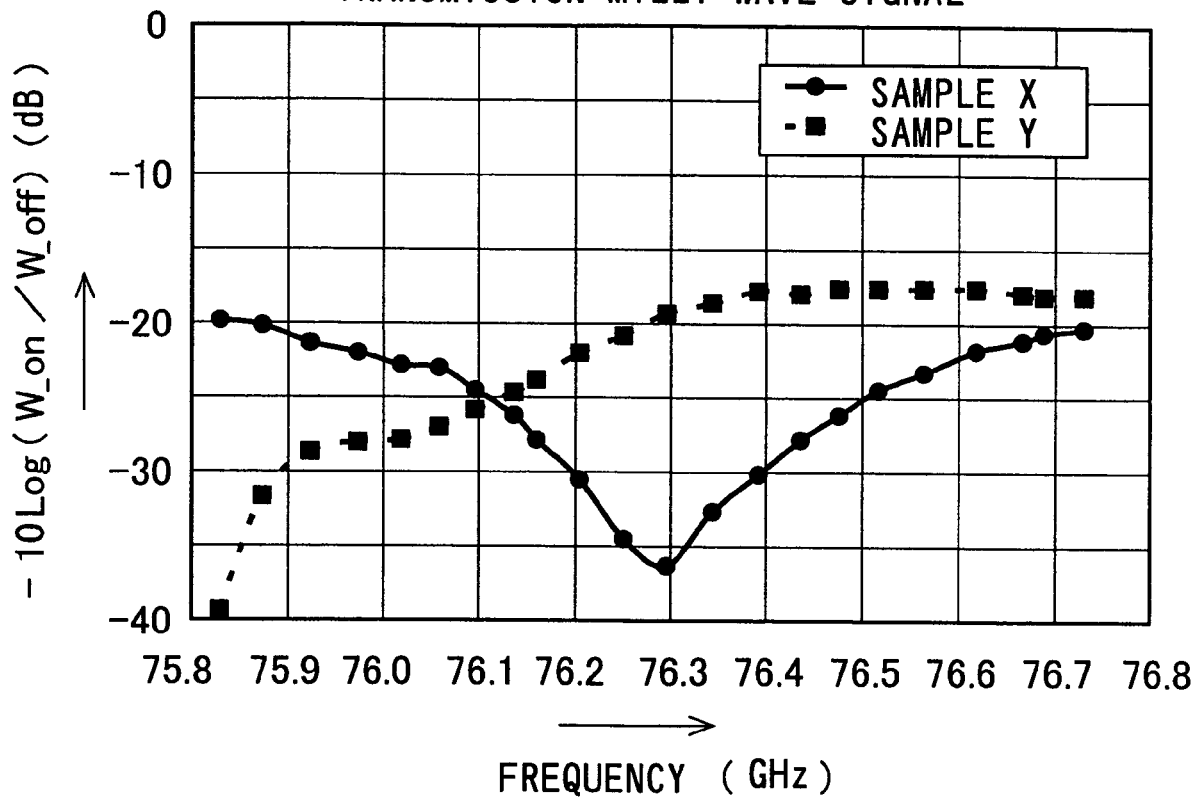
FIG. 27 is a diagram showing an ON/OFF ratio characteristics of the transmission output of examples and comparative examples of a high-frequency transmitter-receiver of the invention.
Figure 28:
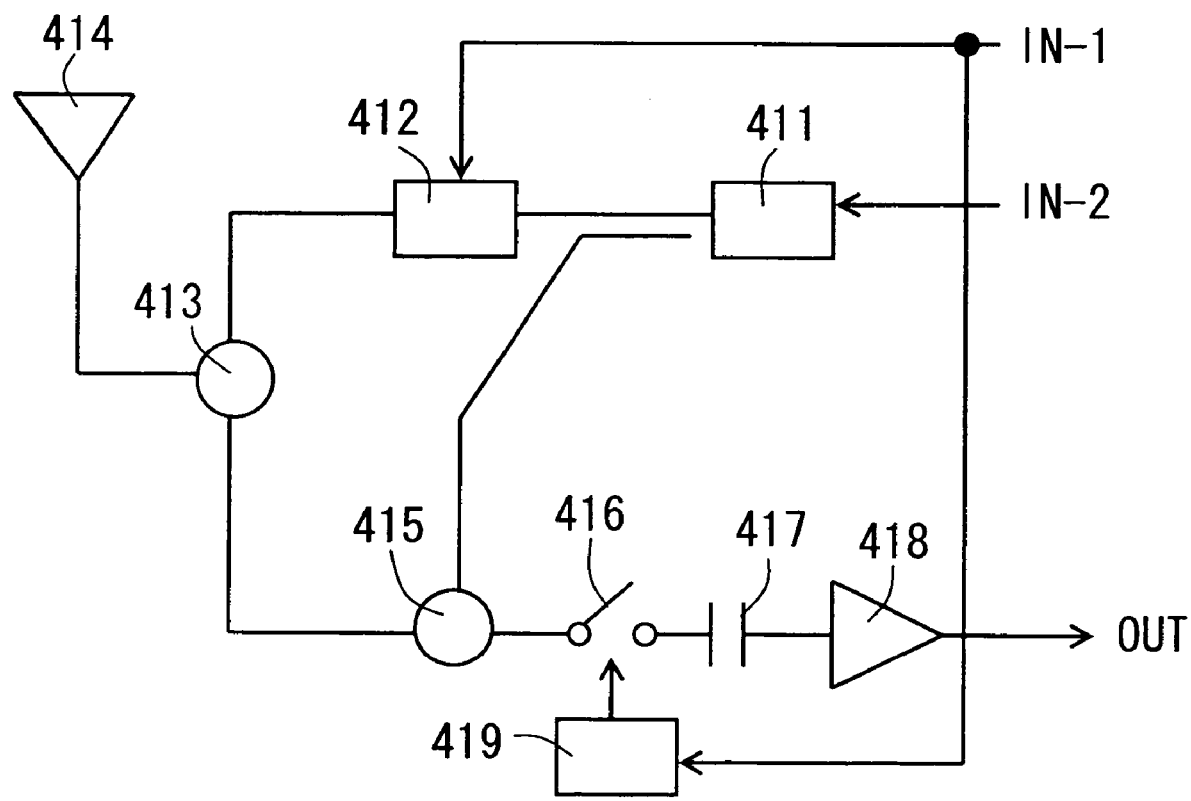
FIG. 28 is a block circuit diagram showing a configuration of each component of a conventional millimeter-wave transmitter-receiver applied to a millimeter-waver radar.
Figure 29:
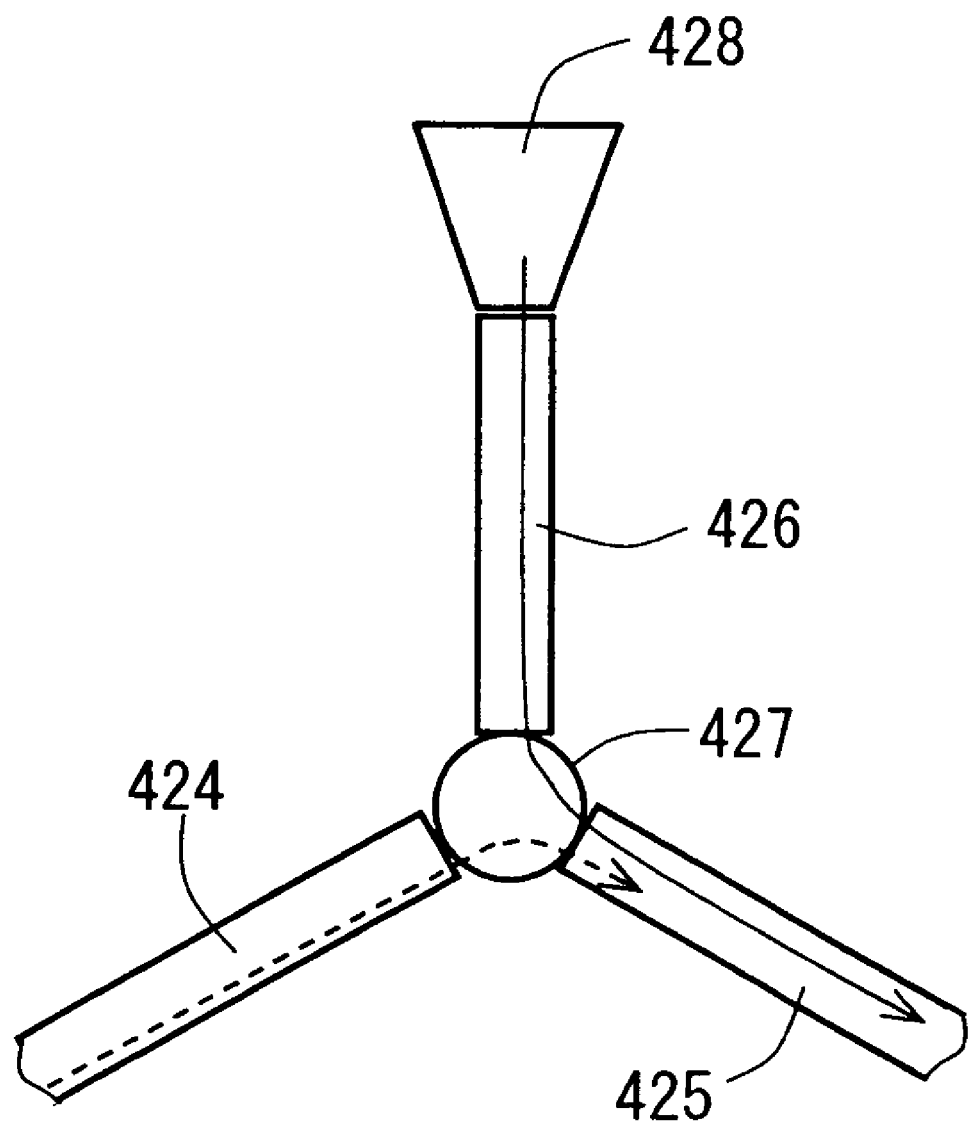
FIG. 29 is a schematic top plan view showing an example of a conventional transmitter-receiver radiator.
Figure 30:
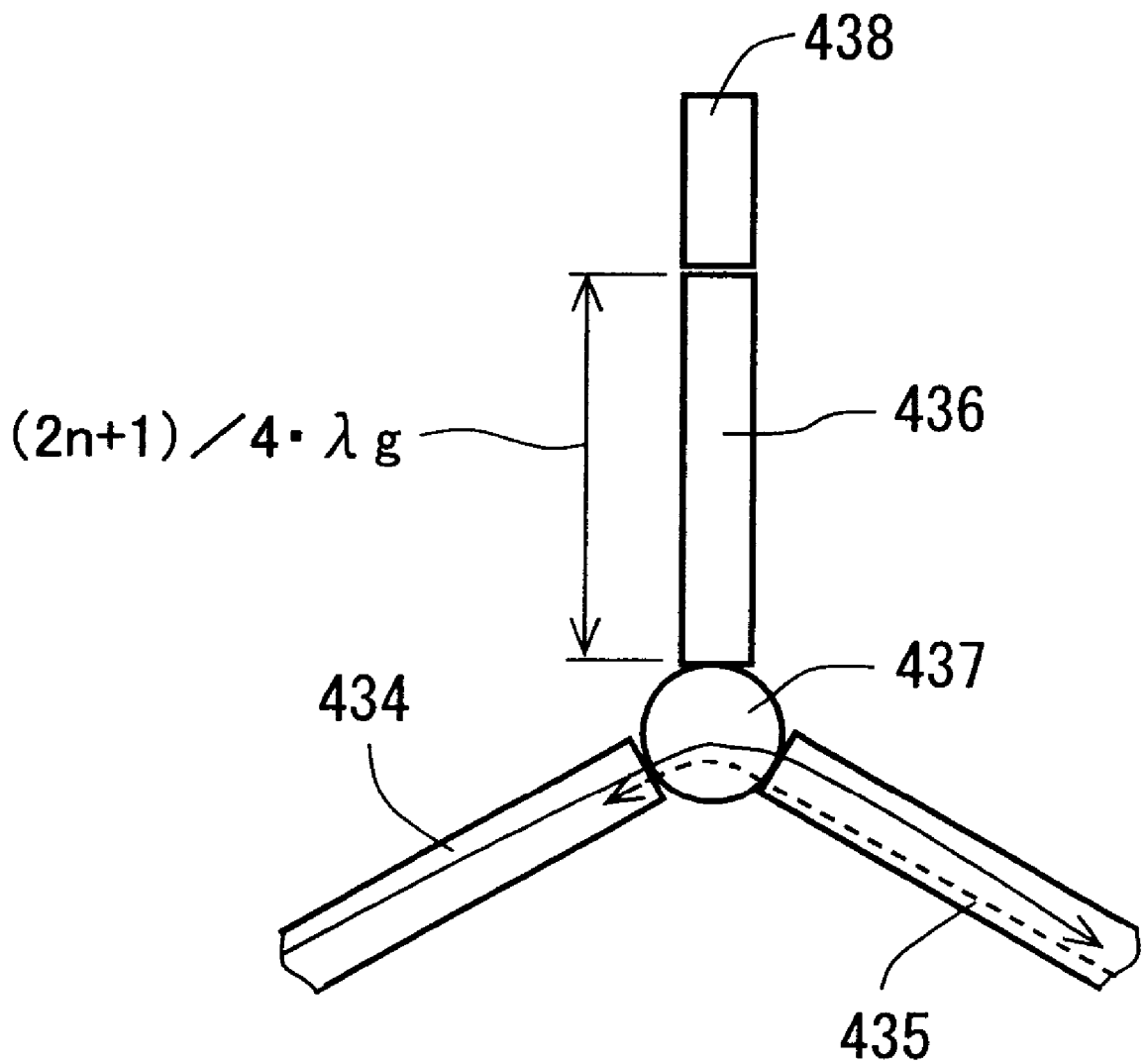
FIG. 30 is a schematic top plan view showing an example of a conventional isolator.

FIG. 27 is a diagram showing the ON/OFF ratio characteristics of the transmission output on the example and the comparison of the high-frequency transmitter-receiver of the invention. The abscissa indicates the frequency (unit:GHz), and the ordinate indicates the ON/OFF ratio of the transmission output in reciprocal numbers (i.e., −10 Log (W_on/W_off)) (unit:dB) Black circles plot the representative measured values of the ON/OFF ratio characteristics of the transmission output of the sample X, and black squares plot the representative measured values of the ON/OFF ratio characteristics of the transmission output of the sample Y. In FIG. 27, the ON/OFF ratio is expressed in reciprocal numbers, and it is implied that the ON/OFF ratio is the higher for the smaller measured values plotted, and that the ON/OFF ratio characteristics of the transmission output are satisfactory.

In the sample X, the line lengths of the first and second dielectric guides 316 and 317 were so set that the phase difference δ between the millimeter-wave signals $Wa_2$ and $Wb_2$ might be substantially π for the center frequency of 76.3 GHz of the transmission millimeter-wave signal. It is, therefore, found from the measurement results of the samples X and Y shown in FIG. 27 that the ON/OFF ratio was high across that frequency. In case the phase difference δ between the signals $Wa_2$ and $Wb_2$ was ±π, the signals $Wa_2$ and $Wb_2$ were synthesized in opposite phases between the output terminal 303b of the pulse modulator 303 and the circulator 304 so that they canceled and effectively attenuated each other. It is, therefore, confirmed that the ON/OFF ratio of the transmission output could be raised by suppressing the transmission of the portion of the transmission millimeter-wave signal as the unnecessary signal at the time when the pulse modulator 303 was OFF. Although omitted, it is confirmed that the sample X was lower, in the intensity of the millimeter-wave signal to be outputted as the transmission output at the time when the pulse modulator 303 was OFF, than the sample Y. It is also confirmed that the intensity of the millimeter-wave signal to be outputted as the transmission output at the time when the pulse modulator 303 was OFF was dominant in the ON/OFF ratio of the transmission output, and that the ON/OFF ratio of the transmission output could be raised by reducing the intensity.

From the measurement results of the phase difference δ of the sample X, as enumerated in Table 1, and the measurement results of the sample X, as shown in FIG. 27, the ON/OFF ratio of the transmission output was saturated when the phase difference δ was expressed by δ<0.75π (π−π/4) and 1.25π(π+π/4)<δ (i.e., less than 75.9 GHz and more than 76.7 GHz in terms of the frequency), and accordingly that the signals $Wa_2$ and $Wb_2$ effectively canceled and attenuated each other, when the phase difference δ was expressed by 0.75π (π−π/4)≦δ≦1.25π(π+π/4), thereby to provide an effect to raise the ON/OFF ratio of the transmission output. It is, therefore, found that the preferred phase difference δ ranged from δ=±π−¼π to δ=±π+¼π. Herein, it is needless to say, although described hereinbefore, that the most proper phase difference δ was δ=±π.

The evaluations similar to the aforementioned ones were conducted on the high-frequency transmitter-receivers of the fourteenth and fifteenth embodiments of the invention to provide similar satisfactory results for the high ON/OFF ratio of the transmission output.

Finally, the radar apparatus provided with those samples X and Y was configured and subjected to the radar detecting tests for detecting the objective approaching the radar apparatus. It is confirmed that the radar apparatus having the sample X outputted the range information rapidly and reliably.

Thus, the high-frequency transmitter-receiver of the invention could have a high performance and could raise the ON/OFF ratio of the transmission output with the simple configuration while suppressing the transmission of the portion of the transmission high-frequency signal as the unnecessary signal when the pulse modulator was OFF, thereby to enhance the transmission/reception performance. Moreover, the radar apparatus of the invention could perform the radar detection rapidly and reliably.

The radar-apparatus mounted vehicle of the invention can be specifically exemplified not only by a passenger or cargo transporting vehicle such as a train, a streetcar or an automobile but also by a bicycle, a bicycle with a prime mover, a vehicle in a recreation ground, or a cart in a golf course.

The radar-apparatus mounted small-sized boat of the invention is specifically exemplified by a boat which can be driven with or without the license for the small-sized boat, i.e., a ship having a gross tonnage less than 20 tons, such as a hand-powered boat, a dingy, a water motorbike, an outboard-motor mounted small-sized fisher boat, an outboard-motor mounted inflatable boat (or rubber boat), a fisherboat, a fishing boat, a working ship, a house boat, a towing boat, a sports boat, a fishing boat, a yacht, an ocean yacht, a cruiser or a pleasure boat having a gross tonnage less than 20 tons.

Herein, the invention should be limited neither to the foregoing embodiments of the mode of embodiment nor to the foregoing examples but can be modified in various manners without departing from the gist thereof. For example, a phase shifter for adjusting the phase difference δ may be disposed midway of any of the first, second, fourth and fifth dielectric guides 316, 317, 319, 320, 346, 347, 349 and 350. In this case, the phase difference δ can be dynamically set so that the phase difference δ can be dynamically changed, for example, according to the operating conditions of the mixer 306 or in synchronism with the operations of the pulse modulator 303.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and the range of equivalency of the claims are therefore intended to be embraced therein.

What is claimed is:

1. A high-frequency transmitter-receiver comprising:

first and second circulators each having a first terminal, a second terminal and a third terminal around a magnetic element, for outputting a high-frequency signal inputted from one of the terminals, from the first terminal to the second terminal, and from the second terminal to the third terminal, and from the third terminal to the first terminal;

a high-frequency oscillator connected to the first terminal of the first circulator, for generating a high-frequency signal;

a modulator arranged in a signal transmission line connecting between the second terminal of the first circulator and the first terminal of the second circulator, for transmitting the high-frequency signal to the second circulator in a case where the modulator is in an ON state and for reflecting the high-frequency signal to the first circulator in a case where the modulator is in an OFF state;

a transmitting/receiving antenna connected to the second terminal of the second circulator; and a mixer connected between the third terminal of the first circulator and the third terminal of the second circulator, for mixing the high-frequency signal reflected on the modulator and inputted from the third terminal of the first circulator and the high-frequency signal received by the transmitting/receiving antenna and inputted from the third terminal of the second circulator, and outputting an intermediate-frequency signal, wherein when the high-frequency signal is transmitted through the modulator, the high-frequency signal is outputted to the second circulator, and when the high-frequency signal is reflected on the modulator, the high-frequency signal is outputted from the third terminal of the first circulator to the mixer, and wherein the transmitter-receiver is configured such that δ=±π in which δ is a phase difference at a center frequency between a signal Wa, which is a high-frequency signal which passes through and leaks from the modulator in the OFF state, and a signal Wb, which is a high-frequency signal which is reflected on the modulator in the OFF state and passes through the third terminal of the first circulator to the mixer and is reflected on the mixer and passes through the second circulator to an output terminal of the modulator and is reflected on the output terminal of the modulator.

2. The high-frequency transmitter-receiver of claim 1, wherein an attenuator or a variable attenuator is interposed between the first circulator and the mixer.

3. A radar apparatus comprising:

a high-frequency transmitter-receiver of claim 1; and a range information detector for processing an intermediate-frequency signal outputted from the high-frequency transmitter-receiver and detecting range information to an objective.

* * * * *